US012748283B2

(12) United States Patent
Seo

(10) Patent No.: US 12,748,283 B2
(45) Date of Patent: Sep. 29, 2026

(54) OPTICAL SYSTEM AND CAMERA MODULE COMPRISING SAME

(71) Applicant: LG INNOTEK CO., LTD., Seoul (KR)

(72) Inventor: Eun Sung Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 256 days.

(21) Appl. No.: 18/720,763

(22) PCT Filed: Dec. 16, 2022

(86) PCT No.: PCT/KR2022/020653

§ 371 (c)(1),
(2) Date: Jun. 17, 2024

(87) PCT Pub. No.: WO2023/113565

PCT Pub. Date: Jun. 22, 2023

(65) Prior Publication Data

US 2025/0052981 A1 Feb. 13, 2025

(30) Foreign Application Priority Data

Dec. 16, 2021 (KR) ........................ 10-2021-0180681

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ...... G02B 9/64; G02B 13/0045; G02B 13/00; G02B 13/18; H04N 23/00; H04N 23/55; G03B 17/12
See application file for complete search history.

(56) References Cited

U.S. PATENT DOCUMENTS 11,460,675 B2 10/2022 Hirano
2018/0180856 A1 6/2018 Jung et al.
(Continued)

FOREIGN PATENT DOCUMENTS

CN 213600973 7/2021
JP 07-007147 1/1995
(Continued)

OTHER PUBLICATIONS

International Search Report dated Mar. 24, 2023 issued in Application No. PCT/KR2022/020653.

*Primary Examiner* — Charles S Chang
(74) *Attorney, Agent, or Firm* — KED & ASSOCIATES, LLP

(57) ABSTRACT

The optical system disclosed in the embodiment includes first to eighth lenses disposed along an optical axis, the first lens has positive refractive power and the eighth lens has negative refractive power, an object-side surface of the first lens is convex and a sensor-side surface is concave, an object-side surface of the fifth lens is concave and a sensor-side surface is convex, an object-side surface of the third lens has the minimum effective aperture among the lens surfaces, and the object-side surface of the eighth lens has a the maximum effective aperture among the lens surfaces, an average value of effective apertures of the both sides of the second lens is smaller than an average value of effective apertures of the both sides of the third lens, the sensor-side surface of the eighth lens has a concave and has an inflection point, and the following equation satisfies: 0.5<TTL/ImgH<3 (TTL is an optical axis distance from an apex of the object-side surface of the first lens to an image surface of a sensor, and ImgH is ½ of a maximum diagonal length of the image sensor).

20 Claims, 14 Drawing Sheets

(56) References Cited

U.S. PATENT DOCUMENTS

| | | | | |
|---|---|---|---|---|
| 2020/0241243 | A1 | 7/2020 | Hirano | |
| 2024/0061218 | A1* | 2/2024 | Jung .................. | G02B 13/0045 |

FOREIGN PATENT DOCUMENTS

| | | |
|---|---|---|
| JP | 2020-118922 | 8/2020 |
| JP | 2021-032922 | 3/2021 |
| KR | 10-1998-0021812 | 6/1998 |
| KR | 10-2018-0076742 | 7/2018 |
| KR | 10-2021-0050096 | 5/2021 |
| KR | 10-2021-0063888 | 6/2021 |

* cited by examiner

【FIG. 3】

| Y(Height,mm) | L1 | D12 | L2 | D23 | L3 | D34 | L4 | D45 | L5 | D56 | L6 | D67 | L7 | D78 | L8 |
|---|---|---|---|---|---|---|---|---|---|---|---|---|---|---|---|
| 0 | 0.689 | 0.162 | 0.220 | 0.068 | 0.817 | 0.729 | 0.251 | 0.232 | 0.668 | 0.025 | 0.291 | 0.906 | 0.625 | 1.630 | 0.476 |
| 0.1 | 0.688 | 0.162 | 0.220 | 0.068 | 0.816 | 0.729 | 0.251 | 0.231 | 0.668 | 0.026 | 0.291 | 0.907 | 0.625 | 1.628 | 0.478 |
| 0.2 | 0.685 | 0.160 | 0.221 | 0.069 | 0.814 | 0.730 | 0.252 | 0.230 | 0.667 | 0.029 | 0.291 | 0.909 | 0.623 | 1.623 | 0.484 |
| 0.3 | 0.680 | 0.157 | 0.223 | 0.069 | 0.812 | 0.730 | 0.253 | 0.229 | 0.664 | 0.033 | 0.291 | 0.912 | 0.619 | 1.613 | 0.493 |
| 0.4 | 0.673 | 0.153 | 0.225 | 0.069 | 0.808 | 0.731 | 0.254 | 0.226 | 0.662 | 0.039 | 0.291 | 0.916 | 0.615 | 1.601 | 0.507 |
| 0.5 | 0.664 | 0.147 | 0.228 | 0.070 | 0.803 | 0.731 | 0.256 | 0.224 | 0.658 | 0.047 | 0.291 | 0.921 | 0.609 | 1.584 | 0.524 |
| 0.6 | 0.653 | 0.142 | 0.232 | 0.070 | 0.797 | 0.731 | 0.258 | 0.221 | 0.653 | 0.058 | 0.292 | 0.927 | 0.603 | 1.565 | 0.545 |
| 0.7 | 0.639 | 0.135 | 0.237 | 0.069 | 0.789 | 0.730 | 0.260 | 0.218 | 0.647 | 0.071 | 0.292 | 0.934 | 0.596 | 1.541 | 0.569 |
| 0.8 | 0.623 | 0.128 | 0.242 | 0.068 | 0.781 | 0.727 | 0.263 | 0.215 | 0.641 | 0.087 | 0.293 | 0.941 | 0.588 | 1.515 | 0.597 |
| 0.9 | 0.603 | 0.122 | 0.249 | 0.065 | 0.772 | 0.724 | 0.266 | 0.212 | 0.633 | 0.106 | 0.293 | 0.948 | 0.580 | 1.486 | 0.628 |
| 1 | 0.581 | 0.115 | 0.256 | 0.061 | 0.762 | 0.717 | 0.270 | 0.210 | 0.623 | 0.128 | 0.295 | 0.955 | 0.572 | 1.454 | 0.663 |
| 1.1 | 0.555 | 0.111 | 0.264 | 0.055 | 0.752 | 0.708 | 0.274 | 0.208 | 0.613 | 0.154 | 0.297 | 0.961 | 0.564 | 1.418 | 0.700 |
| 1.2 | 0.525 | 0.107 | 0.273 | 0.046 | 0.740 | 0.696 | 0.279 | 0.208 | 0.602 | 0.184 | 0.300 | 0.967 | 0.556 | 1.381 | 0.741 |
| 1.3 | 0.493 | 0.107 | 0.283 | 0.034 | 0.727 | 0.678 | 0.285 | 0.210 | 0.591 | 0.219 | 0.304 | 0.972 | 0.548 | 1.341 | 0.785 |
| 1.4 | 0.457 | 0.110 | 0.293 | 0.019 | 0.711 | 0.655 | 0.293 | 0.212 | 0.579 | 0.258 | 0.308 | 0.975 | 0.542 | 1.299 | 0.831 |
| 1.5 | 0.420 | 0.116 | | | | 0.626 | 0.303 | 0.216 | 0.567 | 0.303 | 0.315 | 0.976 | 0.537 | 1.255 | 0.880 |
| 1.6 | | | | | | 0.588 | 0.319 | 0.220 | 0.555 | 0.355 | 0.322 | 0.975 | 0.532 | 1.210 | 0.931 |
| 1.7 | | | | | | | 0.349 | 0.225 | 0.544 | 0.413 | 0.332 | 0.972 | 0.530 | 1.164 | 0.985 |
| 1.8 | | | | | | | | 0.232 | 0.536 | 0.481 | 0.343 | 0.966 | 0.529 | 1.117 | 1.041 |
| 1.9 | | | | | | | | | 0.533 | 0.560 | 0.357 | 0.956 | 0.530 | 1.069 | 1.098 |
| 2 | | | | | | | | | | 0.653 | 0.374 | 0.944 | 0.534 | 1.021 | 1.158 |
| 2.1 | | | | | | | | | | 0.767 | 0.394 | 0.928 | 0.541 | 0.973 | 1.219 |
| 2.2 | | | | | | | | | | | 0.419 | 0.908 | 0.551 | 0.926 | 1.281 |
| 2.3 | | | | | | | | | | | 0.450 | 0.884 | 0.564 | 0.881 | 1.345 |
| 2.4 | | | | | | | | | | | 0.489 | 0.856 | 0.582 | 0.836 | 1.410 |
| 2.5 | | | | | | | | | | | 0.539 | 0.824 | 0.605 | 0.795 | 1.476 |
| 2.6 | | | | | | | | | | | | 0.788 | 0.634 | 0.756 | 1.542 |
| 2.7 | | | | | | | | | | | | 0.747 | 0.669 | 0.720 | 1.609 |
| 2.8 | | | | | | | | | | | | 0.703 | 0.713 | 0.689 | 1.675 |
| 2.9 | | | | | | | | | | | | 0.655 | 0.768 | 0.662 | 1.741 |
| 3 | | | | | | | | | | | | | 0.840 | 0.640 | 1.807 |
| 3.1 | | | | | | | | | | | | | 0.936 | 0.624 | 1.871 |
| 3.2 | | | | | | | | | | | | | 1.054 | 0.615 | 1.934 |
| 3.3 | | | | | | | | | | | | | | 0.612 | 1.995 |
| 3.4 | | | | | | | | | | | | | | 0.616 | 2.053 |
| 3.5 | | | | | | | | | | | | | | 0.627 | 2.110 |
| 3.6 | | | | | | | | | | | | | | 0.645 | 2.164 |
| 3.7 | | | | | | | | | | | | | | 0.669 | 2.216 |
| 3.8 | | | | | | | | | | | | | | 0.695 | 2.267 |
| 3.9 | | | | | | | | | | | | | | | 2.315 |
| 4 | | | | | | | | | | | | | | | 2.362 |
| 4.1 | | | | | | | | | | | | | | | 2.409 |
| 4.2 | | | | | | | | | | | | | | | 2.458 |
| 4.3 | | | | | | | | | | | | | | | 2.513 |
| 4.4 | | | | | | | | | | | | | | | |

【FIG. 4】

| | L1 | | L2 | | L3 | | L4 | |
|---|---|---|---|---|---|---|---|---|
| | S1 | S2 | S1 | S2 | S1 | S2 | S1 | S2 |
| R | 3.23.E+00 | 8.07.E+00 | -9.07.E+03 | 1.61.E+01 | 1.26.E+01 | -2.97.E+01 | -1.47.E+02 | 3.24.E+01 |
| Normalized radius | 1.66.E+00 | 1.40.E+00 | 1.52.E+00 | 1.36.E+00 | 1.35.E+00 | 1.54.E+00 | 1.66.E+00 | 1.82.E+00 |
| Conic constant | -1.10.E+00 | 2.37.E+01 | 0.00.E+00 | 2.02.E+01 | 5.92.E+01 | 0.00.E+00 | 0.00.E+00 | 2.69.E+01 |
| 4th Qcon coefficient | -2.52.E-02 | -9.72.E-02 | 1.16.E-02 | 1.33.E-02 | -5.95.E-02 | -5.94.E-02 | -2.90.E-01 | -3.87.E-01 |
| 6th Qcon coefficient | -7.23.E-03 | -2.92.E-03 | 7.25.E-03 | 1.33.E-03 | -2.34.E-03 | -2.14.E-03 | -9.81.E-03 | -1.10.E-03 |
| 8th Qcon coefficient | -8.59.E-04 | -2.96.E-04 | -2.47.E-04 | 2.60.E-04 | 4.27.E-04 | -2.67.E-04 | -2.80.E-03 | -1.21.E-03 |
| 10th Qcon coefficient | 5.71.E-05 | -2.17.E-04 | -2.13.E-04 | 1.19.E-04 | 1.32.E-04 | -2.84.E-04 | -8.19.E-04 | -4.69.E-04 |
| 12th Qcon coefficient | -6.42.E-06 | -4.59.E-05 | -5.68.E-05 | 4.29.E-05 | 1.10.E-06 | -8.29.E-05 | -8.56.E-04 | -1.20.E-03 |
| 14th Qcon coefficient | 1.97.E-05 | -1.17.E-05 | -1.76.E-05 | -1.24.E-06 | 6.60.E-06 | -2.93.E-05 | -2.75.E-05 | 1.69.E-04 |
| 16th Qcon coefficient | -1.39.E-05 | -2.69.E-06 | -6.70.E-06 | 1.28.E-07 | -1.03.E-05 | 1.44.E-06 | -1.13.E-04 | -3.58.E-05 |
| 18th Qcon coefficient | 8.00.E-06 | -1.40.E-07 | 5.83.E-08 | -3.47.E-06 | 1.95.E-06 | -2.53.E-06 | 6.16.E-05 | 1.23.E-04 |
| 20th Qcon coefficient | -2.41.E-06 | 2.95.E-07 | -5.06.E-06 | 6.04.E-07 | -1.77.E-06 | 2.15.E-06 | -2.38.E-05 | -1.21.E-05 |
| 22th Qcon coefficient | 4.53.E-06 | -1.76.E-07 | -2.30.E-06 | -7.22.E-07 | 9.07.E-07 | 4.91.E-07 | 1.48.E-05 | 5.97.E-06 |
| 24th Qcon coefficient | -2.83.E-06 | -1.33.E-07 | -5.51.E-06 | 6.34.E-08 | -2.63.E-07 | 2.39.E-06 | -1.22.E-05 | -1.21.E-05 |
| 26th Qcon coefficient | | | | | | -3.27.E-06 | 5.41.E-06 | 1.11.E-06 |
| 28th Qcon coefficient | | | | | | | -4.37.E-06 | |
| 30th Qcon coefficient | | | | | | | 1.60.E-06 | |

| | L5 | | L6 | | L7 | | L8 | |
|---|---|---|---|---|---|---|---|---|
| | S1 | S2 | S1 | S2 | S1 | S2 | S1 | S2 |
| R | -2.66.E+01 | -8.26.E+00 | 2.38.E+01 | 2.37.E+01 | 5.80.E+00 | 2.70.E+01 | -3.00.E+00 | 1.92.E+01 |
| Normalized radius | 1.90.E+00 | 2.10.E+00 | 2.51.E+00 | 2.86.E+00 | 3.17.E+00 | 3.78.E+00 | 4.24.E+00 | 5.47.E+00 |
| Conic constant | 0.00.E+00 | 1.34.E+01 | 7.42.E+01 | -2.31.E+01 | -3.24.E+01 | 0.00.E+00 | -1.68.E+00 | -1.66.E+01 |
| 4th Qcon coefficient | -3.24.E-01 | -3.80.E-01 | -3.73.E-01 | -2.04.E-01 | -1.06.E+00 | -1.14.E+00 | 1.85.E-01 | -1.83.E+00 |
| 6th Qcon coefficient | -1.50.E-02 | 8.82.E-03 | -4.08.E-02 | -4.34.E-02 | -1.03.E-01 | -2.81.E-02 | -2.23.E-03 | -1.30.E-01 |
| 8th Qcon coefficient | -5.00.E-03 | -2.62.E-03 | -7.88.E-03 | -7.29.E-03 | -8.35.E-03 | 1.59.E-02 | -9.36.E-03 | -5.57.E-02 |
| 10th Qcon coefficient | -1.84.E-04 | 1.30.E-03 | -2.61.E-03 | 1.53.E-05 | -1.25.E-02 | 1.10.E-03 | -1.11.E-02 | -1.47.E-02 |
| 12th Qcon coefficient | -1.21.E-03 | 6.77.E-04 | 2.42.E-04 | -1.66.E-04 | -8.73.E-04 | 9.97.E-05 | 8.30.E-04 | -2.93.E-03 |
| 14th Qcon coefficient | 1.63.E-04 | 4.80.E-04 | -3.89.E-04 | -1.33.E-04 | -1.01.E-03 | -1.57.E-04 | 1.72.E-05 | 5.64.E-04 |
| 16th Qcon coefficient | 5.03.E-05 | 3.21.E-04 | -6.83.E-05 | -1.47.E-04 | 1.21.E-03 | 5.72.E-04 | -3.62.E-04 | 3.09.E-03 |
| 18th Qcon coefficient | 9.64.E-05 | 6.90.E-05 | -1.83.E-04 | -1.86.E-05 | 7.66.E-04 | 2.16.E-04 | -9.70.E-04 | 6.58.E-04 |
| 20th Qcon coefficient | 3.36.E-05 | 1.49.E-04 | 8.97.E-05 | 6.45.E-05 | 5.94.E-04 | 1.66.E-04 | -5.77.E-05 | 8.71.E-04 |
| 22th Qcon coefficient | -5.05.E-06 | 9.66.E-06 | -9.09.E-05 | -5.02.E-05 | 4.13.E-04 | 2.13.E-04 | 1.93.E-04 | -1.02.E-03 |
| 24th Qcon coefficient | -8.41.E-06 | 3.63.E-05 | 3.71.E-05 | 1.59.E-05 | 2.21.E-04 | -1.49.E-04 | 1.85.E-04 | -4.12.E-04 |
| 26th Qcon coefficient | -1.35.E-05 | | -3.05.E-05 | | | -5.10.E-05 | | -2.05.E-04 |
| 28th Qcon coefficient | -5.04.E-06 | | 1.36.E-05 | | | 6.69.E-05 | | -8.96.E-06 |
| 30th Qcon coefficient | -1.08.E-06 | | -3.67.E-06 | | | -3.38.E-06 | | 1.77.E-04 |

【FIG. 10】

| Y(Height, mm) | L1 | D12 | L2 | D23 | L3 | D34 | L4 | D45 | L5 | D56 | L6 | D67 | L7 | D78 |
|---|---|---|---|---|---|---|---|---|---|---|---|---|---|---|
| 0 | 0.779 | 0.343 | 0.220 | 0.156 | 0.446 | 0.462 | 0.349 | 0.449 | 0.343 | 0.044 | 0.315 | 1.051 | 1.002 | 0.779 |
| 0.1 | 0.778 | 0.343 | 0.220 | 0.157 | 0.446 | 0.462 | 0.349 | 0.448 | 0.343 | 0.044 | 0.315 | 1.052 | 1.001 | 0.778 |
| 0.2 | 0.775 | 0.341 | 0.221 | 0.157 | 0.445 | 0.462 | 0.349 | 0.447 | 0.342 | 0.046 | 0.315 | 1.052 | 0.997 | 0.775 |
| 0.3 | 0.770 | 0.339 | 0.223 | 0.157 | 0.443 | 0.463 | 0.349 | 0.445 | 0.340 | 0.050 | 0.316 | 1.053 | 0.992 | 0.771 |
| 0.4 | 0.763 | 0.336 | 0.226 | 0.158 | 0.439 | 0.464 | 0.350 | 0.443 | 0.337 | 0.054 | 0.316 | 1.054 | 0.984 | 0.765 |
| 0.5 | 0.753 | 0.332 | 0.229 | 0.158 | 0.435 | 0.464 | 0.350 | 0.440 | 0.334 | 0.061 | 0.316 | 1.055 | 0.975 | 0.756 |
| 0.6 | 0.742 | 0.328 | 0.234 | 0.158 | 0.430 | 0.465 | 0.350 | 0.436 | 0.330 | 0.069 | 0.316 | 1.057 | 0.964 | 0.746 |
| 0.7 | 0.727 | 0.324 | 0.240 | 0.158 | 0.424 | 0.466 | 0.350 | 0.432 | 0.326 | 0.078 | 0.316 | 1.059 | 0.952 | 0.733 |
| 0.8 | 0.710 | 0.320 | 0.247 | 0.156 | 0.417 | 0.466 | 0.350 | 0.427 | 0.321 | 0.090 | 0.316 | 1.061 | 0.939 | 0.718 |
| 0.9 | 0.690 | 0.317 | 0.255 | 0.153 | 0.409 | 0.466 | 0.349 | 0.422 | 0.316 | 0.103 | 0.315 | 1.063 | 0.926 | 0.701 |
| 1 | 0.667 | 0.315 | 0.265 | 0.147 | 0.399 | 0.466 | 0.348 | 0.416 | 0.312 | 0.119 | 0.314 | 1.065 | 0.913 | 0.681 |
| 1.1 | 0.641 | 0.315 | 0.277 | 0.139 | 0.388 | 0.466 | 0.347 | 0.411 | 0.308 | 0.137 | 0.313 | 1.066 | 0.900 | 0.659 |
| 1.2 | 0.611 | 0.317 | 0.290 | 0.126 | 0.375 | 0.465 | 0.344 | 0.406 | 0.304 | 0.158 | 0.311 | 1.067 | 0.888 | 0.635 |
| 1.3 | 0.579 | 0.323 | 0.307 | 0.109 | 0.359 | 0.464 | 0.340 | 0.402 | 0.302 | 0.181 | 0.310 | 1.066 | 0.878 | 0.609 |
| 1.4 | 0.545 | 0.333 | 0.327 | 0.086 | 0.339 | 0.464 | 0.332 | 0.400 | 0.302 | 0.206 | 0.308 | 1.063 | 0.869 | 0.580 |
| 1.5 | 0.509 | 0.349 | 0.352 | 0.052 | 0.313 | 0.468 | 0.320 | 0.398 | 0.306 | 0.232 | 0.307 | 1.057 | 0.863 | 0.551 |
| 1.6 | 0.471 | 0.372 | | | | 0.486 | 0.301 | 0.395 | 0.315 | 0.259 | 0.306 | 1.049 | 0.860 | 0.520 |
| 1.7 | | | | | | 0.374 | 0.272 | 0.387 | 0.333 | 0.285 | 0.305 | 1.036 | 0.860 | 0.488 |
| 1.8 | | | | | | | | 0.360 | 0.365 | 0.312 | 0.305 | 1.018 | 0.865 | 0.456 |
| 1.9 | | | | | | | | | 0.421 | 0.336 | 0.306 | 0.995 | 0.875 | 0.425 |
| 2 | | | | | | | | | 0.486 | 0.357 | 0.308 | 0.965 | 0.890 | 0.394 |
| 2.1 | | | | | | | | | | 0.374 | 0.312 | 0.927 | 0.911 | 0.364 |
| 2.2 | | | | | | | | | | 0.387 | 0.319 | 0.881 | 0.941 | 0.335 |
| 2.3 | | | | | | | | | | 0.403 | 0.329 | 0.827 | 0.978 | 0.309 |
| 2.4 | | | | | | | | | | | 0.344 | 0.764 | 1.025 | 0.285 |
| 2.5 | | | | | | | | | | | 0.363 | 0.692 | 1.082 | 0.263 |
| 2.6 | | | | | | | | | | | 0.393 | 0.611 | 1.149 | 0.243 |
| 2.7 | | | | | | | | | | | | 0.523 | 1.227 | 0.226 |
| 2.8 | | | | | | | | | | | | 0.432 | 1.314 | 0.213 |
| 2.9 | | | | | | | | | | | | 0.343 | 1.406 | 0.202 |
| 3 | | | | | | | | | | | | | 1.497 | 0.196 |
| 3.1 | | | | | | | | | | | | | 1.589 | 0.193 |
| 3.2 | | | | | | | | | | | | | | 0.195 |
| 3.3 | | | | | | | | | | | | | | 0.203 |
| 3.4 | | | | | | | | | | | | | | 0.216 |
| 3.5 | | | | | | | | | | | | | | 0.235 |
| 3.6 | | | | | | | | | | | | | | 0.261 |
| 3.7 | | | | | | | | | | | | | | 0.295 |
| 3.8 | | | | | | | | | | | | | | 0.338 |
| 3.9 | | | | | | | | | | | | | | 0.392 |
| 4 | | | | | | | | | | | | | | 0.458 |
| 4.1 | | | | | | | | | | | | | | 0.539 |
| 4.2 | | | | | | | | | | | | | | |

【FIG. 11】

| | L1 | | L2 | | L3 | | L4 | |
|---|---|---|---|---|---|---|---|---|
| | S1 | S2 | S1 | S2 | S1 | S2 | S1 | S2 |
| R | 3.387 | 10.435 | 638.234 | 14.921 | 9.950 | 319.587 | 29.962 | 31.125 |
| Normalized radius | 1.72.E+00 | 1.57.E+00 | 1.40.E+00 | 1.51.E+00 | 1.51.E+00 | 1.62.E+00 | 1.70.E+00 | 1.80.E+00 |
| Conic constant | -1.42.E+00 | 3.73.E+01 | 0.00.E+00 | 7.67.E+01 | 1.04.E+01 | 0.00.E+00 | 0.00.E+00 | 0.00.E+00 |
| 4th Qcon coefficient | -4.62.E-02 | -1.37.E-01 | 1.66.E-02 | 6.25.E-02 | -6.22.E-02 | -9.74.E-02 | -1.56.E-01 | -2.59.E-01 |
| 6th Qcon coefficient | -7.12.E-03 | -3.09.E-03 | 5.13.E-03 | 4.62.E-03 | 4.05.E-03 | -1.07.E-02 | 1.37.E-02 | -2.05.E-03 |
| 8th Qcon coefficient | -1.42.E-03 | -9.75.E-04 | 9.71.E-05 | 1.97.E-03 | 4.25.E-04 | -1.91.E-03 | 4.96.E-03 | 7.36.E-03 |
| 10th Qcon coefficient | 4.62.E-04 | -1.03.E-03 | 7.67.E-06 | -2.93.E-04 | 3.00.E-05 | -2.71.E-03 | 1.13.E-03 | 2.20.E-03 |
| 12th Qcon coefficient | -2.11.E-04 | 4.02.E-07 | -5.30.E-06 | -1.49.E-04 | -9.08.E-04 | -5.87.E-04 | -7.13.E-05 | 1.30.E-03 |
| 14th Qcon coefficient | 1.43.E-04 | -1.59.E-04 | 5.08.E-06 | -2.08.E-04 | 1.24.E-05 | -3.91.E-04 | 5.72.E-05 | 1.08.E-04 |
| 16th Qcon coefficient | -9.73.E-05 | 3.37.E-05 | -7.58.E-06 | 9.15.E-05 | -1.52.E-04 | 1.52.E-04 | -5.38.E-05 | 2.89.E-04 |
| 18th Qcon coefficient | 5.20.E-05 | -3.73.E-05 | 8.20.E-07 | -1.30.E-05 | 1.06.E-04 | -9.12.E-05 | 6.41.E-05 | 8.01.E-06 |
| 20th Qcon coefficient | -1.84.E-05 | 2.60.E-05 | 5.07.E-08 | 6.41.E-05 | -5.74.E-05 | 4.62.E-05 | -3.38.E-05 | 1.11.E-04 |
| 22th Qcon coefficient | 2.50.E-05 | -2.18.E-05 | 4.19.E-08 | -2.03.E-05 | 4.46.E-05 | -6.70.E-05 | 2.72.E-05 | -1.38.E-05 |
| 24th Qcon coefficient | -1.21.E-05 | 8.43.E-07 | 2.44.E-08 | 1.95.E-05 | -3.17.E-05 | 2.68.E-05 | -5.89.E-06 | 4.56.E-05 |
| 26th Qcon coefficient | | | | -1.42.E-05 | 1.01.E-05 | -2.96.E-05 | 2.58.E-06 | -1.61.E-05 |
| 28th Qcon coefficient | | | | 6.90.E-07 | -1.50.E-05 | 1.25.E-05 | -5.57.E-07 | |
| 30th Qcon coefficient | | | | -2.86.E-06 | 9.03.E-06 | -2.30.E-05 | -2.38.E-08 | |
| | L5 | | L6 | | L7 | | L8 | |
| | S1 | S2 | S1 | S2 | S1 | S2 | S1 | S2 |
| R | -34.360 | -8.952 | 72.844 | 54.237 | 23.004 | -5.359 | -2.829 | 7.168 |
| Normalized radius | 1.92.E+00 | 2.30.E+00 | 2.61.E+00 | 2.94.E+00 | 3.21.E+00 | 6.17.E+00 | 4.80.E+00 | 5.06.E+00 |
| Conic constant | 0.00.E+00 | 1.19.E+01 | 0.00.E+00 | 0.00.E+00 | -3.02.E+00 | -3.87.E+01 | -2.15.E+00 | -1.52.E+02 |
| 4th Qcon coefficient | -3.12.E-01 | -4.60.E-02 | -1.69.E-01 | -2.59.E-01 | -1.59.E+00 | -7.51.E+00 | 8.03.E-01 | -2.36.E+00 |
| 6th Qcon coefficient | -1.43.E-02 | 6.76.E-02 | -4.18.E-02 | -1.59.E-02 | -5.09.E-02 | 6.40.E-01 | -3.90.E-02 | 3.33.E-02 |
| 8th Qcon coefficient | -1.13.E-02 | -3.24.E-03 | -5.89.E-03 | -1.68.E-02 | 6.45.E-02 | 2.94.E+00 | -4.17.E-03 | 3.62.E-02 |
| 10th Qcon coefficient | -2.14.E-03 | -3.03.E-03 | -2.19.E-03 | -8.81.E-04 | -5.92.E-03 | 2.50.E+00 | -2.12.E-03 | 3.42.E-02 |
| 12th Qcon coefficient | -1.16.E-03 | -1.19.E-03 | -4.86.E-04 | 1.13.E-03 | -3.96.E-03 | 1.32.E+00 | -3.66.E-03 | -7.01.E-04 |
| 14th Qcon coefficient | 1.43.E-05 | -1.26.E-04 | -8.90.E-05 | -3.82.E-05 | -1.01.E-02 | 3.79.E-01 | 2.12.E-03 | -4.29.E-03 |
| 16th Qcon coefficient | -4.22.E-04 | -4.60.E-04 | -8.74.E-04 | -1.91.E-04 | -4.89.E-03 | 8.25.E-02 | 1.47.E-03 | -1.11.E-03 |
| 18th Qcon coefficient | 1.67.E-04 | 5.53.E-04 | -5.57.E-05 | 1.14.E-04 | -2.03.E-03 | 5.21.E-03 | -3.66.E-03 | -3.47.E-03 |
| 20th Qcon coefficient | -7.41.E-05 | 2.69.E-04 | 8.40.E-05 | 4.21.E-04 | 1.97.E-04 | 3.50.E-03 | 7.99.E-04 | 3.14.E-04 |
| 22th Qcon coefficient | 1.43.E-04 | 8.87.E-05 | -6.94.E-05 | -5.07.E-05 | 2.08.E-04 | -1.55.E-03 | -6.94.E-04 | -5.17.E-04 |
| 24th Qcon coefficient | -1.01.E-04 | 1.77.E-04 | 2.00.E-04 | 5.22.E-05 | 5.17.E-04 | 1.40.E-03 | -4.82.E-04 | -3.07.E-05 |
| 26th Qcon coefficient | 4.94.E-05 | 1.52.E-04 | -5.80.E-05 | -1.71.E-04 | 1.54.E-04 | -3.41.E-05 | 2.89.E-04 | -9.24.E-04 |
| 28th Qcon coefficient | -6.36.E-05 | 1.56.E-05 | -4.02.E-05 | -3.98.E-05 | 5.46.E-05 | -6.28.E-04 | -3.78.E-04 | -6.72.E-04 |
| 30th Qcon coefficient | 7.05.E-05 | 3.62.E-05 | -2.92.E-05 | 2.25.E-05 | -6.76.E-05 | 1.44.E-03 | -2.39.E-04 | -5.33.E-04 |

【FIG. 13】
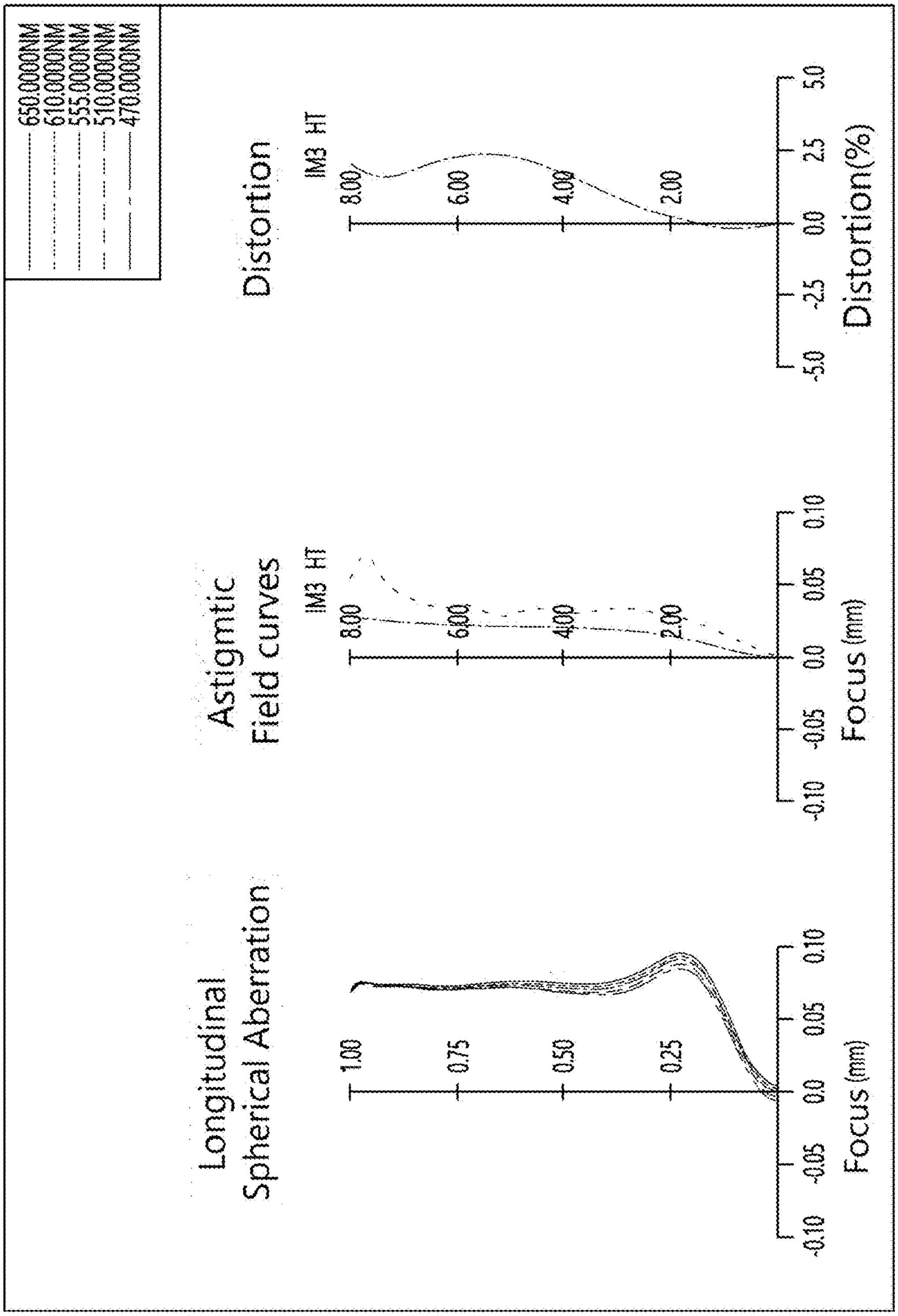

【FIG. 14】
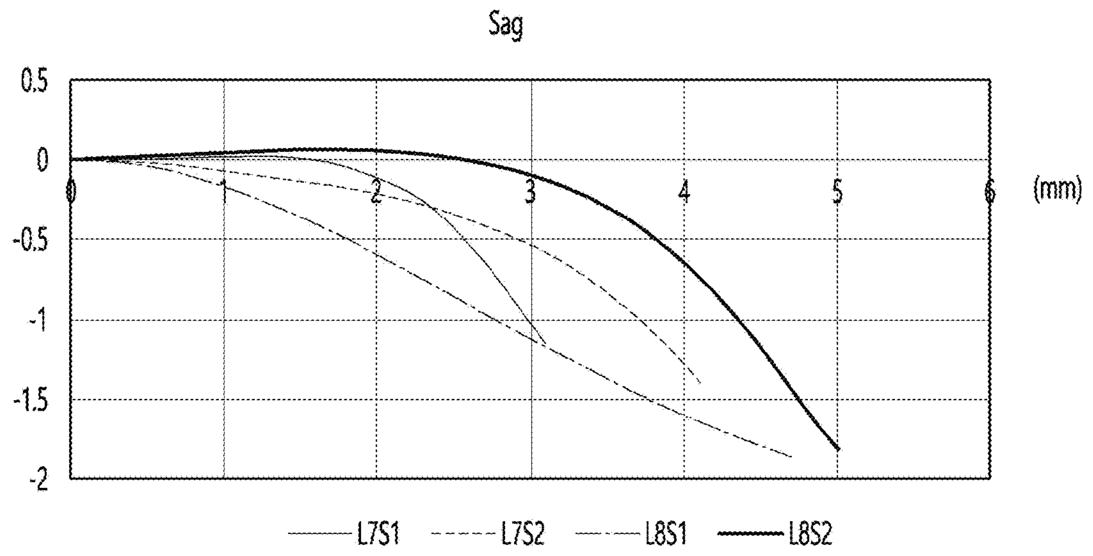
【FIG. 15】
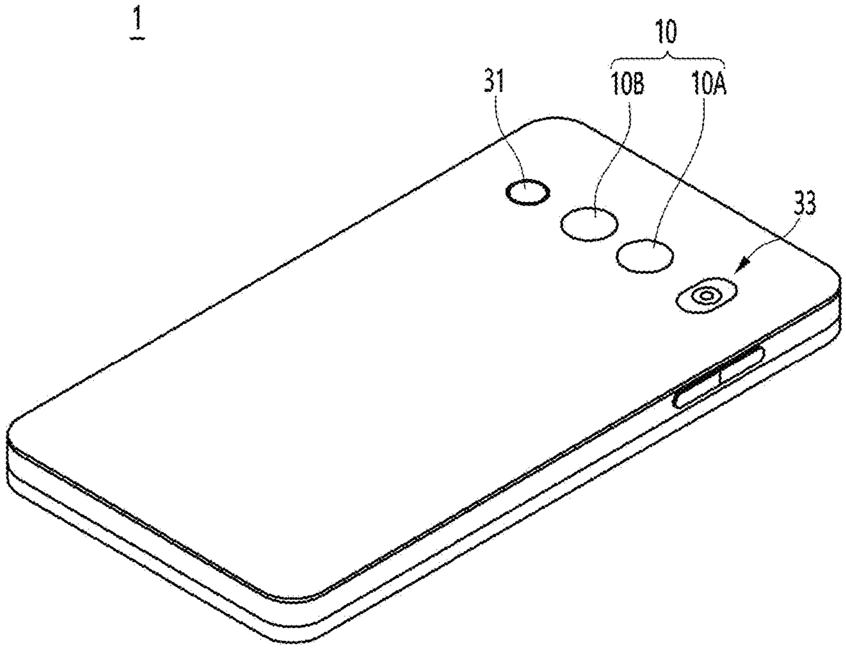

OPTICAL SYSTEM AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/020653, filed Dec. 16, 2022, which claims priority to Korean Patent Application No. 10-2021-0180681, filed Dec. 16, 2021, whose entire disclosures are hereby incorporated by reference.

TECHNICAL FIELD

An embodiment relates to an optical system for improved optical performance and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement. The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted.

However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high resolution and high quality. However, when the size of the image sensor is increased, a total track length (TTL) of the optical system including the plurality of lenses also increases, and thus there is a problem in that the thickness of the camera and the mobile terminal including the optical system also increases. Therefore, a new optical system capable of solving the above problems is required.

DISCLOSURE

Technical Problem

An embodiment provides an optical system with improved optical properties. An embodiment provides an optical system having excellent optical performance on the center and periphery portions of the angle of field of view. An embodiment provides an optical system capable of having a slim structure.

Technical Solution

An optical system according to an embodiment of the invention includes first to eighth lenses disposed along an optical axis from an object side toward a sensor side, the first lens has positive (+) refractive power on the optical axis, and the eighth lens has negative (−) refractive power on the optical axis, an object-side surface of the first lens has a convex shape and a sensor-side surface has a concave shape on the optical axis, and an object-side surface of the fifth lens has a concave shape and a sensor-side surface has a convex shape on the optical axis, an object-side surface of the third lens has a minimum effective aperture among the first to eighth lenses, a sensor-side surface of the eighth lens has a the maximum effective aperture among the first to eighth lenses, an average value of effective apertures of object-side and sensor-side surfaces of the second lens is smaller than an average value of effective apertures of object-side and sensor-side surfaces of the third lens, the sensor-side surface of the eighth lens has a concave on the optical axis and has an inflection point, and an optical axis distance from an apex of the object-side surface of the first lens to an image surface of a sensor is TTL (Total track length), and ½ of a maximum diagonal length of the sensor is ImgH, and the following equation satisfies: $0.5<TTL/ImgH<3$.

According to an embodiment of the invention, an object-side surface of the seventh lens among the first to eighth lenses has an inflection point, and an object-side surface of the eighth lens may be provided without an inflection point from the optical axis to an end of an effective region.

According to an embodiment of the invention, the effective aperture of the object-side surface of the third lens is CA_L3S1, the effective aperture of the sensor-side surface of the second lens is CA_L2S2, and the effective aperture of the sensor-side surface of the third lens is CA_L2S2 is CA_L3S2, and the following equations may satisfy: $CA\_L3S1<CA\_L2S2$ and $CA\_L3S1<CA\_L3S2$.

According to an embodiment of the invention, a region where the distance from the sensor-side surface of the eighth lens is less than 0.1 mm based on a straight line perpendicular to the optical axis passing through a center of the sensor-side surface of the eighth lens may range from 55% to 75% of an effective radius from the optical axis.

According to an embodiment of the invention, the third lens may satisfy the following equation: $0.5<L3\_CT/L3\_ET<2$ (L3_CT is a thickness at the optical axis of the third lens, and L3_ET is a thickness at ends of the object-side and sensor-side surfaces of the third lens).

According to an embodiment of the invention, the first, second, and eighth lenses may satisfy the following equations: $1.6<n2$, $1.50<n1<1.6$, and $1.50<n8<1.6$ (n1 is a refractive index of the first lens, and n2 is a refractive index of the second lens, and n8 is a refractive index of the eighth lens).

According to an embodiment of the invention, the second lens and the eighth lens may satisfy the following equation: 2≤AVR_CA_L8/AVR_CA_L2≤4 (where AVR_CA_L8 is the effective value of the object-side surface and sensor-side surface of the eighth lens) is the average value of aperture (mm), and AVR_CA_L2 is the average effective aperture value of the object-side surface and sensor-side surface of the second lens).

According to an embodiment of the invention, the third lens and the eighth lens may satisfy the following equation: 1<CA_L8S2/CA_L3S1<5 (CA_L8S2 is an average value of the effective apertures (mm) of the object-side and sensor-side surfaces of the eighth lens, CA_L3S1 is an average value of the effective apertures of the object-side and sensor-side surfaces of the third lens).

According to an embodiment of the invention, CA_L8S2 may have a maximum effective aperture among lens surfaces of the first to eighth lenses, and CA_L3S1 may have a minimum effective aperture among the lens surfaces of the first to eighth lenses. The center thicknesses of the first and sixth lenses may satisfy the following equation: 1<L1_CT/L6_CT<5 (L1_CT is a thickness of the first lens at the optical axis, and L6_CT is a thickness of the sixth lens at the optical axis thickness).

An optical system according to an embodiment of the invention includes a first lens group having three or less lenses on an object side; and a second lens group having five or less lenses on a sensor side of the first lens group, wherein the first lens group has positive refractive power (+) on the optical axis, and the second lens group has a negative (−) refractive power on the optical axis, a number of lenses of the second lens group is less than twice ae number of lenses of the first lens group, and an effective aperture of an object-side surface of a lens closest to the second lens group among the lens surfaces of the first and second lens groups is a minimum, and an effective aperture of a sensor-side surface closest to an image sensor among the lens surfaces of the first and second lens groups is a maximum, and a lens with a minimum average effective aperture in the first and second lens groups is disposed between an object surface and a sensor-side surface of the first lens group, a lens with a maximum average effective aperture in the first and second lens groups is a last lens of the second lens group, an optical axis distance from an apex to an image surface of an image sensor is TTL (Total track length), ½ of a maximum diagonal length of the sensor is ImgH, a maximum optical axis distance (mm) from ab object-side surface of the first lens group to a sensor-side surface of the second lens group is TD, a maximum effective aperture among effective apertures of the object-side surfaces and sensor-side surfaces of first to eighth lenses is CA_Max, and the following equations may satisfy: 0.5<TTL/ImgH<3 and 0.5<TD/CA_max<1.5.

According to an embodiment of the invention, an absolute value of a focal length of each of the first and second lens groups may be greater than a focal length of the second lens group than a focal length of the first lens group.

According to an embodiment of the invention, the minimum and maximum effective apertures of the lens surfaces of the first and second lens groups may satisfy the following equation: 1<CA_max/CA_min<5 (CA_Max is the maximum effective aperture among the object-side surfaces and the sensor-side surfaces in the first and second lens groups, and CA_Min is a minimum effective aperture among the object-side surfaces and the sensor-side surfaces of the first and second lens groups).

According to an embodiment of the invention, the first lens group includes first to third lenses disposed along the optical axis in the direction from the object side to the sensor side, and the second lens group includes fourth to eight lenses disposed along the optical axis from the object side toward the sensor side, an effective aperture of the sensor-side surface of the seventh lens having an inflection point may satisfy the following equation: 0.4<$CA\_L_{inf}S1$/WD_Sensor<0.9 ($CA\_L_{inf}S1$ is an effective aperture of the object-side surface of the seventh lens with the inflection point, and WD_Sensor is the diagonal length of the image sensor).

According to an embodiment of the invention, the first, second, sixth, and seventh lenses may satisfy the following equations: 2<L1_CT/L2_CT<4 and 0<L6_CT/L7_CT<5 (L1_CT is a center thickness of the first lens, L2_CT is a center thickness of the second lens, L6_CT is a center thickness of the sixth lens, and L7_CT is a center thickness of the seventh lens).

According to an embodiment of the invention, a region where the distance from the sensor-side surface of the eighth lens is less than 0.1 mm based on a straight line perpendicular to the optical axis passing through a center of the sensor-side surface of the eighth lens may range from 55% to 75% of an effective radius from the optical axis.

A camera module according to an embodiment of the invention includes an optical system; image sensor; and a filter between the image sensor and a last lens of the optical system, wherein the optical system includes the optical system disclosed above, and can satisfy the following equation: 1<F/EPD<5 (F is a total focus length of the optical system, and EPD is an entrance pupil diameter of the optical system).

Advantageous Effects

The optical system and the camera module according to the embodiment may have improved optical properties. In detail, the optical system may have improved aberration characteristics, resolution, etc. as a plurality of lenses are formed with a set surface shape, refractive power, thickness, and distance. The optical system and the camera module according to the embodiment may have improved distortion and aberration control characteristics, and may have good optical performance even in the center and periphery portions of the field of view (FOV).

The optical system according to the embodiment may have improved optical characteristics and a small total track length (TTL), so that the optical system and a camera module including the same may be provided in a slim and compact structure.

DESCRIPTION OF DRAWINGS

FIG. 3 shows data on the aspheric coefficient of each lens surface in the optical system of FIG. 1.

FIG. 4 shows data according to the distances in a first direction Y with respect to the thickness of each lens and the distances between two adjacent lenses in the optical system of FIG. 1.

FIG. 10 shows data on the aspheric coefficient of each lens surface in the optical system of FIG. 8.

FIG. 11 shows data according to the distances in a first direction Y with respect to the thickness of each lens and the distances between two adjacent lenses in the optical system of FIG. 8.

FIG. 13 is a graph showing the aberration characteristics of the optical system of FIG. 8.

FIG. 14 is a graph showing the height of the optical axis direction according to the distance in the first direction Y with respect to the object-side surface and the sensor-side surface of the n-th, n−1th lens in the optical system of FIG. 8.

FIG. 15 is a diagram illustrating that a camera module according to an embodiment is applied to a mobile terminal.

BEST MODE

Figure 1:
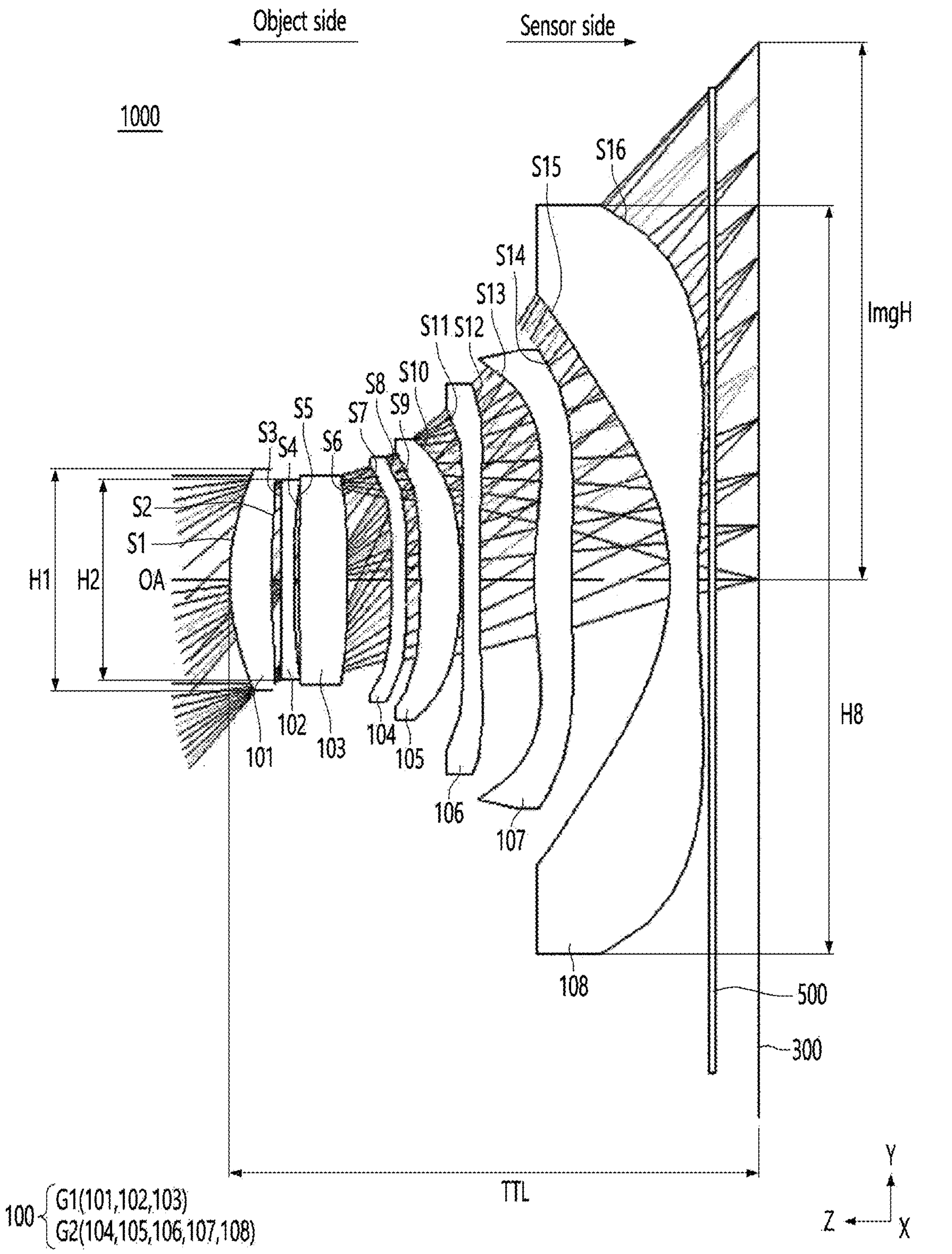
FIG. 1 is a block diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. Several embodiments described below may be combined with each other, unless it is specifically stated that they cannot be combined with each other. In addition, the description of other embodiments may be applied to parts omitted from the description of any one of several embodiments unless otherwise specified.

In the description of the invention, "object-side surface" may mean the surface of the lens that faces the object side with respect to the optical axis OA, and "sensor-side surface" may mean the surface of the lens that faces the imaging surface (image sensor) with respect to the optical axis. The expression that one surface of the lens is convex may mean a convex shape on the optical axis or paraxial region, and the expression that one surface of the lens is the concave may mean a concave shape on the optical axis or paraxial region. The curvature radius, the center thickness, the distance between lenses, and TTL described in the table for lens data may mean values on the optical axis. The vertical direction may mean a direction perpendicular to the optical axis, and the end of the lens or the lens surface may mean the end of the effective region of the lens through which the incident light passes. The effective diameter of the lens surface may have a measurement error of up to ±0.4 mm depending on the measurement method. The paraxial region means a very narrow region near the optical axis, and is a region in which the distance from which the light beam falls from the optical axis OA is almost zero. Hereinafter, the concave or convex shape of the lens surface will be described as an optical axis, and may also include a paraxial region.

Figure 8:
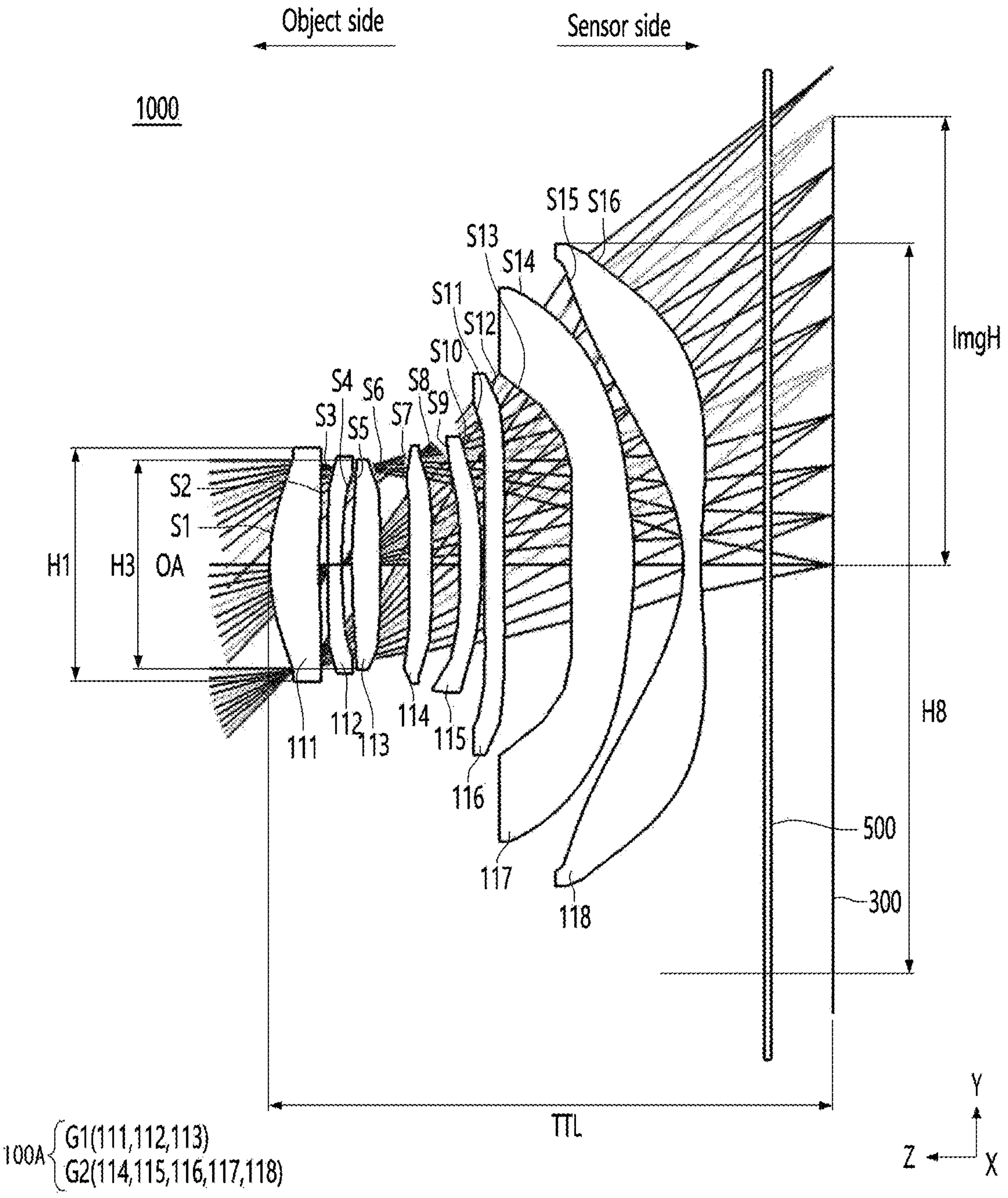
FIG. 8 is a configuration diagram of an optical system according to the second embodiment.

Referring to FIGS. 1 and 8, the optical system 1000 according to the first and second embodiments of the invention may include a plurality of lens groups G1 and G2. In detail, each of the plurality of lens groups G1 and G2 includes at least one lens. For example, the optical system 1000 may include a first lens group G1 and a second lens group G2 sequentially arranged along the optical axis OA from the object side toward the image sensor 300. Among the plurality of lens groups G1 and G2, the number of lenses of the second lens group G2 may be greater than the number of lenses of the first lens group G1, and for example, may be more than 1 time and less than 2 times the number of lenses of the first lens group G1.

The first lens group G1 may include at least one lens. The first lens group G1 may include three or less lenses. For example, the first lens group G1 may include three lenses. The second lens group G2 may include at least two lenses. The second lens group G2 may include, for example, 1.5 times more lenses than the first lens group G1. The second lens group G2 may include 7 or less lenses or 6 or less lenses. The number of lenses of the second lens group G2 may be 3 or more and 6 or less different than the number of lenses of the first lens group G1. For example, the second lens group G2 may include five lenses.

The optical system 1000 may be provided in a structure in which the object-side surface of the last lens, that is, the n-th lens, has no inflection point. Here, n may be 5 to 10, and is preferably 8. By removing the inflection point on the object-side surface of the last n-th lens and minimizing the Sag value of the sensor-side surface, the distance between the n-th lens and the image sensor 300 can be reduced, and a distance (i.e., BFL) between the sensor-side surface of the n-th lens and the image sensor 300 can be reduced. Accordingly, a slim optical system and a camera module having the same can be provided. The total number of lenses in the first and second lens groups G1 and G2 is 8 or more.

The first lens group G1 may have positive (+) refractive power. The second lens group G2 may have a different negative refractive power than the first lens group G1. The first lens group G1 and the second lens group G2 may have different focal lengths. As the first lens group G1 and the second lens group G2 have opposite refractive powers, the focal length of the second lens group G2 has a negative sign, and the focal length of the first lens group G1 may have a positive (+) sign. When expressed as an absolute value, the focal length of the second lens group G2 may be greater than the focal length of the first lens group G1. For example, the absolute value of the focal length f_G2 of the second lens group G2 may be 1.4 times or more, for example, in a range of 1.4 to 3.5 times the absolute value of the focal length f_G1 of the first lens group G1. Accordingly, the optical system 1000 according to the embodiment can have improved aberration control characteristics such as chromatic aberration and distortion aberration by controlling the refractive power and focal length of each lens group, and can have good optical performance in the center and periphery portions of the FOV.

In the optical axis OA, the first lens group G1 and the second lens group G2 may have a set distance. The optical axis distance between the first lens group G1 and the second lens group G2 in the optical axis OA is a separation distance at the optical axis, and may be the optical axis distance between the sensor-side surface of the lens closest to the sensor side among the lenses in the first lens group G1 and the object-side surface of the lens closest to the object side among the lenses in the second lens group G2. The optical axis distance between the first lens group G1 and the second lens group G2 may be greater than the center thickness of the last lens of the first lens group G1 and the center thickness of a first of the lenses of the second lens group G2. The optical axis distance between the first lens group G1 and the second lens group G2 is smaller than the optical axis distance of the first lens group G1 and may be 20% or more of the optical axis distance of the first lens group G1, and for example, may be in the range of 20% to 60% or 20% to 50% of the optical axis distance of the first lens group G1. Here, the optical axis distance of the first lens group G1 is the optical axis distance between the object-side surface of the lens closest to the object side of the first lens group G1 and the sensor-side surface of the lens closest to the sensor side.

The optical axis distance between the first lens group G1 and the second lens group G2 may be 20% or less of the optical axis distance of the second lens group G2, for example, in the range of 3% to 20%. The optical axis distance of the second lens group G2 is the optical axis distance between the object-side surface of the lens closest to the object side of the second lens group G2 and the sensor-side surface of the lens closest to the sensor side. The lens with the minimum average effective aperture within the first and second lens groups G1 and G2 may be disposed between the object-side lenses 101 and 111 and the sensor-side lenses 103 and 113 of the first lens group G1. Accordingly, the optical system 1000 can have good optical performance not only in the center portion of the FOV but also in the periphery portion, and can improve chromatic aberration and distortion aberration.

The optical system 1000 may include the first lens group G1 and the second lens group G2 which the optical axis OA is aligned from the object side toward the image sensor 300. The optical system 1000 may include 10 or less lenses or 9 or less lenses. The first lens group G1 refracts the light incident through the object side to collect it, and the second lens group G2 may refract the light emitted through the first lens group G1 to be diffused to the center and periphery portions of the image sensor 300. Among the lenses of the first lens group G1, the lens closest to the object side has positive (+) refractive power, and among the lenses of the second lens group G2, the lens closest to the sensor side may have negative (−) refractive power. In the optical system 1000, the number of lenses with positive (+) refractive power may be equal to or greater than the number of lenses with negative (−) refractive power. In the first lens group G1, the number of lenses with positive (+) refractive power may be greater than the number of lenses with negative (−) refractive power. In the second lens group G2, the number of lenses with positive (+) refractive power may be greater than the number of lenses with negative (−) refractive power.

The sensor-side surface of the last lens closest to the image sensor 300 may have a Sag value of an absolute value and a region less than 0.1 mm may include a position of 55% or more of an effective radius in the optical axis OA, for example, a range of 55% to 75%. Accordingly, a distance between the image sensor 300 and the last lens may be reduced.

Each of the plurality of lenses 100 and 100A may include an effective region and a non-effective region. The effective region may be a region through which light incident on each of the lenses 100 and 100A passes. That is, the effective region may be an effective region in which the incident light is refracted to implement optical characteristics. The non-effective region may be arranged around the effective region. The non-effective region may be a region where effective light does not enter the plurality of lenses 100 and 100A. That is, the non-effective region may be a region unrelated to the optical characteristics. Additionally, the end of the non-effective region may be a region fixed to a barrel (not shown) accommodating the lens.

The optical system 1000 may include an image sensor 300. The image sensor 300 can detect light and convert it into an electrical signal. The image sensor 300 may detect light that sequentially passes through the plurality of lenses 100 and 100A. The image sensor 300 may include an element capable of detecting incident light, such as a charge coupled device (CCD) or a complementary metal oxide semiconductor (CMOS).

The optical system 1000 may include a filter 500. The filter 500 may be disposed between the second lens group G2 and the image sensor 300. The filter 500 may be disposed between the image sensor 300 and a lens closest to the sensor among the plurality of lenses 100 and 100A. For example, when the optical systems 100 and 100A are 8-element lenses, the filter 500 may be disposed between the eighth lens 110 and the image sensor 300. The filter 500 may include at least one of an infrared filter or an optical filter of a cover glass. The filter 500 may pass light in a set wavelength band and filter light in a different wavelength band. When the filter 500 includes an infrared filter, radiant heat emitted from external light can be blocked from being transmitted to the image sensor 300. Additionally, the filter 500 can transmit visible light and reflect infrared rays.

The optical system 1000 according to the embodiment may include an aperture stop (not shown). The aperture stop can control the amount of light incident on the optical system 1000. The aperture stop may be placed at a set position. For example, the aperture stop may be placed around the object-side surface or sensor-side surface of the lens closest to the object. The aperture stop may be disposed between two adjacent lenses among the lenses in the first lens group G1. For example, the aperture stop may be located around the object-side surface of the lens closest to the object side. Alternatively, at least one lens selected from among the plurality of lenses 100 and 100A may function as an aperture stop. In detail, the object-side surface or sensor-side surface of one lens selected from among the lenses of the first lens group G1 may function as an aperture stop to control the amount of light. The optical system 1000 according to the embodiment may further include a reflective member (not shown) for changing the path of light. The reflective member may be implemented as a prism that reflects incident light from the first lens group G1 in the direction of the lenses. Hereinafter, the optical system according to the embodiment will be described in detail.

First Embodiment

Figure 2:
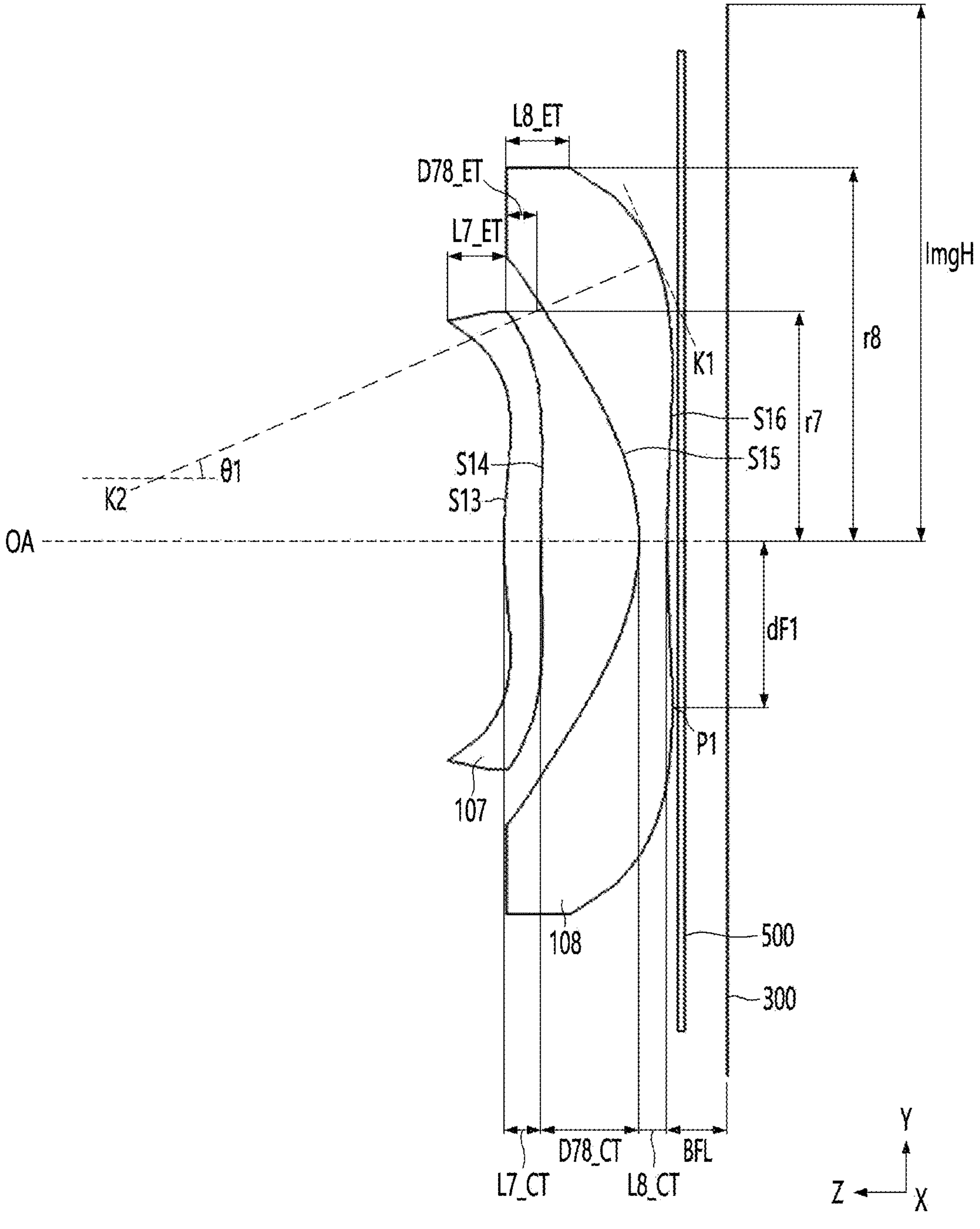
FIG. 2 is a diagram illustrating a relationship between an image sensor, an n-th lens, and an n−1th lens in the optical system of FIG. 1.
Figure 5:
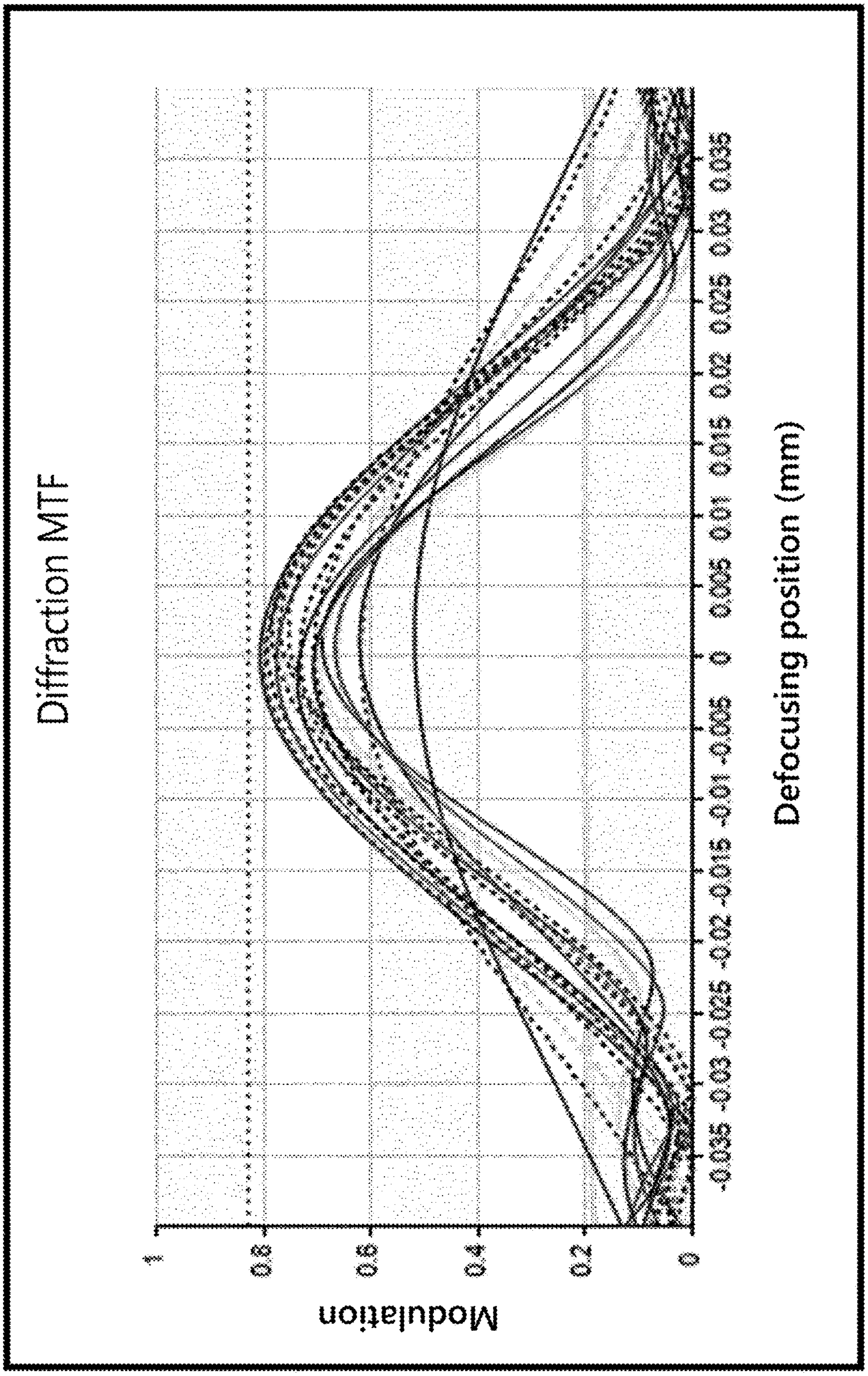
FIG. 5 is a graph of the diffraction MTF of the optical system of FIG. 1.
Figure 6:
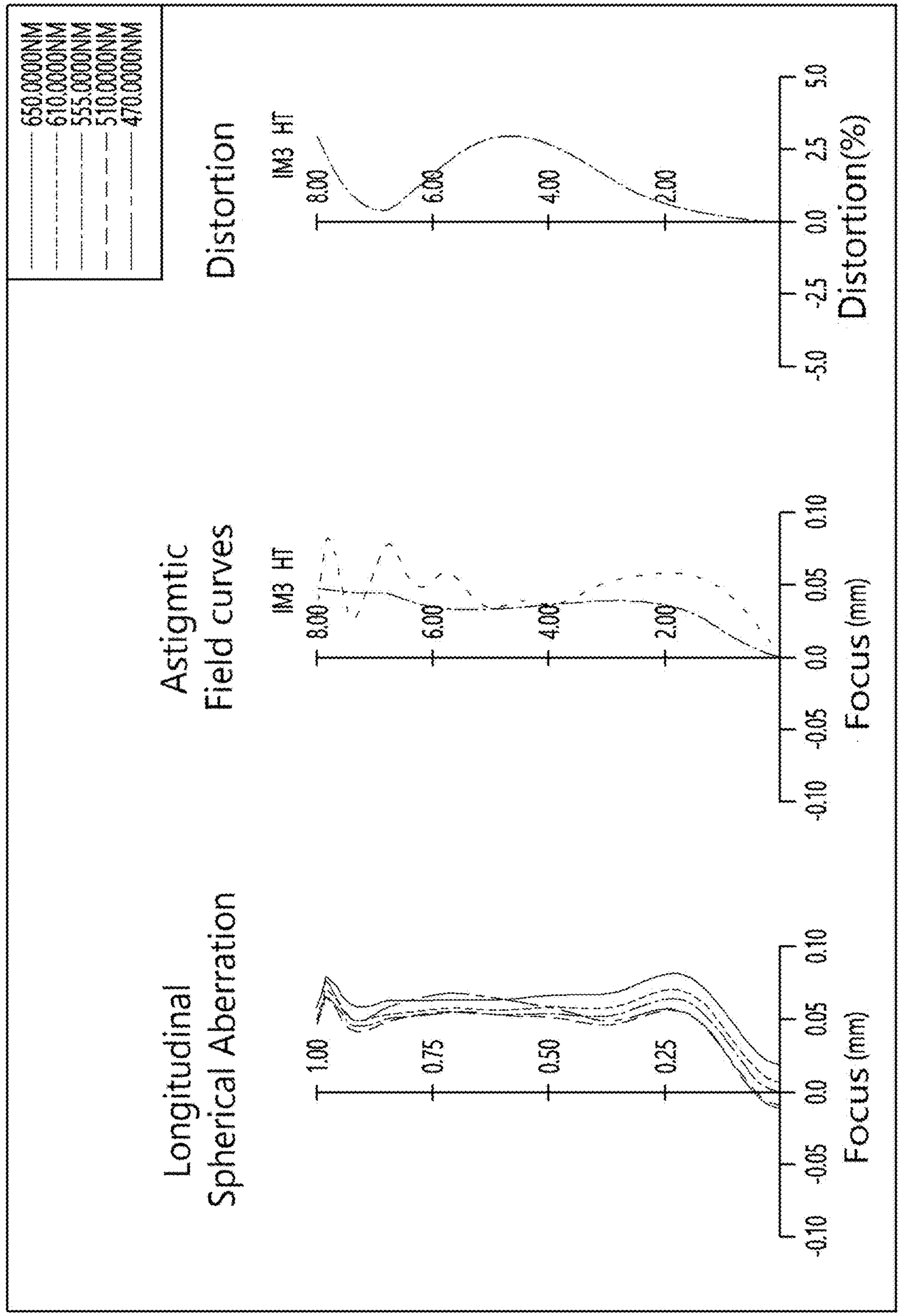
FIG. 6 is a graph showing the aberration characteristics of the optical system of FIG. 1.
Figure 7:
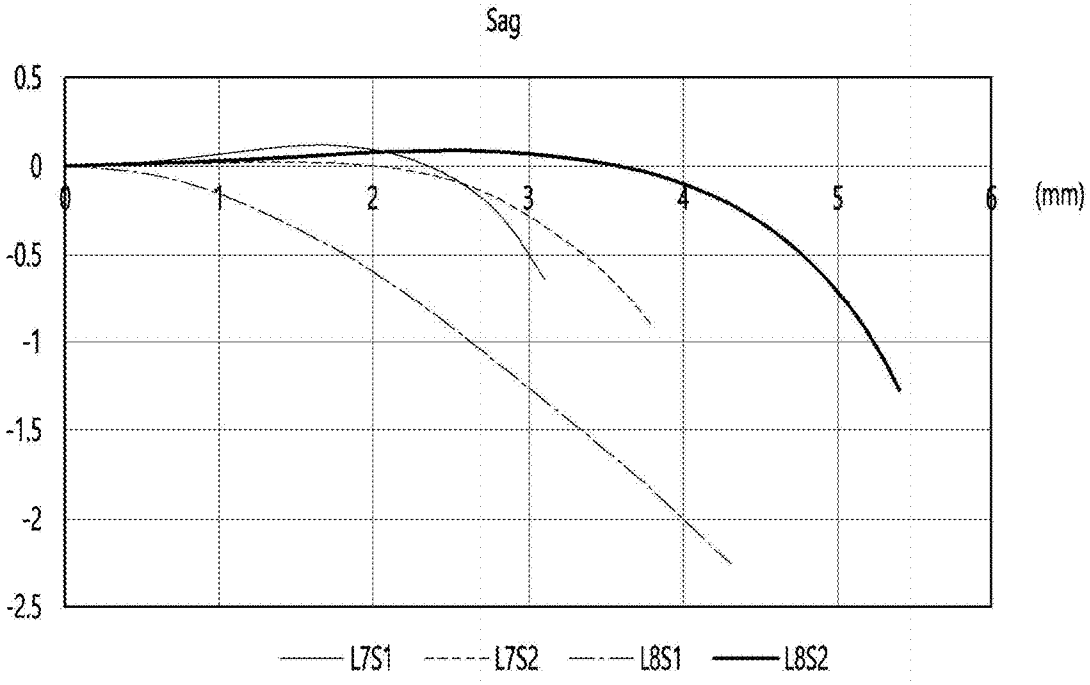
FIG. 7 is a graph showing the height of the optical axis direction according to the distance in the first direction Y with respect to the object-side surface and the sensor-side surface of the n-th, n−1th lens in the optical system of FIG. 1.

FIG. 1 is a block diagram of an optical system according to a first embodiment, FIG. 2 is a diagram illustrating a relationship between an image sensor, an n-th lens, and an n−1th lens in the optical system of FIG. 1, FIG. 3 shows data on the aspheric coefficient of each lens surface in the optical system of FIG. 1, FIG. 4 shows data according to the distances in a first direction Y with respect to the thickness of each lens and the distances between two adjacent lenses in the optical system of FIG. 1, FIG. 5 is a graph of the diffraction MTF of the optical system of FIG. 1, FIG. 6 is a graph showing the aberration characteristics of the optical system of FIG. 1, and FIG. 7 is a graph showing the height of the optical axis direction according to the distance in the first direction Y with respect to the object-side surface and the sensor-side surface of the n-th, n−1th lens in the optical system of FIG. 1.

Referring to FIGS. 1 and 2, the optical system 1000 according to the first embodiment includes a plurality of lenses 100, and the plurality of lenses 100 include a first lens 101, a second lens 102, a third lens 103, a fourth lens 104, a fifth lens 105, a sixth lens 106, a seventh lens 107, and an eighth lens 108. The first to eighth lenses 101-108 may be sequentially aligned along the optical axis OA of the optical system 1000. Light corresponding to object information may pass through the first lens 101, the second lens 102, the third lens 103, the fourth lens 104, the fifth lens 105, the sixth lens 106, the seventh lens 107, and the eighth lens 108 to be incident on the image sensor 300.

The first lens 101 may have positive (+) refractive power on the optical axis OA. The first lens 101 may include plastic or glass. For example, the first lens 101 may be made of plastic. The first lens 101 may include a first surface S1 defined as an object-side surface and a second surface S2 defined as a sensor-side surface. On the optical axis OA, the first surface S1 may have a convex shape, and the second surface S2 may have a concave shape. That is, the first lens 101 may have a meniscus shape that is convex from the optical axis OA toward the object. At least one of the first surface S1 and the second surface S2 may be an aspherical surface. For example, both the first surface S1 and the second surface S2 may be aspherical. The aspheric coefficients of the first and second surfaces S1 and S2 are provided as shown in FIG. 4, where L1 is the first lens 101 and S1/S2 represent the first/second surfaces of L1.

The second lens 102 may have positive (+) or negative (−) refractive power on the optical axis OA. The second lens 102 may have negative (−) refractive power. The second lens 102 may include plastic or glass. For example, the second lens 102 may be made of plastic. The second lens 102 may include a third surface S3 defined as an object-side surface and a fourth surface S4 defined as a sensor-side surface. On the optical axis OA, the third surface S3 may have a concave shape, and the fourth surface S4 may have a concave shape. That is, the second lens 102 may have a concave shape on both sides on the optical axis OA. Differently, the third surface S3 on the optical axis OA may have a convex shape. At least one of the third surface S3 and the fourth surface S4 may be an aspherical surface. For example, both the third surface S3 and the fourth surface S4 may be aspherical. The aspheric coefficients of the third and fourth surfaces S3 and S4 are provided as shown in FIG. 4, where L2 is the second lens 102, and S1/S2 of L2 represent the first/second surfaces of L2.

The third lens 103 may have positive (+) refractive power on the optical axis OA. The third lens 103 may include plastic or glass. For example, the third lens 103 may be made of plastic. The third lens 103 may include a fifth surface S5 defined as an object-side surface and a sixth surface S6 defined as a sensor-side surface. On the optical axis OA, the fifth surface S5 may have a convex shape, and the sixth surface S6 may have a convex shape. That is, the third lens 103 may have a shape in which both sides are convex on the optical axis OA. Alternatively, the fifth surface S5 at the optical axis OA may have a concave shape. At least one of the fifth surface S5 and the sixth surface S6 may be an aspherical surface. For example, both the fifth surface S5 and the sixth surface S6 may be aspherical. The aspheric coefficients of the fifth and sixth surfaces S5 and S6 are provided as shown in FIG. 4, where L3 is the third lens 103, and S1/S2 of L3 represent the first/second surfaces of L3.

The first lens group G1 may include the first to third lenses 101, 102, and 103. Among the first to third lenses 101, 102, and 103, the thickness at the optical axis OA, that is, the center thickness of the lens, may be the thickest for the third lens 103, and the thinnest for the second lens 102. Accordingly, the optical system 1000 can control incident light and have improved aberration characteristics and resolution.

Among the first to third lenses 101, 102, and 103, the average size (clear aperture, CA) of the effective aperture of the lenses may be the smallest for the second lens 102, and the largest for the first lens 101. In detail, among the first to third lenses 101, 102, and 103, the effective aperture H1 of the first surface S1 may be the largest, the effective aperture H2 of the fourth surface S4 of the second lens 102 or the effective aperture of the fifth surface S5 of the third lens 103 may be smaller than the effective aperture of the sixth surface S6, and one of the fourth and fifth surfaces S4 and S5 may be the smallest effective aperture. Additionally, the effective aperture of the second lens 102 is smaller than the effective aperture of the first and third lenses 101 and 103, and may be the smallest among the lenses of the optical system 1000. The size of the effective aperture is the average value of the effective aperture of the object-side surface and the effective aperture of the sensor-side surface of each lens. Accordingly, the optical system 1000 can have improved chromatic aberration control characteristics, and the vignetting characteristics of the optical system 1000 can be improved by controlling incident light.

The refractive index of the second lens 102 may be greater than the refractive index of on least one or both of the first and third lenses 101 and 103. The refractive index of the second lens 102 may be greater than 1.6, and the refractive index of the first and third lenses 101 and 103 may be less than 1.6. The third lens 102 may have an Abbe number that is smaller than the Abbe number of at least one or both of the first and third lenses 101 and 103. For example, the Abbe number of the second lens 102 may be smaller than the Abbe number of the first and third lenses 101 and 103 by a difference of 20 or more. In detail, Abbe number of the first and third lenses 101 and 103 may be 30 or more greater than the Abbe number of the second lens 102. Accordingly, the optical system 1000 may have improved chromatic aberration control characteristics.

When expressed as an absolute value, the curvature radius of the third surface S3 of the second lens 102 may be the largest among the first to third lenses 101, 102, and 103, and the curvature radius of the third surface S3 of the first lens 101 may be the largest. The curvature radius of surface S1 may be the smallest. In the first lens group G1, the difference between the lens surface with the maximum curvature radius and the lens surface with the minimum curvature radius may be 100 times or more.

The fourth lens 104 may have positive (+) or negative (−) refractive power on the optical axis OA. The fourth lens 104 may have negative refractive power. The fourth lens 104 may include plastic or glass. For example, the fourth lens 104 may be made of plastic. The fourth lens 104 may include a seventh surface S7 defined as an object-side surface and an eighth surface S8 defined as a sensor-side surface. On the optical axis OA, the seventh surface S7 may have a concave shape, and the eighth surface S8 may have a convex shape. That is, the fourth lens 104 may have a meniscus shape that is convex on the optical axis OA toward the sensor. Alternatively, the seventh surface S7 may have a convex shape on the optical axis OA, and the eighth surface S8 may have a convex shape on the optical axis OA. That is, the fourth lens 104 may have a shape in which both sides are convex on the optical axis OA. Alternatively, the seventh surface S7 may have a convex shape on the optical axis OA, and the eighth surface S8 may have a concave shape on the optical axis OA. That is, the fourth lens 104 may have a meniscus shape that is convex on the optical axis OA toward the object. Alternatively, the seventh surface S7 may have a concave shape on the optical axis OA, and the eighth surface S8 may have a concave shape on the optical axis OA. That is, the fourth lens 104 may have a concave shape on both sides of the optical axis OA. At least one of the seventh surface S7 and the eighth surface S8 may be an aspherical surface. For example, both the seventh surface S7 and the eighth surface S8 may be aspherical. The aspheric coefficients of the seventh and eighth surfaces S7 and S8 are provided as shown in FIG. 4, where LA is the fourth lens 104, and S1/S2 of LA represent the first/second surfaces of L4.

The refractive index of the fourth lens 104 may be greater than that of the third lens 103. The fourth lens 104 may have a smaller Abbe number than the third lens 103. For example, the Abbe number of the fourth lens 104 may be about 20 or more, for example, 25 or more less than the Abbe number of the third lens 103. Accordingly, the optical system 1000 may have improved chromatic aberration control characteristics.

The fifth lens 105 may have positive (+) or negative (−) refractive power on the optical axis OA. The fifth lens 105 may have positive (+) refractive power. The fifth lens 105 may include plastic or glass. For example, the fifth lens 105 may be made of plastic.

The fifth lens 105 may include a ninth surface S9 defined as an object-side surface and a tenth surface S10 defined as a sensor-side surface. The ninth surface S9 may have a concave shape on the optical axis OA, and the tenth surface S10 may have a convex shape on the optical axis OA. That is, the fifth lens 105 may have a meniscus shape that is convex on the optical axis OA toward the sensor. The fifth lens 105 may include at least one inflection point. In detail, at least one or both of the ninth surface S9 and the tenth surface S10 may include an inflection point. At least one of the ninth surface S9 and the tenth surface S10 may be an aspherical surface. For example, both the ninth surface S9 and the tenth surface S10 may be aspherical. The aspherical coefficients of the ninth and tenth surfaces S9 and S10 are provided as shown in FIG. 4, where L5 is the fifth lens 105, and S1/S2 of L5 represent the first/second surfaces of L5.

The sixth lens 106 may have positive (+) or negative (−) refractive power on the optical axis OA. The sixth lens 106 may have positive (+) refractive power. The sixth lens 106 may include plastic or glass. For example, the sixth lens 106 may be made of plastic. The sixth lens 106 may include an eleventh surface S11 defined as an object-side surface and a twelfth surface S12 defined as a sensor-side surface. The eleventh surface S11 may have a convex shape on the optical axis OA, and the twelfth surface S12 may have a concave shape on the optical axis OA. That is, the sixth lens 106 may have a meniscus shape that is convex from the optical axis OA toward the object. Alternatively, the eleventh surface S11 may have a concave shape on the optical axis OA, or the twelfth surface S12 may have a convex shape on the optical axis OA. That is, the sixth lens 106 may have a concave or convex shape on both sides of the optical axis OA. Alternatively, the sixth lens 106 may have a meniscus shape that is convex toward the sensor. At least one of the eleventh surface S11 and the twelfth surface S12 may be an aspherical surface. For example, both the eleventh surface S11 and the twelfth surface S12 may be aspherical. The aspheric coefficients of the eleventh and twelfth surfaces S11 and S12 are provided as shown in FIG. 4, where L6 is the sixth lens 106, and S1/S2 of L6 represent the first/second surfaces of L6.

The seventh lens 107 may have positive (+) or negative (−) refractive power on the optical axis OA. The seventh lens 107 may have positive (+) refractive power. The seventh lens 107 may include plastic or glass. For example, the seventh lens 107 may be made of plastic. The seventh lens 107 may include a thirteenth surface S13 defined as an object-side surface and a fourteenth surface S14 defined as a sensor-side surface. The thirteenth surface S13 may have a convex shape on the optical axis OA, and the fourteenth surface S14 may have a concave shape on the optical axis OA. That is, the seventh lens 107 may have a meniscus shape that is convex on the optical axis OA toward the object. Alternatively, the thirteenth surface S13 may have a concave shape on the optical axis OA or the fourteenth surface S14 may have a convex shape on the optical axis OA, that is, the seventh lens 107 May have a concave or convex shape at both sides at the optical axis OA. Alternatively, the seventh lens 107 may have a meniscus shape that is convex toward the sensor.

The seventh lens 107 may have at least one inflection point on both the thirteenth surface S13 and the fourteenth surface S14 from the optical axis OA to the end of the effective region. The inflection point of the thirteenth surface S13 may be located at a position greater than 45% of the effective radius of the thirteenth surface S13 based on the optical axis OA, for example, in the range of 45% to 65%. The inflection point of the fourteenth surface S14 may located at a position greater than 30% of the effective radius of the fourteenth surface S14, which is the distance from the optical axis OA to the end of the effective region, for example, in the range of 30% to 43%. The inflection point of the fourteenth surface S14 may be located closer to the optical axis OA than the inflection point of the thirteenth surface S13. Accordingly, the fourteenth surface S14 may diffuse the light incident through the thirteenth surface S13. The fourteenth surface S14 may be provided without an inflection point. The inflection point may be a point at which the sign of the slope value in the direction perpendicular to the optical axis OA and the optical axis OA changes from positive (+) to negative (−) or negative (−) to positive (+), and may mean a point at which the slope value is 0. Additionally, the inflection point may be a point where the slope value of a tangent line passing through the lens surface decreases as the value increases, or a point where it decreases and then increases. The position of the inflection point of the seventh lens 107 may be placed at a position that satisfies the above-mentioned range in consideration of the optical characteristics of the optical system 1000. In detail, it is desirable that the position of the inflection point satisfies the above-mentioned range for controlling optical characteristics such as chromatic aberration, distortion characteristics, aberration characteristics, and resolution of the optical system 1000. Accordingly, the path of light emitted to the image sensor 300 through the lens can be effectively controlled. Accordingly, the optical system 1000 according to the embodiment may have improved optical characteristics even in the center and periphery portions of the FOV. At least one of the thirteenth surface S13 and the fourteenth surface S14 may be an aspherical surface. For example, both the thirteenth surface S13 and the fourteenth surface S14 may be aspherical. The aspheric coefficients of the thirteenth and fourteenth surfaces S13 and S14 are provided as shown in FIG. 4, where L7 is the seventh lens 107, and S1/S2 of L7 represent the first/second surfaces of L7.

The eighth lens 108 may have negative refractive power on the optical axis OA. The eighth lens 108 may include plastic or glass. For example, the eighth lens 108 may be made of plastic. The eighth lens 108 may be the closest lens or the last lens to the sensor in the optical system 1000. The eighth lens 108 may include a fifteenth surface S15 defined as an object-side surface and a sixteenth surface S16 defined as a sensor-side surface. The fifteenth surface S15 may have a concave shape on the optical axis OA, and the sixteenth surface S16 may have a concave shape on the optical axis OA. That is, the eighth lens 108 may have a concave shape on both sides at the optical axis OA. Differently, the sixteenth surface S16 of the eighth lens 108 may be convex and may have a meniscus shape convex toward the sensor.

The fifteenth surface S15 of the eighth lens 108 may be provided without an inflection point from the optical axis OA to the end of the effective region. The inflection point P1 (see FIG. 2) of the sixteenth surface S16 may be a distance dP1 (see FIG. 2) of more than 40% of the effective radius of the sixteenth surface S16, which is the distance from the optical axis OA to the end of the effective region, and may be located in the range of 40% to 51%. Accordingly, the sixteenth surface S16 can diffuse the light incident through the fifteenth surface S15. Alternatively, the fifteenth surface S15 may have at least one inflection point. A region in which a height (i.e., an optical axis height) from the center of the sixteenth surface 16 to the sixteenth surface S16 has a value (Sag value) of less than 0.1 mm as an absolute value, based on a straight line extending in the first and second directions X and Y or in the radial direction, may range of a position of 55% or more of the effective radius of the sixteenth surface S16 from the optical axis OA, for example, in a range of 55% to 75% or 65% to 75%. Accordingly, by lowering the Sag value of the sixteenth surface S16, the distance between the last lens 108 and the image sensor 300 can be reduced, or the total optical length can be reduced. Here, the distance from the inflection point P1 of the sixteenth surface S16 to the image sensor 300 is closest, and as the region is adjacent to the end of the effective region or the optical axis OA from the inflection point P1, the distance from the sixteenth surface S16 to the image sensor 300 may gradually increase. The position of the inflection point is preferably arranged in consideration of the optical characteristics of the optical system 1000. In detail, it is desirable that the position of the inflection point satisfies the above-mentioned range for controlling optical characteristics such as chromatic aberration, distortion characteristics, aberration characteristics, and resolution of the optical system 1000. Accordingly, the path of light emitted to the image sensor 300 through the lens can be effectively controlled. Accordingly, the optical system 1000 according to the embodiment may have improved optical characteristics even in the center and periphery portions of the FOV. At least one of the fifteenth surface S15 and the sixteenth surface S16 may be an aspherical surface. For example, both the fifteenth surface S15 and the sixteenth surface S16 may be aspherical. The aspherical coefficients of the fifteenth and sixteenth surfaces S15 and S16 are provided as shown in FIG. 4, where L8 is the eighth lens 108, and S1/S2 of L8 represent the first/second surfaces of L8.

Figure 9:
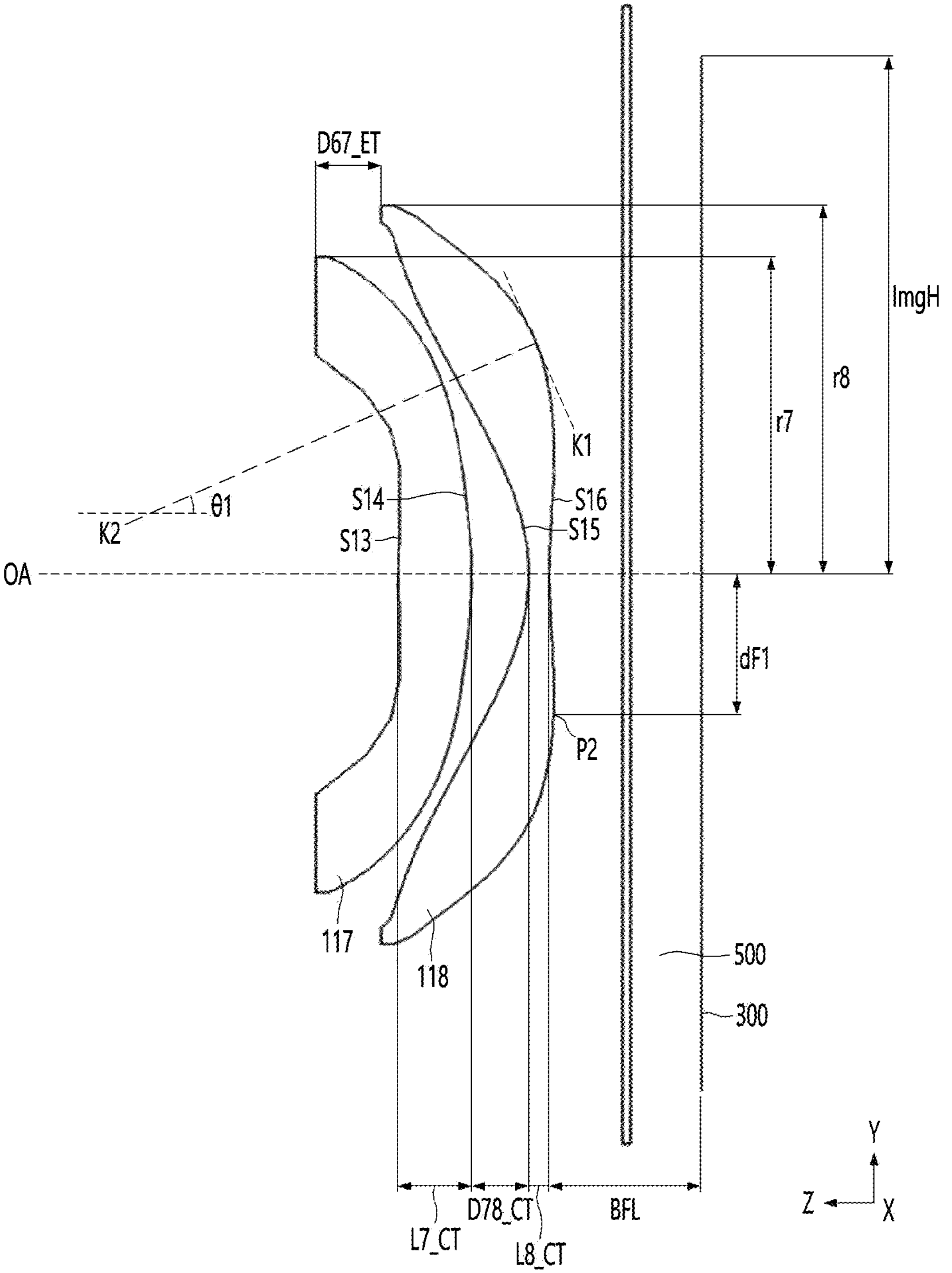
FIG. 9 is an explanatory diagram showing the relationship between the image sensor, the n-th lens, and the n−1-th lens in the optical system of FIG. 8.

Referring to FIGS. 2 and 9, a normal line K2 passing through an arbitrary point on the sensor-side sixteenth surface S16 of the eighth lens 108 and 118, which is the last lens, may have at a predetermined angle θ1 with the optical axis OA. The maximum inclination angle θ1 of the sixteenth surface S16 may be less than 60 degrees. In FIGS. 2 and 9, r7 is an effective radius of the fourteenth surface S14 of the seventh lens 107 and 117, and r8 is an effective radius of the sixteenth surface S16 of the eighth lens 108 and 118.

FIG. 7 is a graph showing the height (Sag value) in the optical axis direction according to the distance in the first direction Y with respect to the object-side thirteenth and fifteenth surfaces S13 and S15 and the sensor-side fourteenth and sixteenth surfaces S14 and S16 in the seventh and eighth lenses 107 and 108 of FIG. 2, and in the figure, L7S1 is the thirteenth surface, L7S2 is the fourteenth surface, L8S1 is the fifteenth surface, and L8S2 is the sixteenth surface. As shown in FIG. 7, it can be seen that the height of the sixteenth surface L8S2 above extends along a straight line orthogonal to the center (0) of the sixteenth surface L8S2 from the optical axis to a position of 3.9 mm, and an inflection point exists within 3.9 mm. The horizontal axis in FIG. 7 represents the distance from the center (0) to the diagonal end of the image sensor, and the vertical axis represents the height (mm).

Referring to FIGS. 2 and 7, a curvature radius of the sixteenth surface S16 of the eighth lens 108 has a positive value on the optical axis OA, a second straight line passing from the center of the sixteenth surface S16 to the surface of the sixteenth surface S16 with respect to the center of the sixteenth surface S16 or a reference first straight line orthogonal to the optical axis OA may have a slope, and the slope of the second straight line in the optical axis OA may be less than a maximum of 60 degrees. Accordingly, since it has the minimum Sag value in the optical axis or paraxial region of the sixteenth surface S16, a slim optical system can be provided.

The second lens group G2 may include the fourth to eighth lenses 104, 105, 106, 107, and 108. Among the fourth to eighth lenses 104, 105, 106, 107, and 108, the lens with the maximum center thickness may be smaller than the center distance between the third and fourth lenses 103 and 104. In the second lens group G2, the lens with the maximum center thickness may be the fifth lens 105, and the lens with the minimum center thickness may be the fourth lens 104. Accordingly, the optical system 1000 can control incident light and have improved aberration characteristics and resolution. Among the fourth to eighth lenses 104, 105, 106, 107, and 108, the average size (clear aperture, CA) of the effective apertures of the lenses may be the smallest for the fourth lens 104, and the largest for the eighth lens 108. In detail, in the second lens group G2, the effective aperture of the seventh surface S7 of the fourth lens 104 may be the smallest, and the effective aperture of the sixteenth surface S16 may be the largest. The effective aperture of the sixteenth surface S16 may be 2.5 times or more than the effective aperture of the seventh surface S7. In the second lens group G2, the number of lenses with a refractive index exceeding 1.6 may be smaller than the number of lenses with a refractive index of less than 1.6. In the second lens group G2, the number of lenses with an Abbe number greater than 50 may be smaller than the number of lenses with an Abbe number of less than 50.

In FIG. 2, back focal length (BFL) is the optical axis distance from the image sensor 300 to the last lens. That is, BFL is the optical axis distance between the image sensor 300 and the sensor-side sixteenth surface S16 of the eighth lens 108. L7_CT is the center thickness or optical axis thickness of the seventh lens 107, and L7_ET is the end or edge thickness of the effective region of the seventh lens 107. L8_CT is the center thickness or optical axis thickness of the eighth lens 108, and L8_ET is the end or edge thickness of the effective region of the eighth lens 108. The edge thickness L7_ET of the seventh lens 107 is the distance in the optical axis direction from the end of the effective region of the thirteenth surface S13 to the effective region of the fourteenth surface S14. The edge thickness L8_ET of the eighth lens 108 is the distance in the optical axis direction from the end of the effective region of the fifteenth surface S15 to the effective region of the sixteenth surface S16. D78_CT is the optical axis distance (i.e., center distance) from the center of the sensor-side surface of the seventh lens 107 to the center of the object-side surface of the eighth lens 108. That is, the optical axis distance D78_CT from the center of the sensor-side surface of the seventh lens 107 to the center of the object-side surface of the eighth lens 108 is a distance between the fourteenth surface S14 and the fifteenth surface S15 in the optical axis OA. D78_ET is a distance (i.e., edge distance) in the optical axis direction from the edge of the sensor-side surface of the seventh lens 107 to the edge of the sensor-side surface of the eighth lens 108. That is, D78_ET is the distance in the optical axis direction between a straight line extending in the circumferential direction from the end of the effective region of the fourteenth surface S14 and the end of the effective region of the fifteenth surface S15.

In this way, the center thickness, edge thickness, and center distance and edge distance between two adjacent lenses of the first to eighth lenses 101-108 can be set. For example, as shown in FIG. 3, a distance between adjacent lenses may be provided, for example, in a region spaced at a predetermined distance (e.g., 0.1 mm) along the first direction Y with respect to the optical axis OA, and may be represented as a first distance D12 between the first and second lenses 101 and 102, a second distance D23 between the second and third lenses 102 and 103, a third distance D34 between the third and fourth lenses 103 and 104, a fourth distance D45 between the fourth and fifth lenses 104 and 105, a fifth distance D56 between the fifth and sixth lenses 105 and 106, a sixth distance D67 between the sixth and seventh lenses 106 and 107, and a distance D78 between the seventh and eighth lenses 107 and 108. In the description of FIGS. 3 and 10, The first direction Y may include a circumferential direction centered on the optical axis OA or two directions orthogonal to each other, and the distance between two adjacent lenses at the end in the first direction Y may be based on the end of the effective region of the lens having a smaller effective radius, and the end of the effective radius may include an error of the end ±0.2 mm.

Referring to FIGS. 3 and 1, the thicknesses of each of the lenses L1 to L8 are shown at positions spaced apart by 0.1 mm from the optical axis OA along the first direction Y. The thickness of the first lens L1 is arranged in the range of 0.3 mm to 0.8 mm, and may gradually decrease from the optical axis OA to the end of the effective region, and the difference between the maximum and minimum values of the thickness of the first lens L1 may be less than 2 times. The first distance D12 may be a distance in the optical axis direction Z between the first lens 101 and the second lens 102 along the first direction Y. When the first distance D12 takes the optical axis OA as a starting point and the end of the effective region of the third surface S3 of the second lens 102 as an end point, the first distance D12 may gradually decrease from the optical axis OA to the end of the effective region. The maximum value in the first distance D12 may be 2 times or less, for example, 1.1 to 2 times the minimum value. Accordingly, the optical system 1000 can effectively control incident light. In detail, as the first lens 101 and the second lens 102 are spaced apart at the first distance D12 set according to their positions, light incident through the first and second lenses 101 and 102 may travel to other lenses and maintain good optical performance.

The thickness of the second lens L2 is arranged in the range of 0.20 mm to 0.37 mm, and may gradually increase from the optical axis OA to the end of the effective region, and the difference between the maximum and minimum values of the thickness of the second lens L2 may be less than 2 times, and the minimum value may be greater than the maximum value of the second distance D23. The second distance D23 may be a distance in the optical axis direction Z between the second lens 102 and the third lens 103. When the second distance D23 takes the optical axis OA as the starting point and the end of the effective region of the fifth surface S5 of the third lens 103 as the end point, the maximum value of the second distance D23 is located in the range of 35%±3% of the effective radius, and can gradually decrease from its maximum value toward the optical axis OA or the end of the effective region. The second distance D23 at the optical axis OA may be more than twice as large as the second distance D23 at the end. As the second lens 102 and the third lens 103 are spaced apart at a second distance D23 set according to their positions, the aberration characteristics of the optical system 1000 can be improved. The maximum value of the first distance D12 may be more than twice the maximum value of the second distance D23, and the minimum value of the first distance D12 may be greater than the maximum value of the second distance D23.

The maximum value of the thickness of the third lens L3 may be less than the maximum value of the third distance D34 and the minimum value may be less than the maximum value and greater than the minimum value of the third distance D34. The thickness of the third lens L3 may be, for example, in the range of 0.70 mm to 0.85 mm. The first lens group G1 and the second lens group G2 may be spaced apart by the third distance D34. The third distance D34 may be a distance in the optical axis direction Z between the third lens 103 and the fourth lens 104. When the third distance D34 takes the optical axis OA as the starting point and the end of the effective region of the sixth surface S6 of the third lens 103 as the end point in the first direction Y, the third distance D34 has a maximum value located at 31%±3% of the effective radius, and may gradually decrease toward the optical axis OA or the end point at the point of the maximum value. That is, the third distance D34 may be larger than the distance at the end point of the optical axis OA, and the maximum value may be 1.1 times or more and the minimum value may be in the range of 1.1 to 2 times. The maximum value of the third distance D34 may be three times or more, for example, three to seven times the maximum value of the first distance D12, and the minimum value may be 1.5 times or more, for example, 1.5 to 2.5 times greater than the maximum value of the second distance D23. Accordingly, the optical system 1000 may have improved optical characteristics. In detail, as the third lens 103 and the fourth lens 104 are spaced apart at the third distance D34 set according to their positions, the optical system 1000 may have improved chromatic aberration characteristics. Additionally, the optical system 1000 can control vignetting characteristics.

The maximum value of the thickness of the fourth lens LA may be greater than the maximum value of the fourth distance D45 and the minimum value may be greater than the maximum value of the fourth distance D45. For example, the minimum thickness of the fourth lens L4 may be 0.25 mm or more, and the difference between the maximum and minimum thickness may be 0.15 mm or less. The fourth distance D45 may be a distance in the optical axis direction Z between the fourth lens 104 and the fifth lens 105. When the optical axis OA is the starting point and the end of the effective region of the eighth surface S8 of the fourth lens 104 is an end point, the fourth distance D45 may be changed from the starting point to the ending point to the decreasing and then increasing again. The minimum value of the fourth distance D45 may be located at 66%±3% of the optical axis OA, and the maximum value may be located at the optical axis OA or a starting point and an end point. Here, the difference between the maximum and minimum values of the fourth distance D45 may be 0.1 mm or less. The maximum value of the fourth distance D45 may be 1.3 times greater than the maximum value of the first distance D12, and the minimum value may be 1.1 times greater than the maximum value of the first distance D12. As the fourth lens 104 and the fifth lens 105 are spaced apart at the fourth distance D45 set according to their positions, the optical system 1000 can have good optical performance in the center and periphery portions of the FOV, improved chromatic aberration and distortion aberration can be controlled.

The maximum value of the thickness of the fifth lens L5 is located on the optical axis OA, and may be smaller than the maximum value of the fifth distance D56, and the minimum value may be smaller than the maximum value of the fifth distance D56, the minimum value may be 0.5 or more, and the difference between the maximum and minimum values can be 0.2 mm or less. The fifth distance D56 may be distance in the optical axis direction Z between the fifth lens 105 and the sixth lens 106. When the fifth distance D56 takes the optical axis OA as the starting point and the end of the effective region of the tenth surface S10 of the fifth lens 105 as the end point, the fifth distance D56 may gradually increase from the optical axis OA to the end in the first direction Y perpendicular to the optical axis OA. The minimum value of the fifth distance D56 may be located at the optical axis OA or a starting point, and the maximum value may be located at an edge or an end point. The maximum value of the fifth distance D56 may be 10 times or more, for example, 10 to 40 times the minimum value, and may be greater than the minimum value of the third distance D34, and the minimum value may be greater than the minimum value of the fourth distance D56. The optical performance of the optical system can be improved by this fifth distance D56.

The maximum value of the thickness of the sixth lens L6 is located at the end of the effective region and may be smaller than the minimum value of the sixth distance D67, the minimum value is 0.5 mm or more, and the difference between the maximum and minimum values may be 0.2 mm or less. The sixth distance D67 may be a distance in the optical axis direction between the sixth lens 106 and the seventh lens 107. When the optical axis OA is the starting point and the end of the effective region of the twelfth surface S12 of the sixth lens 106 is the end point, the minimum value of the sixth distance D67 is located at the end, and the maximum value is located at 51%±3% of the effective radius based on the optical axis OA, and the sixth distance D67 can gradually decrease from the maximum value toward the optical axis or end. The maximum value of the sixth distance D67 may be 1.1 times or more, for example, 1.1 to 2 times the minimum value. The maximum value of the sixth distance D67 may be greater than the maximum value of the third distance D34, and the minimum value may be less than the maximum value of the third distance D34 and greater than the minimum value. Aberration control characteristics can be improved by the sixth distance D67, and the size of the effective aperture of the eighth lens 108 can be appropriately controlled.

The maximum value of the thickness of the seventh lens L7 is located at the end of the effective region, and may be greater than and less than the maximum value of the seventh distance D78, the minimum value is 0.6 mm or more, and the difference between the maximum and minimum values may be 0.5 mm or less. The seventh distance D78 may be a distance in the optical axis direction between the seventh lens 107 and the eighth lens 108. When the seventh distance D78 takes the optical axis OA as the starting point and the end of the effective region of the fourteenth surface S14 of the seventh lens 107 as the end point, the maximum value of the seventh distance D78 is located at the optical axis, and the minimum value is located at 86%±3% of the distance from the optical axis to the end of the effective region, and the seventh distance D78 may gradually increase from the minimum value to the maximum value and the end. The maximum value of the seventh distance D78 may be two times or more, for example, two to three times the minimum value. Accordingly, the optical system 1000 may have improved optical characteristics in the center and periphery portions of the FOV. Aberration control characteristics can be improved by the seventh distance D78, and the size of the effective aperture of the eighth lens 108 can be appropriately controlled. In addition, the optical system 1000 can improve the distortion and aberration characteristics of the periphery portion of the FOV as the seventh lens 107 and the eighth lens 108 are spaced apart at a seventh distance D78 set according to the position.

The maximum value of the thickness of the eighth lens L8 is located at the end of the effective region and may be greater than the maximum value of the seventh distance D78, the minimum value is 0.4 mm or more, and the difference between the maximum and minimum values may be 1.5 mm or more.

The lens with the thickest center thickness in the first lens group G1 may be thicker than the lens with the thickest center thickness in the second lens group G2. Among the first to eighth lenses 101-108, the maximum center thickness may be smaller than the maximum center distance, for example, less than 1 time or in the range of 0.5 to 0.99 times the maximum center distance. For example, the center thickness of the first lens 101 is the largest among the lenses, and the center distance D78_CT between the seventh lens 107 and the eighth lens 108 is the largest among the distances between the lenses. The maximum thickness of the center of the seventh lens 107 may be 75% or less of the center distance between the seventh and eighth lenses 107 and 108, for example, in the range of 50% to 75%.

The effective aperture H8 (see FIG. 1) of the sixteenth surface S16 of the eighth lens 108, which has the largest effective aperture among the plurality of lenses 100, may be in the range of 2.5 times or more the effective aperture size of the fifth surface S5, for example, 2.5 to 4 times. Among the plurality of lenses 100, the eighth lens 108, which has the largest average effective aperture, may be 2.5 times or more than that of the second lens 102, which has the smallest effective aperture average, for example, in a range of 2.5 to 4 times or 2.5 to 3.5 times. The size of the effective aperture of the eighth lens 108 is the largest, so that incident light can be effectively refracted toward the image sensor 300. Accordingly, the optical system 1000 can have improved chromatic aberration control characteristics, and the vignetting characteristics of the optical system 1000 can be improved by controlling incident light.

The refractive index of the sixth lens 106 may be greater than that of the seventh and eighth lenses 107 and 108. The refractive index of the sixth lens 106 may be greater than 1.6, and the refractive index of the seventh and eighth lenses 107 and 108 may be less than 1.6. The sixth lens 106 may have an Abbe number that is smaller than the Abbe numbers of the seventh and eighth lenses 107 and 108. For example, the Abbe number of the sixth lens 106 may be small and has a difference of 20 or more from the Abbe number of the seventh and eighth lenses 107 and 108. In detail, the Abbe number of the seventh and eighth lenses 107 and 108 may be 30 or more greater than the Abbe number of the sixth lens 106, for example, 50 or more. Accordingly, the optical system 1000 may have improved chromatic aberration control characteristics.

Among the lenses 101-108, the maximum center thickness may be 2.5 times or more, for example, 2.5 to 5 times the minimum center thickness. The third lens 103 having the maximum center thickness may be thicker than the second lens 102 having the minimum center thickness by 2.5 times or more, for example, 2.5 to 4 times. Among the plurality of lenses 100, the number of lenses with a center thickness of less than 0.5 mm may be equal to the number of lenses with a center thickness of 0.5 mm or more. Accordingly, the optical system 1000 can be provided in a structure with a slim thickness. Among the plurality of lens surfaces S1-S16, the number of surfaces with an effective radius of less than 2 mm may be equal to or greater than the number of surfaces with an effective radius of 2 mm or more. If the curvature radius is described as an absolute value, the curvature radius of the third surface S3 of the second lens 102 among the plurality of lenses 100 may be the largest among the lens surfaces at the optical axis OA, and the curvature radius of the third surface S3 of the second lens 102 may be the largest among the lens surfaces on the optical axis OA, and the curvature radius of the fifteenth surface S15 of the eight lens 108 may be the smallest among the lens surfaces at the optical axis OA. When the focal length is described as an absolute value, among the plurality of lenses 100, the focal length of the sixth lens 106 may be the largest among the lenses, the focal length of the eighth lens 108 may be the smallest, and the maximum focal length may be 100 times or more the minimum focus distance.

Table 1 is an example of lens data of the optical system of FIG. 1.

TABLE 1

| Lens | Surface | Curvature radius (mm) | Thickness (mm)/ Distance (mm) | Refractive index | Abbe number | Effective aperture (mm) |
|---|---|---|---|---|---|---|
| Lens 1 | S1 | 3.228 | 0.689 | 1.534 | 55.700 | 3.300 |
| | S2 | 8.075 | 0.162 | | | 3.057 |
| Lens 2 | S3 | −9,072.478 | 0.220 | 1.668 | 18.363 | 2.985 |
| | S4 | 16.051 | 0.068 | | | 2.857 |
| Lens 3 | S5 (Stop) | 12.573 | 0.817 | 1.534 | 55.700 | 2.854 |
| | S6 | −29.696 | 0.729 | | | 3.126 |
| Lens 4 | S7 | −147.280 | 0.251 | 1.690 | 17.000 | 3.386 |
| | S8 | 32.380 | 0.232 | | | 3.657 |
| Lens 5 | S9 | −26.623 | 0.668 | 1.559 | 40.794 | 3.786 |
| | S10 | −8.262 | 0.025 | | | 4.200 |
| Lens 6 | S11 | 23.814 | 0.291 | 1.624 | 22.480 | 5.089 |
| | S12 | 23.748 | 0.906 | | | 5.819 |
| Lens 7 | S13 | 5.801 | 0.625 | 1.534 | 55.700 | 6.347 |
| | S14 | 27.036 | 1.630 | | | 7.591 |
| Lens 8 | S15 | −3.005 | 0.476 | 1.534 | 55.700 | 8.503 |
| | S16 | 19.238 | 0.181 | | | 11.154 |
| Filter | | Infinity | 0.110 | | | 14.548 |
| | | Infinity | 0.713 | | | 14.658 |
| Image sensor | | Infinity | | | | 16.005 |

Table 1 shows the curvature radius, the thickness of the lenses, the distance between the lenses on the optical axis OA of the first to eighth lenses 101-108 of FIG. 1, the refractive index at d-line, Abbe Number, and effective aperture (CA: Clear aperture). In the optical system of the first embodiment, the sum of the refractive indices of the plurality of lenses 100 is 10 or more. For example, in a range of 10 to 15, the sum of the Abbe numbers is 300 or more, for example, in the range of 300 to 350, the sum of the center thicknesses of the entire lens is 4.5 mm or less, for example, in the range of 3.5 mm to 4.5 mm, and the sum of the first to seventh distances D12, D23, D34, D45, D56, D67, and D78 on the optical axis is 5 mm or less and is smaller than the sum of the center thicknesses of the lens, and may range from 3.4 mm to 4.5 mm. In addition, the average effective diameter of each lens surface of the plurality of lenses 100 may be 4 mm or more, for example, in the range of 4 mm to 6 mm, and the average of the center thickness of each lens may be 0.6 mm or less, for example, in the range of 0.4 mm to 0.6 mm.

As shown in FIG. 4, in the first embodiment, at least one lens surface among the plurality of lenses 100 may include an aspherical surface with a 30th order aspherical coefficient. For example, the first to eighth lenses 101, 102, 103, 104, 105, 106, 107, and 108 may include a lens surface having a 30th order aspheric coefficient. As described above, an aspheric surface with a 30th order aspherical coefficient (a value other than "0") can particularly significantly change the aspherical shape of the peripheral portion, so the optical performance of the peripheral portion of the FOV can be well corrected.

FIG. 5 is a graph showing the diffraction MTF characteristics of the optical system 1000 according to the first embodiment, and FIG. 6 is a graph showing the aberration characteristics. In the aberration graph in FIG. 6, longitudinal spherical aberration, astigmatic field curves, and distortion aberration are measured from left to right. In FIG. 6, the X-axis may represent a focal length (mm) and distortion (%), and the Y-axis may mean the height of an image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in the about 555 nm wavelength band. The diffraction MTF characteristic graph is measured from F1:Diff.Limit and F1:(RIH)0.000 mm to F11:T(RIH)8.000 mm and F11: R(RIH)8.000 mm in units of about 0.800 mm to the spatial frequency range of 0.000 mm to 8.000 mm. In the diffraction MTF graph, T represents the MTF change in the spatial frequency per millimeter of the centrifugal circle, and R represents the MTF change in the spatial frequency per millimeter of the radial circle. Here, the Modulation Transfer Function (MTF) depends on the spatial frequency of the cycle per millimeter.

In the aberration diagram of FIG. 6, it may be interpreted that the closer each curve is to the Y-axis, the better the aberration correction function. Referring to FIG. 6, it may be seen that the measured values of the optical system 1000 according to the embodiment are adjacent to the Y-axis. That is, the optical system 1000 according to the embodiment may have improved resolution and good optical performance not only in the center portion of FOV but also in the periphery portion.

Second Embodiment

Figure 12:
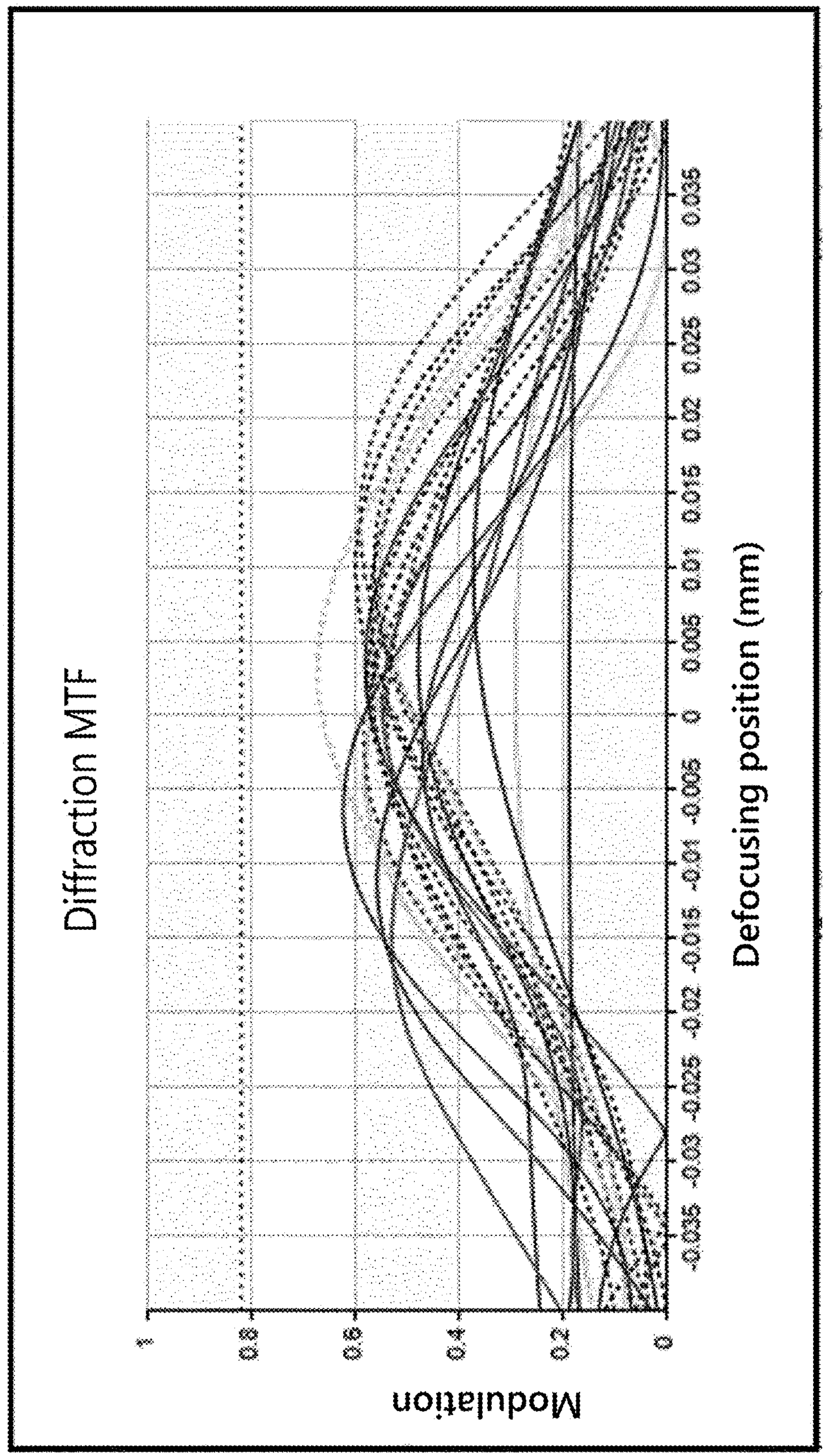
FIG. 12 is a graph of the diffraction MTF of the optical system of FIG. 8.

FIG. 8 is a configuration diagram of an optical system according to the second embodiment, FIG. 9 is an explanatory diagram showing the relationship between the image sensor, the n-th lens, and the n−1-th lens in the optical system of FIG. 8, FIG. 10 shows data on the aspheric coefficient of each lens surface in the optical system of FIG. 8, FIG. 11 shows data according to the distances in a first direction Y with respect to the thickness of each lens and the distances between two adjacent lenses in the optical system of FIG. 8, FIG. 12 is a graph of the diffraction MTF of the optical system of FIG. 8, FIG. 13 is a graph showing the aberration characteristics of the optical system of FIG. 8, and FIG. 14 is a graph showing the height of the optical axis direction according to the distance in the first direction Y with respect to the object-side surface and the sensor-side surface of the n-th, n−1th lens in the optical system of FIG. 8.

Referring to FIGS. 8 and 9, the optical system 1000 according to the second embodiment includes a plurality of lenses 100A, and the plurality of lenses 100A may include the first lens 111 to the eighth lens 118. The first to eighth lenses 111-118 may be sequentially arranged along the optical axis OA of the optical system 1000.

The first lens 111 may have positive (+) refractive power on the optical axis OA. The first lens 111 may include plastic or glass. For example, the first lens 111 may be made of plastic. On the optical axis OA of the first lens 111, the first surface S1 may have a convex shape, and the second surface S2 may have a concave shape. That is, the first lens 111 may have a meniscus shape that is convex on the optical axis OA toward the object. At least one or both of the first surface S1 and the second surface S2 may be aspherical. The aspheric coefficients of the first and second surfaces S1 and S2 are provided as shown in FIG. 11, where L1 is the first lens 111 and S1/S2 represent the first/second surfaces of L1.

The second lens 112 may have positive (+) or negative (−) refractive power on the optical axis OA. The second lens 112 may have negative (−) refractive power. The second lens 112 may include plastic or glass. For example, the second lens 112 may be made of plastic. On the optical axis OA of the second lens 112, the third surface S3 may have a convex shape, and the fourth surface S4 may have a concave shape. That is, the second lens 112 may have a meniscus shape that is convex on the optical axis OA toward the object. At least one or both of the third surface S3 and the fourth surface S4 may be aspherical. The aspheric coefficients of the third and fourth surfaces S3 and S4 are provided as shown in FIG. 11, where L2 is the second lens 112, and S1/S2 of L2 represent the first/second surfaces of L2.

The third lens 113 may have positive (+) refractive power on the optical axis OA. The third lens 113 may include plastic or glass. For example, the third lens 113 may be made of plastic. On the optical axis OA of the third lens 113, the fifth surface S5 may have a convex shape, and the sixth surface S6 may have a concave shape. That is, the third lens 113 may have a convex shape on the optical axis OA toward the object. Alternatively, the fifth surface S5 on the optical axis OA may have a concave shape. At least one or both of the fifth surface S5 and the sixth surface S6 may be aspherical. The aspheric coefficients of the fifth and sixth surfaces S5 and S6 are provided as shown in FIG. 11, where L3 is the third lens 113, and S1/S2 of L3 represent the first/second surfaces of L3.

The first lens group G1 may include the first to third lenses 111, 112, and 113. Among the first to third lenses 111, 112, and 113, the thickness at the optical axis OA, that is, the center thickness of the lens, may be the thickest for the first lens 111 and the thinnest for the second lens 112. Accordingly, the optical system 1000 can control incident light and have improved aberration characteristics and resolution. Among the first to third lenses 111, 112, and 113, the average size (clear aperture, CA) of the effective aperture of the lenses may be the smallest for the second lens 112, and the largest for the first lens 111. In detail, among the first to third lenses 111, 112, and 113, the effective aperture H1 of the first surface S1 may be the largest, and the effective aperture H2 of the fourth surface S4 of the second lens 112 or the effective aperture of the fifth surface S5 of the third lens 113 may be smaller than the effective aperture of the sixth surface S6, and one of the fourth and fifth surfaces S4 and S5 may be the smallest effective aperture. Additionally, the effective aperture of the second lens 112 is smaller than the effective aperture of the first and third lenses 111 and 113, and may be the smallest among the lenses of the optical system 1000. The size of the effective aperture is the average value of the effective aperture of the object-side surface and the effective aperture of the sensor-side surface of each lens. Accordingly, the optical system 1000 can have improved chromatic aberration control characteristics, and the vignetting characteristics of the optical system 1000 can be improved by controlling incident light.

The refractive index of the second lens 112 may be greater than the refractive index of at least one or both of the first and third lenses 111 and 113. The refractive index of the second lens 112 may be greater than 1.6, and the refractive index of the first and third lenses 111 and 113 may be less than 1.6. The third lens 112 may have an Abbe number that is smaller than the Abbe number of at least one or both of the first and third lenses 111 and 113. For example, the Abbe number of the second lens 112 may be smaller than the Abbe number of the first and third lenses 111 and 113 by a difference of 20 or more. In detail, the Abbe number of the first and third lenses 111 and 113 may be 30 or more greater than the Abbe number of the second lens 112. Accordingly, the optical system 1000 may have improved chromatic aberration control characteristics.

When expressed as an absolute value, the curvature radius of the third surface S3 of the second lens 112 may be the largest among the first to third lenses 111, 112, and 113, and the curvature radius of the third surface S3 of the first lens 111 may be the largest. The curvature radius of surface S1 may be the smallest. In the first lens group G1, the difference between the lens surface with the maximum curvature radius and the lens surface with the minimum curvature radius may be 100 times or more.

The fourth lens 114 may have positive (+) or negative (−) refractive power on the optical axis OA. The fourth lens 114 may have positive (+) refractive power. The fourth lens 114 may include plastic or glass. For example, the fourth lens 114 may be made of plastic. On the optical axis OA of the fourth lens 114, the seventh surface S7 may have a convex shape, and the eighth surface S8 may have a concave shape. That is, the fourth lens 114 may have a meniscus shape that is convex on the optical axis OA toward the object. Alternatively, the seventh surface S7 may have a convex shape on the optical axis OA, and the eighth surface S8 may have a convex shape on the optical axis OA. That is, the fourth lens 114 may have a shape in which both sides are convex on the optical axis OA. Alternatively, the seventh surface S7 may have a concave shape on the optical axis OA, and the eighth surface S8 may have a convex shape on the optical axis OA. That is, the fourth lens 114 may have a meniscus shape that is convex on the optical axis OA toward the sensor. Alternatively, the seventh surface S7 may have a concave shape on the optical axis OA, and the eighth surface S8 may have a concave shape on the optical axis OA. That is, the fourth lens 114 may have a concave shape on both sides of the optical axis OA. At least one or both of the seventh surface S7 and the eighth surface S8 may be aspherical. The aspheric coefficients of the seventh and eighth surfaces S7 and S8 are provided as shown in FIG. 11, where L4 is the fourth lens 114, and S1/S2 of L4 represent the first/second surfaces of LA. The refractive index of the fourth lens 114 may be smaller than the refractive index of the second lens 112. The fourth lens 114 may have a smaller Abbe number than the third lens 113. Accordingly, the optical system 1000 may have improved chromatic aberration control characteristics.

The fifth lens 115 may have positive (+) or negative (−) refractive power on the optical axis OA. The fifth lens 115 may have positive (+) refractive power. The fifth lens 115 may include plastic or glass. For example, the fifth lens 115 may be made of plastic. On the optical axis OA of the fifth lens 115, the ninth surface S9 may have a concave shape, and the tenth surface S10 may have a convex shape. That is, the fifth lens 115 may have a meniscus shape that is convex on the optical axis OA toward the sensor. The fifth lens 115 may include at least one inflection point. In detail, at least one or both of the ninth surface S9 and the tenth surface S10 may include an inflection point. At least one or both of the ninth surface S9 and the tenth surface S10 may be aspherical. The aspheric coefficients of the ninth and tenth surfaces S9 and S10 are provided as shown in FIG. 11, where L5 is the fifth lens 115, and S1/S2 of L5 represent the first/second surfaces of L5.

The sixth lens 116 may have positive (+) or negative (−) refractive power on the optical axis OA. The sixth lens 116 may have negative (−) refractive power. The sixth lens 116 may include plastic or glass. For example, the sixth lens 116 may be made of plastic. On the optical axis OA of the sixth lens 116, the eleventh surface S11 may have a convex shape, and the twelfth surface S12 may have a concave shape. That is, the sixth lens 116 may have a meniscus shape that is convex on the optical axis OA toward the object. Alternatively, the eleventh surface S11 may have a concave shape on the optical axis OA, or the twelfth surface S12 may have a convex shape on the optical axis OA. That is, the sixth lens 116 may have a concave or convex shape on both sides of the optical axis OA. Alternatively, the sixth lens 116 may have a meniscus shape that is convex toward the sensor. At least one or both of the eleventh surface S11 and the twelfth surface S12 may be aspherical. The aspheric coefficients of the eleventh and twelfth surfaces S11 and S12 are provided as shown in FIG. 11, where L6 is the sixth lens 116, and S1/S2 of L6 represent the first/second surfaces of L6.

The seventh lens 117 may have positive (+) or negative (−) refractive power on the optical axis OA. The seventh lens 117 may have positive (+) refractive power. The seventh lens 117 may include plastic or glass. For example, the seventh lens 117 may be made of plastic. On the optical axis OA of the seventh lens 117, the thirteenth surface S13 may have a convex shape, and the fourteenth surface S14 may have a concave shape. That is, the seventh lens 117 may have a meniscus shape that is convex on the optical axis OA toward the object. Alternatively, the thirteenth surface S13 may have a concave shape on the optical axis OA or the fourteenth surface S14 may have a convex shape on the optical axis OA, that is, the seventh lens 117 May have a concave or convex shape on both sides of the optical axis OA. Alternatively, the seventh lens 117 may have a meniscus shape that is convex toward the sensor.

The seventh lens 117 may have at least one inflection point on either the thirteenth surface S13 or the fourteenth surface S14 from the optical axis OA to the end of the effective region. The inflection point of the thirteenth surface S13 may be located at a position greater than 30% of the effective radius of the thirteenth surface S13 based on the optical axis OA, for example, in a range of 30% to 45%. The fourteenth surface S14 may or may not have an inflection point. The position of the inflection point of the seventh lens 117 is preferably placed at a position that satisfies the above-mentioned range in consideration of the optical characteristics of the optical system 1000. In detail, it is desirable that the position of the inflection point satisfies the above-mentioned range for controlling optical characteristics such as chromatic aberration, distortion characteristics, aberration characteristics, and resolution of the optical system 1000. Accordingly, the path of light emitted to the image sensor 300 through the lens can be effectively controlled. Accordingly, the optical system 1000 according to the embodiment may have improved optical characteristics even in the center and periphery portions of the FOV. At least one or both of the thirteenth surface S13 and the fourteenth surface S14 may be aspherical. The aspheric coefficients of the thirteenth and fourteenth surfaces S13 and S14 are provided as shown in FIG. 11, where L7 is the seventh lens 117, and S1/S2 of L7 represent the first/second surfaces of L7.

The eighth lens 118 may have negative refractive power on the optical axis OA. The eighth lens 118 may include plastic or glass. For example, the eighth lens 118 may be made of plastic. The eighth lens 118 may be the closest lens or the last lens in the optical system 1000 to the sensor.

The fifteenth surface S15 of the eighth lens 118 may have a concave shape on the optical axis OA, and the sixteenth surface S16 may have a concave shape on the optical axis OA. That is, the eighth lens 118 may have a concave shape on both sides at the optical axis OA. Differently, the sixteenth surface S16 of the eighth lens 118 may be convex and may have a meniscus shape convex toward the sensor. The fifteenth surface S15 of the eighth lens 118 may be provided without an inflection point from the optical axis OA to the end of the effective region. The inflection point P2 (see FIG. 9) of the sixteenth surface S16 may be a distance dP2 (see FIG. 9) of more than 25% of the effective radius of the sixteenth surface S16, which is the distance from the optical axis OA to the end of the effective region, and may be located in the range of 25% to 45%. Accordingly, the sixteenth surface S16 can diffuse the light incident through the fifteenth surface S15. Alternatively, the fifteenth surface S15 may have at least one inflection point.

A region in which a height (i.e., an optical axis height) from the center of the sixteenth surface 16 to the sixteenth surface S16 has a value (Sag value) of less than 0.1 mm as an absolute value, based on a straight line extending in the first and second directions X and Y or in the radial direction, may range of a position of 50% or more of the effective radius of the sixteenth surface S16 from the optical axis OA, for example, in a range of 50% to 70% or 55% to 65%. Accordingly, by lowering the Sag value of the sixteenth surface S16, the distance between the last lens 118 and the image sensor 300 can be reduced, or the total optical length can be reduced. The distance from the inflection point P1 of the sixteenth surface S16 to the image sensor 300 is closest, and as the region is adjacent to the end of the effective region or the optical axis OA from the inflection point P2, the distance from the sixteenth surface S16 to the image sensor 300 may gradually increase. The location of the inflection point is preferably arranged in consideration of the optical characteristics of the optical system 1000. In detail, it is desirable that the position of the inflection point satisfies the above-mentioned range for controlling optical characteristics such as chromatic aberration, distortion characteristics, aberration characteristics, and resolution of the optical system 1000. Accordingly, the path of light emitted to the image sensor 300 through the lens can be effectively controlled. Accordingly, the optical system 1000 according to the embodiment may have improved optical characteristics even in the center and periphery portions of the FOV. At least one or both of the fifteenth surface S15 and the sixteenth surface S16 may be aspherical. The aspheric coefficients of the fifteenth and sixteenth surfaces S15 and S16 are provided as shown in FIG. 11, where L8 is the eighth lens 118, and S1/S2 of L8 represent the first/second surfaces of L8.

FIG. 14 is a graph showing the height (Sag value) in the optical axis direction according to the distance in the first direction Y with respect to the object-side thirteenth surface S13 and fifteenth surface S15 and the sensor-side fourteenth surface S14 and sixteenth surface S16 in the seventh and eighth lenses 117 and 118 of FIG. 9, and in the figure, L7S1 is the thirteenth surface, L7S2 is the fourteenth surface, L8S1 is the fifteenth surface, and L8S2 is the sixteenth surface. As shown in FIG. 14, it can be seen that the height of the sixteenth surface (L8S2) above extends along a straight line orthogonal to the center (0) of the sixteenth surface (L8S2) from the optical axis to a position of 3 mm. The horizontal axis in FIG. 14 represents the distance from the center (0) to the diagonal end of the image sensor, and the vertical axis represents the height (mm).

Referring to FIGS. 9 and 14, a curvature radius of the sixteenth surface S16 of the eighth lens 108 has a positive value on the optical axis OA, a second straight line passing from the center of the sixteenth surface S16 to the surface of the sixteenth surface S16 with respect to the center of the sixteenth surface S16 or a reference first straight line orthogonal to the optical axis OA may have a slope, and the slope of the second straight line in the optical axis OA may be less than a maximum of 60 degrees. Accordingly, since it has the minimum Sag value in the optical axis or paraxial region of the sixteenth surface S16, a slim optical system can be provided.

The second lens group G2 may include the fourth to eighth lenses 114, 115, 116, 117, and 118. Among the fourth to eighth lenses 114, 115, 116, 117, and 118, the lens with the maximum center thickness may be larger than the center distance between the third and fourth lenses 113 and 114. In the second lens group G2, the lens with the maximum center thickness may be the seventh lens 117, and the lens with the minimum center thickness may be the fifth lens 115. Accordingly, the optical system 1000 can control incident light and have improved aberration characteristics and resolution. Among the fourth to eighth lenses 114, 115, 116, 117, and 118, the average size (clear aperture, CA) of the effective aperture of the lenses may be the smallest for the fourth lens 114, and the largest for the eighth lens 118. In detail, in the second lens group G2, the effective aperture of the seventh surface S7 of the fourth lens 114 may be the smallest, and the effective aperture of the sixteenth surface S16 may be the largest. The effective aperture of the sixteenth surface S16 may be 2.5 times or more than the effective aperture of the seventh surface S7. In the second lens group G2, the number of lenses with a refractive index exceeding 1.6 may be smaller than the number of lenses with a refractive index of less than 1.6. In the second lens group G2, the number of lenses with an Abbe number greater than 50 may be smaller than the number of lenses with an Abbe number of less than 50.

In FIG. 9, back focal length (BFL) is the optical axis distance from the image sensor 300 to the last lens. That is, BFL is the optical axis distance between the image sensor 300 and the sixteenth sensor-side surface S16 of the eighth lens 118. L7_CT is the center thickness or optical axis thickness of the seventh lens 117, and L8_CT is the center thickness or optical axis thickness of the eighth lens 118. D78_CT is the optical axis distance (i.e., center distance) from the center of the sensor-side surface of the seventh lens 117 to the center of the object-side surface of the eighth lens 118. That is, the optical axis distance D78_CT from the center of the sensor-side surface of the seventh lens 117 to the center of the object-side surface of the eighth lens 118 is a distance between the fourteenth surface S14 and the fifteenth surface S15 in the optical axis OA. In this way, the center thickness, edge thickness, and center distance and edge distance between two adjacent lenses of the first to eighth lenses 111-118 can be set. For example, as shown in FIG. 10, a distance between adjacent lenses may be provided, for example, spaced apart at a predetermined distance (e.g., 0.1 mm) along the first direction Y based on the optical axis OA, and may be represented from the first distance D12 to the seventh distance D78.

Referring to FIGS. 10 and 8, the thicknesses of each of the lenses L1 to L8 are shown at positions spaced apart by 0.1 mm from the optical axis OA along the first direction Y. The thickness of the first lens L1 is arranged in the range of 0.3 mm to 0.8 mm, and may gradually decrease from the optical axis OA to the end of the effective region, and the difference between the maximum and minimum values of the thickness of the first lens L1 may be less than 2 times. When the first distance D12 takes the optical axis OA as a starting point and the end of the effective region of the third surface S3 of the second lens 112 as an end point, the first distance D12 is maximum at the end point, the position of 68%±3% of the effective radius is the minimum, and can gradually increase from the minimum value toward the optical axis or the end of the effective region. The maximum value in the first distance D12 may be less than 2 times the minimum value, for example, in the range of 1.1 to 2 times the minimum value. Accordingly, the optical system 1000 can effectively control incident light. In detail, as the first lens 111 and the second lens 112 are spaced apart at the first distance D12 set according to their positions, the light incident through the first and second lenses 111 and 112 may travel to other lenses and maintain good optical performance.

The thickness of the second lens L2 may gradually increase from the optical axis OA to the end of the effective region, and is at least 0.20 mm, and the difference between the minimum and maximum values of the thickness of the second lens L2 may be 0.3 mm or less or less than 2 times, and the minimum value may be greater than the maximum value of the second distance D23. The second distance D23 may be a distance in the optical axis direction Z between the second lens 112 and the third lens 113. When the optical axis OA is the starting point and the end of the effective region of the fifth surface S5 of the third lens 113 is the end point, the maximum value of the second distance D23 is located in the range of 40%±3% of the effective radius, and can gradually decrease from its maximum value toward the optical axis OA or the end of the effective region. The second distance D23 at the optical axis OA may be more than twice as large as the second distance D23 at the end. As the second lens 112 and the third lens 113 are spaced apart at the second distance D23 set according to their positions, the aberration characteristics of the optical system 1000 can be improved. The maximum value of the first distance D12 may be two times or more the maximum value of the second distance D23, and the minimum value of the first distance D12 is greater than the maximum value of the second distance D23.

The maximum value of the thickness of the third lens L3 may be less than the maximum value of the third distance D34 and the minimum value may be less than the maximum value of the third distance D34 and greater than the minimum value. For example, the thickness of the third lens L3 may be at least 0.3 mm or more, and the difference between the minimum and maximum values of the thickness of the third lens L3 may be 0.2 mm or less. The first lens group G1 and the second lens group G2 may be spaced apart by the third distance D34. The third distance D34 may be a distance in the optical axis direction Z between the third lens 113 and the fourth lens 114. When the third distance D34 takes the optical axis OA as the starting point and the end point of the effective region of the sixth surface S6 of the third lens 113 as the end point in the first direction Y, the maximum value of the third distance D34 is located at 88%±3% of the effective radius, and can gradually become smaller from the point of the maximum value toward the optical axis OA or the end point. That is, in the third distance D34, a distance at the optical axis OA may be larger than a distance at the end point, and the maximum value may be 1.1 times or more and the minimum value may be in the range of 1.1 to 2 times. The maximum value of the third distance D34 may be 1.1 times or more, for example, 1.1 to 2 times the maximum value of the first distance D12, and the minimum value is 1.5 times or more the maximum value of the second distance D23, for example, in the range of 1.5 to 3 times. Accordingly, the optical system 1000 may have improved optical characteristics. In detail, as the third lens 113 and the fourth lens 114 are spaced apart at the third distance D34 set according to their positions, the optical system 1000 may have improved chromatic aberration characteristics. Additionally, the optical system 1000 can control vignetting characteristics.

The maximum value of the thickness of the fourth lens LA may be smaller than the maximum value of the fourth distance D45 and the minimum value may be smaller than the minimum value of the fourth distance D45. For example, the minimum thickness of the fourth lens LA may be 0.25 mm or more, and the difference between the maximum and minimum thickness may be 0.15 mm or less. The fourth distance D45 may be a distance in the optical axis direction Z between the fourth lens 114 and the fifth lens 115. When the fourth distance D45 has the optical axis OA as the starting point and the end point of the effective region of the eighth surface S8 of the fourth lens 114, the fourth distance D45 may be changed in a form that decreases in the first direction Y from the start point to the end point. The minimum value of the fourth distance D45 may be located at the end point, and the maximum value may be located at the optical axis OA or the starting point. Here, the difference between the maximum and minimum values of the fourth distance D45 may be 0.15 mm or less. The maximum value of the fourth distance D45 may be 1.1 times greater than the maximum value of the first distance D12, and the minimum value may be less than the maximum value of the first distance D12. As the fourth lens 114 and the fifth lens 115 are spaced apart at a fourth distance D45 set according to their positions, the optical system 1000 can have good optical performance in the center and periphery portions of the FOV, and may improve chromatic aberration and distortion aberration can be controlled.

The maximum value of the thickness of the fifth lens L5 is located at the end of the effective region, and may be greater than the maximum value of the fifth distance D56, and the minimum value may be less than the maximum value of the fifth distance D56, and the minimum value may be 0.3 mm or more, and the difference between the maximum and minimum values may be 0.3 mm or less. The fifth distance D56 may be a distance in the optical axis direction Z between the fifth lens 115 and the sixth lens 116. The fifth distance D56 has the optical axis OA as the starting point and the end point of the effective region of the tenth surface S10 of the fifth lens 115 is the end point, the fifth distance D56 may gradually increase from the optical axis OA to the end in the first direction Y perpendicular to the optical axis OA. The minimum value of the fifth distance D56 may be located at the optical axis OA or a starting point, and the maximum value may be located at an edge or an end point. The maximum value of the fifth distance D56 may be 5 times or more than the minimum value, for example, in the range of 5 to 20 times, and may be greater than the minimum value of the third distance D34, and the minimum value may be 5 times or more than the minimum value, for example, in the range of 5 to 20 times and may be smaller than the minimum value of the fourth distance D45. The optical performance of the optical system can be improved by this fifth distance D56.

The maximum value of the thickness of the sixth lens L6 is located at the end of the effective region and may be greater than the minimum value of the sixth distance D67, the minimum value is 0.3 mm or more, and the difference between the maximum and minimum values may be 0.5 mm or more. The sixth distance D67 may be a distance in the optical axis direction between the sixth lens 116 and the seventh lens 117. When the optical axis OA is the starting point and the end of the effective region of the twelfth surface S12 of the sixth lens 116 is the end point, the maximum value of the sixth distance D67 is located at the end, and the minimum value is located at 44%±3% of the effective radius based on the optical axis OA, and the sixth distance D67 can gradually increase from the minimum value toward the optical axis or end. The maximum value of the sixth distance D67 may be 1.5 times or more, for example, 1.5 to 4 times the minimum value. The maximum value of the sixth distance D67 may be smaller than the maximum value of the third distance D34 and the minimum value may be smaller than the minimum value of the third distance D34. Aberration control characteristics can be improved by the sixth distance D67, and the size of the effective aperture of the eighth lens 118 can be appropriately controlled.

The maximum value of the thickness of the seventh lens L7 is located at the end of the effective region and may be greater than the maximum value of the seventh distance D78, the minimum value is 0.6 mm or more, and the difference between the maximum and minimum values of the thickness of the seventh lens L7 may be 0.5 mm or more. The seventh distance D78 may be a distance in the optical axis direction between the seventh lens 117 and the eighth lens 118. When the optical axis OA is the starting point and the end of the effective region of the fourteenth surface S14 of the seventh lens 117 is the end point, the maximum value of the seventh distance D78 is located at the optical axis, the minimum value is located at 75%±3% of the distance from the optical axis to the end of the effective region, and the seventh distance D78 may gradually increase from the minimum value to the maximum value and the end. The maximum value of the seventh distance D78 may be two times or more, for example, 2 to 5 times the minimum value. Accordingly, the optical system 1000 may have improved optical characteristics in the center and periphery portions of the FOV. Aberration control characteristics can be improved by the seventh distance D78, and the size of the effective aperture of the eighth lens 118 can be appropriately controlled. In addition, the optical system 1000 can improve the distortion and aberration characteristics of the periphery portion of the FOV as the seventh lens 117 and the eighth lens 118 are spaced apart at the seventh distance D78 set according to the position.

The maximum value of the thickness of the eighth lens L8 is located in the range of 72%±3% of the effective radius, and may be larger than the maximum value of the seventh distance D78, and the minimum value is 0.2 mm or more, and the difference between the maximum and minimum values of the thickness of the eighth lens L8 may be more than 0.5 mm.

The lens with the thickest center thickness in the first lens group G1 may be thinner than the lens with the thickest center thickness in the second lens group G2. Among the first to eighth lenses 111-118, the maximum center thickness may be smaller than the maximum center distance, for example, less than 1 time or in the range of 0.5 to 0.99 times the maximum center distance. For example, the center thickness of the seventh lens 117 is the largest among the lenses, the center distance D67_CT between the sixth lens 116 and the seventh lens 117 is the largest among the distances between the lenses, and the center thickness of the seventh lens 117 may be 90% or less of the center distance between the sixth and seventh lenses 116 and 117, for example, in the range of 60% to 90%.

The size of the effective aperture H8 (see FIG. 1) of the sixteenth surface S16 of the eighth lens 118, which has the largest effective aperture size among the plurality of lenses 100A, may be in a range of 2.5 times or more, for example, 2.5 to 4 times the size of the effective aperture of the fifth surface S5. Among the plurality of lenses 100A, the eighth lens 118, which has the largest average effective aperture size, is 2.5 times or more than that of the second lens 112, which has the smallest effective aperture average size, for example, in a range of 2.5 to 4 times or 2.5 times to 3.5 times. The size of the effective aperture of the eighth lens 118 is the largest, so that incident light can be effectively refracted toward the image sensor 300. Accordingly, the optical system 1000 can have improved chromatic aberration control characteristics, and the vignetting characteristics of the optical system 1000 can be improved by controlling incident light.

The refractive index of the sixth lens 116 may be greater than that of the seventh and eighth lenses 117 and 118. The refractive index of the sixth lens 116 may be greater than 1.6, and the refractive index of the seventh and eighth lenses 117 and 118 may be less than 1.6. The sixth lens 116 may have an Abbe number that is smaller than the Abbe numbers of the seventh and eighth lenses 117 and 118. For example, the Abbe number of the sixth lens 116 may be small and has a difference of 20 or more from the Abbe number of the eighth lens 118. Accordingly, the optical system 1000 may have improved chromatic aberration control characteristics.

Among the lenses 111-118, the maximum center thickness may be 2.5 times or more, for example, 2.5 to 5 times the minimum center thickness. The seventh lens 117 having the maximum center thickness may be 2.5 times or more, for example, 2.5 to 5 times the range of the second lens 112 having the minimum center thickness. Among the plurality of lenses 100A, the number of lenses with a center thickness of less than 0.5 mm may be greater than the number of lenses with a center thickness of 0.5 mm or more. Accordingly, the optical system 1000 can be provided in a structure with a slim thickness. Among the plurality of lens surfaces S1-S16, the number of surfaces with an effective radius of less than 2 mm may be equal to or greater than the number of surfaces with an effective radius of 2 mm or more. When the curvature radius is explained as an absolute value, the curvature radius of the third surface S3 of the second lens 112 among the plurality of lenses 100A may be the largest among the lens surfaces at the optical axis OA, and the curvature radius of the third surface S3 of the second lens 112 may be the largest among the lens surfaces at the optical axis OA, and the curvature radius of the fifteenth surface S15 of the eight lens 118 may be the smallest among the lens surfaces on the optical axis OA. When the focal length is described as an absolute value, the focal length of the fourth lens 116 among the plurality of lenses 100A may be the largest among the lenses, the focal length of the eighth lens 118 may be the smallest, and the maximum focal length may be 100 times or more the minimum focus distance.

Table 2 is an example of lens data of the optical system of FIG. 8.

TABLE 2

| Lens | Surface | Curvature radius (mm) | Thickness (mm)/ Distance (mm) | Re- fractive index | Abbe number | Effective aperture (mm) |
|---|---|---|---|---|---|---|
| Lens 1 | S1 | 3.387 | 0.779 | 1.551 | 44.305 | 3.400 |
| | S2 | 10.435 | 0.343 | | | 3.255 |
| Lens 2 | S3 | 638.234 | 0.220 | 1.690 | 17.001 | 3.167 |
| | S4 (Stop) | 14.921 | 0.156 | | | 3.017 |

TABLE 2-continued

| Lens | Surface | Curvature radius (mm) | Thickness (mm)/ Distance (mm) | Refractive index | Abbe number | Effective aperture (mm) |
|---|---|---|---|---|---|---|
| Lens 3 | S5 | 9.950 | 0.446 | 1.542 | 49.543 | 3.055 |
| | S6 | 319.587 | 0.462 | | | 3.200 |
| Lens 4 | S7 | 29.962 | 0.349 | 1.555 | 39.856 | 3.498 |
| | S8 | 31.125 | 0.449 | | | 3.600 |
| Lens 5 | S9 | −34.360 | 0.343 | 1.541 | 49.438 | 3.904 |
| | S10 | −8.952 | 0.044 | | | 4.538 |
| Lens 6 | S11 | 72.844 | 0.315 | 1.606 | 25.698 | 5.228 |
| | S12 | 54.237 | 1.051 | | | 5.809 |
| Lens 7 | S13 | 23.004 | 1.002 | 1.542 | 47.725 | 6.140 |
| | S14 | −5.359 | 0.779 | | | 8.236 |
| Lens 8 | S15 | −2.829 | 0.278 | 1.534 | 55.700 | 9.363 |
| | S16 | 7.168 | 0.997 | | | 9.968 |
| Filter | | Infinity | 0.110 | | | 14.326 |
| | | Infinity | 0.974 | | | 14.423 |
| Image sensor | | Infinity | | | | 16.000 |

Table 2 shows the curvature radius, the thickness of the lenses, the distance between the lenses on the optical axis OA of the first to eighth lenses 111 to 118 of FIG. 8, the refractive index at d-line, Abbe Number, and effective aperture (CA: Clear aperture). In the optical system of the second embodiment, the sum of the refractive indices of the plurality of lenses 100A is 10 or more. For example, in a range of 10 to 15, the sum of the Abbe numbers sum is 300 or more, for example, in the range of 300 to 350, the sum of the center thicknesses of the entire lens is 4.5 mm or less, for example, in the range of 3.5 mm to 4.5 mm, and the sum of the first to seventh distances on the optical axis D12, D23, D34, D45, D56, D67, and D78 is 5 mm or less and is greater than the sum of the center thicknesses of the lens, and may range from 3.4 mm to 5 mm. In addition, the average value of the effective aperture of each lens surface of the plurality of lenses 100A may be 4 mm or more, for example, in the range of 4 mm to 6 mm, and the average of the center thickness of each lens may be 0.6 mm or less, for example, in the range of 0.4 mm to 0.6 mm.

As shown in FIG. 11, in the second embodiment, at least one lens surface among the plurality of lenses 100A may include an aspherical surface with a 30th order aspherical coefficient. For example, the first to eighth lenses 111-118 may include a lens surface having a 30th order aspherical coefficient. As described above, an aspheric surface with a 30th order aspherical coefficient (a value other than “0”) can particularly significantly change the aspherical shape of the peripheral area, so the optical performance of the peripheral area of the FOV can be well corrected.

FIG. 12 is a graph of the diffraction MTF characteristics of the optical system 1000 according to the second embodiment, and FIG. 13 is a graph of the aberration characteristics. The aberration graph in FIG. 13, longitudinal spherical aberration, astigmatic field curves, and distortion aberration are measured from left to right. In FIG. 13, the X-axis may represent focal length (mm) and distortion (%), and the Y-axis may represent the height of the image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in the about 555 nm wavelength band.

In the aberration diagram of FIG. 13, it can be interpreted that the closer each curve is to the Y-axis, the better the aberration correction function. Referring to FIG. 13, it may be seen that the measured values of the optical system 1000 according to the embodiment are adjacent to the Y-axis. That is, the optical system 1000 according to the embodiment may have improved resolution and good optical performance not only in the center portion of FOV but also in the periphery portion.

The optical system 1000 according to the first and second embodiments disclosed above may satisfy at least one or two of the equations described below. Accordingly, the optical system 1000 according to the embodiment may have improved optical characteristics. For example, when the optical system 1000 satisfies at least one mathematical equation, the optical system 1000 can effectively control aberration characteristics such as chromatic aberration and distortion aberration, and may have good optical performance not only in the center portion of the FOV but also in the periphery portion. Additionally, the optical system 1000 may have improved resolution and may have a slimmer and more compact structure. In addition, the meaning of the thickness of the lens in the optical axis OA, the distance in the optical axis OA of adjacent lenses, and the distance at the edges described in the equations may be the same as FIGS. 2 and 9.

$$2 < L1\_CT/L2\_CT < 4 \quad \text{[Equation 1]}$$

In Equation 1, L1_CT means the thickness (mm) at the optical axis OA of the first lens 101 and 111, and L2_CT means the thickness (mm) at the optical axis OA of the second lens 102 and 112. When the optical system 1000 according to the embodiment satisfies Equation 1, the optical system 1000 can improve aberration characteristics.

$$0.5 < L3\_CT/L3\_ET < 2 \quad \text{[Equation 2]}$$

In Equation 2, L3_CT means the thickness (mm) at the optical axis OA of the third lens 103 and 113, and L3_ET means the thickness (mm) in the optical axis OA direction at the end of the effective region of the third lens 103 and 113. In detail, L3_ET means a distance in the optical axis OA direction between an end of the effective region of the fifth surface S5 of the third lens 103 and 113 and an end of the effective region of the sixth surface S6 of the third lens 103 and 113. When the optical system 1000 according to the embodiment satisfies Equation 2, the optical system 1000 may have improved chromatic aberration control characteristics.

$$1 < L1\_CT/L1\_ET < 5 \quad \text{[Equation 2-1]}$$

In Equation 2-1, L1_ET means a thickness (mm) in the optical axis OA direction at the ends of the effective region of the first lenses 101 and 111. When the optical system 1000 according to the embodiment satisfies Equation 2-1, the optical system 1000 may have improved chromatic aberration control characteristics.

$$1 < L8\_ET/L8\_CT < 5 \quad \text{[Equation 3]}$$

In Equation 3, L8_CT means the thickness (mm) at the optical axis OA of the eighth lens 108 and 118, and L8_ET means the thickness (mm) in the optical axis OA direction at the end of the effective region of the eighth lens 108 and 118. In detail, L8_ET means a distance in a direction of the optical axis OA between an end of the effective region of the object-side fifteenth surface S15 of the eighth lens 108 and 118 and an end of the effective region of the sensor-side sixteenth surface S16 of the eighth lens 108 and 118.

When the optical system 1000 according to the embodiment satisfies Equation 3, the optical system 1000 can reduce distortion and have improved optical performance.

$$1.6 < n2 \quad \text{[Equation 4]}$$

In Equation 4, n2 means the refractive index at the d-line of the second lenses 102 and 112. When the optical system 1000 according to the embodiment satisfies Equation 4, the optical system 1000 can improve chromatic aberration characteristics.

[Equation 4-1]

$$1.50 < n1 < 1.6$$

$$1.50 < n8 < 1.6$$

In Equation 4-1, n1 is the refractive index at the d-line of the first lens 101 and 111, and n10 is the refractive index at the d-line of the eighth lens 108 and 118. When the optical system 1000 according to the embodiment satisfies Equation 4-1, the influence on the TTL of the optical system 1000 can be suppressed.

[Equation 5]

$$0.5 < \text{L8S2\_max\_sag to Sensor} < 2.5$$

In Equation 5, L8S2_max_sag to Sensor means the distance (mm) in a direction of the optical axis OA from the maximum Sag value of the sensor-side fourteenth surface S14 of the eighth lens 108 and 118 to the image sensor 300. For example, L8S2_max_sag to Sensor means the distance (mm) in the optical axis OA direction from the center of the eighth lens 108 and 118 to the image sensor 300. When the optical system 1000 according to the embodiment satisfies Equation 5, the optical system 1000 may secure a space in which the filter 500 may be disposed between the plurality of lenses 100 and 100A and the image sensor 300, thereby having improved assemblability. Additionally, when the optical system 1000 satisfies Equation 5, the optical system 1000 can secure a gap for module manufacturing.

In the lens data for the first and second embodiments, the position of the filter 500, in detail, the distance between the last lens and the filter 500, and the distance between the image sensor 300 and the filter 500 are set positions for convenience of design of the optical system 1000, and the filter 500 may be freely disposed within a range that does not contact the last lens and the image sensor 300. Accordingly, the value of L8S2_max_sag to Sensor in the lens data may be smaller than the distance in the optical axis OA between the object-side surface of the filter 500 and the image surface of the image sensor 300, which may be less than a back focal length (BFL) of the optical system 1000, and the position of the filter 500 may move within a range not in contact with the last lens and the image sensor 300, respectively, so as to have good optical performance. That is, the sixteenth surface S16 of the eighth lens 108 and 118 has the minimum distance between the inflection points P1 and P2 of the sixteenth surface S16 and the image sensor 300, and may gradually increase toward the end of the effective region.

[Equation 6]

$$0.5 < BFL/\text{L8S2\_max\_sag to Sensor} < 2$$

In Equation 6, the back focal length (BFL) means a distance (mm) in the optical axis OA from the center of the sensor-side sixteenth surface S16 of the eighth lenses 108 and 118 closest to the image surface of the image sensor 300. The L8S2_max_sag to Sensor means the distance (mm) in the optical axis OA direction from the maximum Sag (Sagittal) value of the sixteenth surface S16 of the eighth lens 108 and 118 to the image sensor 300. When the optical system 1000 according to the embodiment satisfies Equation 6, the optical system 1000 can improve distortion aberration characteristics and have good optical performance in the periphery portion of the FOV. Here, the maximum Sag value may be the location of the inflection point P1 and P2 of the sixteenth surface S16.

[Equation 7]

$$|\text{L8S2\_max\_slope}| < 60$$

In Equation 7, L8S2_max slope means the maximum value (Degree) of the tangential angle measured on the sensor-side sixteenth surface S16 of the eighth lens 108 and 118. In detail, L8S2_max slope in the sixteenth surface S16 means the angle value (Degree) of the point having the largest tangent angle with respect to an imaginary line extending in a direction perpendicular to the optical axis OA. When the optical system 1000 according to the embodiment satisfies Equation 7, the optical system 1000 can control the occurrence of lens flare.

[Equation 8]

$$0.2 < \text{L8S2 Infection Point} < 0.6$$

In Equation 8, L8S2 Inflection Point may refer to the position of the inflection point P1 and P2 located on the sensor-side sixteenth surface S16 of the eighth lens 108 and 118. In detail, when the optical axis OA is used as the starting point, the end of the effective region of the sixteenth surface S16 of the eighth lens 108 and 118 is used as the end point, and a vertical length from the optical axis OA to the end of the effective region is 1, the L8S2 Inflection Point may mean the location of the inflection point P1 and P2 located on the sixteenth surface S16. When the optical system 1000 according to the embodiment satisfies Equation 8, the optical system 1000 can improve distortion aberration characteristics.

[Equation 9]

$$1 < D78\_CT/D78\_min < 10$$

In Equation 9, D78_CT means the distance (mm) between the seventh lenses 107 and 117 and the eighth lenses 108 and 118 in the optical axis OA. In detail, D78_CT means the distance (mm) in the optical axis OA between the fourteenth surface S14 of the seventh lens 107 and 117 and the fifteenth surface S15 of the eighth lens 108 and 118. The D78_min refers to the minimum distance (mm) among the distances in a direction of the optical axis OA between the seventh and eighth lenses 107 and 117 and the eighth lenses 108 and 118. When the optical system 1000 according to the embodiment satisfies Equation 9, the optical system 1000 can improve distortion aberration characteristics and have good optical performance in the periphery portion of the FOV.

[Equation 10]

$$1 < D78\_CT/D78\_ET < 10$$

In Equation 10, D78_ET means a distance (mm) in a direction of the optical axis OA between an end of the effective region of the sensor-side fourteenth surface S14 of the seventh lens 107 and 117 and an end of the effective region of the object-side fifteenth surface S15 of the eighth lens 108 and 118. When the optical system 1000 according to the embodiment satisfies Equation 10, it can have good optical performance even in the center and periphery portions of the FOV. Additionally, the optical system 1000 can reduce distortion and have improved optical performance.

[Equation 11]

$$0.01 < D12\_CT/D67\_CT < 1$$

In Equation 11, D12_CT means the optical axis distance (mm) between the first lenses 101 and 111 and the second lenses 102 and 112. In detail, the D12_CT means the distance (mm) in the optical axis OA between the second surface S2 of the first lens 101 and 111 and the third surface S3 of the second lens 102 and 112. The D67_CT means a distance (mm) in the optical axis between the center of the twelfth surface S12 of the sixth lens 106 and 116 and the center of the thirteenth surface S13 of the seventh lens 107 and 117. When the optical system 1000 according to the embodiment satisfies Equation 11, the optical system 1000 may improve aberration characteristics, and control the size of the optical system 1000, for example, to reduce the total track length (TTL).

[Equation 11-1]

$$1 < D78\_CT/D34\_CT < 4$$

In Equation 11-1, D34_CT means a distance (mm) in the optical axis between the third lenses 103 and 113 and the fourth lenses 104 and 114. In detail, the D34_CT means the distance (mm) in the optical axis OA between the sixth surface S6 of the third lens 103 and 113 and the seventh surface S7 of the fourth lens 104 and 114. When the optical system 1000 according to the embodiment satisfies Equation 11-1, the optical system 1000 can improve aberration characteristics, and control the size of the optical system 1000, for example, to reduce the TTL.

[Equation 11-2]

$$1 < G2\_TD/D78\_CT < 15$$

In Equation 11-2, G2_TD means the distance (mm) in the optical axis between the object-side seventh surface S7 of the fourth lens 104 and 114 and the sensor-side sixteenth surface S16 of the eighth lens 108 and 118. Equation 11-2 can set the total optical axis distance of the second lens group G2 and the largest gap within the second lens group G2. When the optical system 1000 according to the embodiment satisfies Equation 11-2, the optical system 1000 can improve aberration characteristics and reduce the size of the optical system 1000, for example, the TTL, can be controlled. The value of Equation 11-2 may be between 2 and 10.

[Equation 11-3]

$$1 < G1\_TD/D34\_CT < 10$$

In Equation 11-3, G1_TD means the distance (mm) in the optical axis between the object-side first surface S1 of the first lens 101 and the sensor-side sixth surface S6 of the third lens 103. Equation 11-3 can set the total optical axis distance of the first lens group G1 and the distance between the first and second lens groups G1 and G2. When the optical system 1000 according to the embodiment satisfies Equation 11-3, the optical system 1000 can improve aberration characteristics and control TTL reduction. The value of Equation 11-3 may be greater than 1 and less than or equal to 5.

[Equation 11-4]

$$3 < CA\_L8S2/D78\_CT < 20$$

In Equation 11-4, CA_L8S2 means the effective aperture of the largest lens surface and means the effective aperture of the sensor-side sixteenth surface S16 of the eighth lens 108 and 118. When the optical system 1000 according to the embodiment satisfies Equation 11-4, the optical system 1000 can improve aberration characteristics and control TTL reduction.

[Equation 12]

$$1 < L1\_CT/L6\_CT < 5$$

In Equation 12, L1_CT means the thickness (mm) of the first lens 101 and 111 at the optical axis OA, and L6_CT means the thickness (mm) of the eighth lens 106 and 116 at the optical axis OA. When the optical system 1000 according to the embodiment satisfies Equation 12, the optical system 1000 may have improved aberration characteristics. Additionally, the optical system 1000 has good optical performance at a set angle of view and can control TTL.

[Equation 13]

$$0 < L6\_CT/L7\_CT < 5$$

In Equation 13, L7_CT means the thickness (mm) of the seventh lens 107 and 117 at the optical axis OA, and L6_CT means the thickness (mm) of the sixth lens 106 and 116 at the optical axis OA. When the optical system 1000 according to the embodiment satisfies Equation 13, the optical system 1000 can reduce the manufacturing precision of the seventh lens 107 and 117 and the sixth lens 106 and 116, and may improve the optical performance of the center and periphery portions of the FOV.

$$0.3 < D34\_CT < 1.5$$ [Equation 13-1]

$$0.5 < L1\_CT < 1.5$$

$$0.5 < L7\_CT < 1.5$$

In Equation 13-1, L1_CT is the center thickness (mm) of the first lens 101 and 111, D34_CT is the center distance between the first and second lens groups G1 and G2 or the optical axis distance (mm) between the third and fourth lenses 103 and 104, and L7_CT is the center thickness (mm) of the seventh lens 107 and 117. If Equation 13-1 is satisfied, the optical performance of the optical system can be improved.

$$1 < L7\_CT/L7ET < 5$$ [Equation 13-2]

In Equation 13-2, L7_ET refers to the edge-side thickness (mm) of the seventh lens 107 and 117, and if this is satisfied, the effect on reducing distortion aberration can be improved.

$$2 < L7R2/L8R2 < 10$$ [Equation 14]

In Equation 14, L7R1 refers to the curvature radius (mm) of the second surface S2 of the seventh lens 107 and 117, and L8R2 refers to the curvature radius (mm) of the sixteenth surface S16 of the eighth lens 108 and 118. When the optical system 1000 according to the embodiment satisfies Equation 14, the aberration characteristics of the optical system 1000 may be improved.

$$0 < (D67\_CT - D67\_ET)/(D67\_CT) < 5$$ [Equation 15]

In Equation 15, D67_CT means the optical axis distance (mm) between the sixth lens 106 and 116 and the seventh lens 107 and 117, and D67_ET means a distance (mm) in the direction of the optical axis OA between an end of the effective region of the sensor-side twelfth surface S12 of the sixth lens 106 and 116 and the end of the effective region of the object-side thirteenth surface S13 of the seventh lens 107 and 117. When the optical system 1000 according to the embodiment satisfies Equation 15, occurrence of distortion can be reduced and improved optical performance can be obtained. When the optical system 1000 according to the embodiment satisfies Equation 15, the optical system 1000 can reduce the manufacturing precision of the sixth lens 106 and 116 and the seventh lens 107 and 117, and improve the optical performance of the center and peripheral portions of the FOV.

$$1 < CA\_L1S1/CA\_L3S1 < 1.5$$ [Equation 16]

In Equation 16, CA_L1S1 means the size (mm) of the effective aperture (Clear aperture, CA) of the first surface S1 of the first lens 101 and 111, and CA_L3S1 the size (mm) of the effective aperture (CA) of the fifth surface S5 of the third lens 103 and 113. When the optical system 1000 according to the embodiment satisfies Equation 16, the optical system 1000 can control light incident on the first lens group G1 and have improved aberration control characteristics.

$$0.1 < CA\_L3S1/CA\_L8S2 < 0.5$$ [Equation 16-1]

In Equation 16-1, CA_L3S1 means the size (mm) of the effective aperture (Clear aperture, CA) of the third surface S3 of the third lens 103 and 113, and CA_L7S2 means the size (mm) of the effective aperture (CA) of the sixteenth surface S16 of the eight lens 108 and 118. When the optical system 1000 according to the embodiment satisfies Equation 16-1, the optical system 1000 may have improved aberration control characteristics.

$$1 < CA\_L7S2/CA\_L4S2 < 5$$ [Equation 17]

In Equation 17, CA_LAS2 means the size (mm) of the effective aperture (CA) of the eighth surface S8 of the fourth lens 104 and 114, and CA_L7S2 means the size (mm) of the effective aperture (CA) of the fourteenth surface S14 of the seventh lens 107 and 117. When the optical system 1000 according to the embodiment satisfies Equation 17, the optical system 1000 can control light incident on the second lens group G2 and improve aberration characteristics.

$$0.5 < CA\_L3S2/CA\_L4S1 < 1.5$$ [Equation 18]

In Equation 18, CA_L3S2 means the size (mm) of the effective aperture (CA) of the sixth surface S6 of the third lens 103 and 113, and CA_LAS1 means the size (mm) of the effective aperture (CA) of the seventh surface S7 of the fourth lens 104 and 114. When the optical system 1000 according to the embodiment satisfies Equation 18, the optical system 1000 can improve chromatic aberration and control vignetting for optical performance.

$$AVR\_CA\_L2 < AVR\_CA\_L3$$ [Equation 18-1]

In Equation 18-1, AVR_CA_L2 means the average value of the effective aperture (mm) of the third and fourth surfaces S3 and S4 of the second lens 102 and 112, and AVR_CA_L3 means the average value of the effective aperture (mm) of the fifth and sixth surfaces S5 and S6 of the third lens 103 and 113. If Equation 18-1 is satisfied, optical performance can be improved by setting the effective diameters of the last two lenses of the first lens group G1.

$$CA\_L3S1 < CA\_L2S2$$ [Equation 18-2]

$$CA\_L3S1 < CA\_L3S2$$

In Equation 18-2, CA_L3S1 means the effective aperture of the fifth surface S5 of the third lens 103 and 113, CA_L2S2 means the effective aperture of the fourth surface S4 of the second lens 102 and 112, and CA_L3S2 means the effective aperture of sixth surface S6 of the third lens 103 and 113. When the optical system 1000 according to the embodiment satisfies Equation 18-2, the optical system 1000 can provide a slim and compact optical system while maintaining optical performance.

$$0.1 < CA\_L5S2/CA\_L7S2 < 1 \quad \text{[Equation 19]}$$

In Equation 19, CA_L5S2 means the size (mm) of the effective aperture (CA) of the tenth surface S10 of the fifth lens 105 and 115, and CA_L7S2 means the size (mm) of the effective aperture (CA) of the fourteenth surface S14 of the seventh lens 107 and 117. When the optical system 1000 according to the embodiment satisfies Equation 19, the optical system 1000 can improve chromatic aberration.

$$0.4 < CA\_L_{inf}S1/WD\_Sensor < 0.9 \quad \text{[Equation 19-1]}$$

$CA\_L_{inf}S1$ is the effective aperture of the object-side surface of the seventh lens 107 and 117 with the inflection point among the first to seventh lenses, and WD_Sensor is the diagonal length of the image sensor.

$$0.4 < CA\_L_{inf}S1/CA\_Max < 0.9 \quad \text{[Equation 19-2]}$$

$CA\_L_{inf}S1$ is the effective aperture of the object-side surface of the seventh lens 107 with the inflection point among the first to seventh lenses, and CA_Max is the maximum effective aperture of the lens surface of the first to eighth lenses. Here, $CA\_L_{inf}S1$ may be the effective aperture of the object-side surface of the seventh lens 107 and 117. If Equations 19, 19-1, and 19-21 are satisfied, the optical system 1000 can improve optical performance.

$$0.8 < D34\_CT/D34\_ET < 5 \quad \text{[Equation 20]}$$

In Equation 20, D34_CT means the distance (mm) between the third lenses 103 and 113 and the fourth lenses 104 and 114 in the optical axis OA. In detail, D34_CT means the distance (mm) in the optical axis OA between the sixth surface S6 of the third lens 103 and 113 and the seventh surface S7 of the fourth lens 104 and 114. The D34_ET means the distance (mm) in the optical axis OA direction between an end of the effective region of the sixth surface S6 of the third lens 103 and 113 and an end of the effective region of the seventh surface S7 of the fourth lens 104 and 114. When the optical system 1000 according to the embodiment satisfies Equation 20, the optical system 1000 can reduce chromatic aberration, improve aberration characteristics, and control vignetting for optical performance.

$$3 < D67\_CT/D67\_ET < 10 \quad \text{[Equation 21]}$$

In Equation 21, D67_CT means the distance (mm) between the sixth lenses 106 and 116 and the seventh lenses 107 and 117 in the optical axis OA. The D67_ET means the distance (mm) in the direction of the optical axis OA between an end of the effective region of the twelfth surface S12 of the sixth lens 106 and 116 and an end of the effective region of the thirteenth surface S13 of the seventh lens 107 and 117. When the optical system 1000 according to the embodiment satisfies Equation 21, it can have good optical performance even in the center and periphery portions of the FOV, and the occurrence of distortion can be suppressed.

$$0 < D78\_max/D78\_CT < 2 \quad \text{[Equation 22]}$$

In Equation 22, D78_Max means the maximum distance (mm) between the seventh lenses 107 and 117 and the eighth lenses 108 and 118. In detail, D78_Max refers to the maximum distance between the fourteenth surface S14 of the seventh lens 107 and 117 and the fifteenth surface S15 of the eighth lens 108 and 118. When the optical system 1000 according to the embodiment satisfies Equation 22, optical performance can be improved in the periphery portion of the FOV and distortion of aberration characteristics can be suppressed.

$$5 < L5\_CT/D56\_CT < 30 \quad \text{[Equation 23]}$$

In Equation 23, L5_CT means the thickness (mm) at the optical axis OA of the fifth lens 105 and 115, and D56_CT means the distance (mm) between the fifth lens 105 and 115 and the sixth lens 106 and 116 in the optical axis OA. When the optical system 1000 according to the embodiment satisfies Equation 23, the optical system 1000 can reduce the effective aperture size of the sixth and seventh lenses and the center distance between adjacent lenses, and reduce the center distance between adjacent lenses, and may improve the optical performance of the peripheral portion of the FOV.

$$0.1 < L6\_CT/D56\_CT < 1 \quad \text{[Equation 24]}$$

In Equation 24, L6_CT means to the thickness (mm) at the optical axis OA of the sixth lens 106 and 116, and D56_CT means to the distance (mm) between the fifth lens 105 and 115 and the sixth lens 106 and 116 at the optical axis OA. When the optical system 1000 according to the embodiment satisfies Equation 24, the optical system 1000 can reduce the size of the effective aperture and distance of the seventh and eighth lenses, and improve optical performance in the periphery portion of the FOV.

$$0.01 < L7\_CT/D56\_CT < 1 \quad \text{[Equation 25]}$$

In Equation 25, L7_CT means the thickness (mm) of the seventh lens 107 and 117 at the optical axis OA. When the optical system 1000 according to the embodiment satisfies Equation 24 or/and Equation 25, the optical system 1000 may determine the size of the effective aperture of the eighth lens 108 and 118 and reduce the center distance between the fifth and sixth lenses, and the optical performance of the periphery portion of the FOV can be improved.

$$50 < |L5R2/L5\_CT| < 400 \quad \text{[Equation 26]}$$

In Equation 26, L5R2 means the curvature radius (mm) of the tenth surface S10 of the fifth lens 105 and 115, and L5_CT means the thickness (mm) of the fifth lens (105, 115) at the optical axis. When the optical system 1000 according to the embodiment satisfies Equation 26, the optical system 1000 may control the refractive power of the fifth lens 105 and 115 and improve the optical performance of the light incident on the second lens group G2.

$$1 < |L5R1/L7R1| < 20 \quad \text{[Equation 27]}$$

In Equation 27, L5R1 means the curvature radius (mm) of the ninth surface S9 of the fifth lens 105 and 115, and L7R1 means the curvature radius (mm) of the thirteenth surface S13 of the seventh lens 107 and 117. When the optical system 1000 according to the embodiment satisfies Equation 27, the optical performance can be improved by controlling the shape and refractive power of the fifth and seventh lenses, and the optical performance of the second lens group G2 can be improved.

$$0 < L\_CT\_Max/Air\_Max < 5 \quad \text{[Equation 28]}$$

In Equation 28, L_CT_max means the thickest thickness (mm) of each of the plurality of lenses at the optical axis OA, and Air_max means the maximum value of the air gaps or distances (mm) between the plurality of lenses. When the optical system 1000 according to an embodiment satisfies Equation 28, the optical system 1000 has good optical performance at a set angle of view and focal length, and may reduce the size of the optical system 1000, for example, TTL.

$$0.5 < \sum L\_CT/\sum Air\_CT < 2 \quad \text{[Equation 29]}$$

In Equation 29, ΣL_CT means the sum of the thicknesses (mm) of each of the plurality of lenses at the optical axis OA, and ΣAir_CT means the sum of the distances (mm) between two adjacent lenses in the plurality of lenses at the optical axis OA. When the optical system 1000 according to an embodiment satisfies Equation 29, the optical system 1000 has good optical performance at a set angle of view and focal length, and the optical system 1000 can be reduced in size, and may reduce the size of the optical system 1000, for example, TTL.

$$10 < \sum Index < 30 \quad \text{[Equation 30]}$$

In Equation 30, ΣIndex means the sum of the refractive indices at the d-line of each of the plurality of lenses 100 and 100A. When the optical system 1000 according to the embodiment satisfies Equation 30, the TTL of the optical system 1000 can be controlled and improved resolution can be achieved.

$$10 < \sum Abb/\sum Index < 50 \quad \text{[Equation 31]}$$

In Equation 31, ΣAbbe means the sum of Abbe numbers of each of the plurality of lenses 100 and 100A. When the optical system 1000 according to the embodiment satisfies Equation 31, the optical system 1000 may have improved aberration characteristics and resolution.

$$0 < |Max\_distortion| < 5 \quad \text{[Equation 32]}$$

In Equation 32, Max_distortion means the maximum value of distortion in a region from the center (0.0F) to the diagonal end (1.0F) based on the optical characteristics detected by the image sensor 300. When the optical system 1000 according to the embodiment satisfies Equation 32, the optical system 1000 can improve distortion characteristics.

$$0 < Air\_ET\_Max/L\_CT\_Max < 2 \quad \text{[Equation 33]}$$

In Equation 33, L_CT_max means the thickest thickness (mm) among the thicknesses of each of the plurality of lenses at the optical axis OA, and Air_ET_Max is a distance in the optical axis OA between an end of the effective region of the sensor-side surface of the n−1th lens and an end of the effective region of the object-side surface of the n-the lens facing each other as shown in FIG. 2, and means, for example, the maximum value (Air_Edge_max) among the edge intervals between the two lenses. In other words, it means the largest value among the d (n−1, n)_ET values in the lens data to be described later (where n is a natural number greater than 1 and less than or equal to 8). When the optical system 1000 according to the embodiment satisfies Equation 33, the optical system 1000 has a set angle of view and focal length, and can have good optical performance in the periphery portion of the FOV.

$$0.5 < CA\_L1S1/CA\_min < 2 \quad \text{[Equation 34]}$$

In Equation 34, CA_L1S1 means the effective aperture (mm) of the first surface S1 of the first lens 101 and 111, and CA_Min means the smallest effective aperture (mm) of the first to sixteenth surfaces S1 to S16. When the optical system 1000 according to the embodiment satisfies Equation 34, light incident through the first lens 101 can be controlled, and a slim optical system can be provided while maintaining optical performance.

$$1 < CA\_max/CA\_min < 5 \quad \text{[Equation 35]}$$

In Equation 35, CA_max means the largest effective aperture (mm) among the object-side surfaces and sensor-side surfaces of the plurality of lenses, and means the largest effective aperture (mm) among the first to sixteenth surfaces S1 to S16. When the optical system 1000 according to the embodiment satisfies Equation 35, the optical system 1000 can provide a slim and compact optical system while maintaining optical performance.

$$1 < CA\_L8S2/CA\_L3S1 < 5 \quad \text{[Equation 35-1]}$$

In Equation 35, CA_L8S2 means the effective aperture (mm) of the sixteenth surface S16 of the eighth lens 108 and 118, and has the largest effective aperture of the lens surface among the lenses. The CA_L3S1 means the effective aperture (mm) of the fifth surface S5 of the third lens 103 and 113, and has the smallest effective aperture of the lens surface among the lenses. That is, the effective aperture difference between the last lens surface of the first lens group G1 and the last lens surface of the second lens group G2 may be the largest. When the optical system 1000 according to the embodiment satisfies Equation 35-1, the optical system 1000 can provide a slim and compact optical system while maintaining optical performance.

$$2 \leq AVR\_CA\_L8/AVR\_CA\_L2 < 4 \quad \text{[Equation 35-2]}$$

In Equation 35, AVR_CA_L8 means the average value of the effective aperture (mm) of the fifteenth and sixteenth surfaces S15 and S16 of the eighth lens 108 and 118, and is the average of the effective aperture (mm) of the two largest lens surfaces among the lenses. The AVR_CA_L2 means the average value of the effective aperture (mm) of the third and fourth surfaces S3 and S4 of the second lens 102, and means the average of the effective apertures of the two smallest lens surfaces among the lenses. That is, a difference between the average effective aperture of the object-side and sensor-side surfaces S3 and S4 of the second lens L2 of the first lens group G1 and the average effective aperture of the object-side and sensor-side surfaces S15 and S16 of the last lens L8 of the second lens group G2 may be the largest. When the optical system 1000 according to the embodiment satisfies Equation 35-2, the optical system 1000 can provide a slim and compact optical system while maintaining optical performance.

Using Equations 35, 35-1, and 35-2, the effective aperture CA_L8S1 of the fifteenth surface S15 of the eighth lens 108 and 118 will be two times or more the minimum effective aperture CA_min, and the effective aperture CA_L8S2 of the sixteenth surface S16 may be two times or more the minimum effective aperture CA_min. In other words, the following equation can be satisfied.

$$2 \leq CA\_L8S1/CA\_min \leq 4.5 \quad \text{(Equation 35-3)}$$

$$2 \leq CA\_L8S2/CA\_min < 5 \quad \text{(Equation 35-4)}$$

$$2 \leq AVR\_CA\_L8/AVR\_CA\_L3 \leq 4.5 \quad \text{(Equation 35-5)}$$

Using Equations 35, 35-1 to 35-4, the effective aperture CA_L8S1 of the fifteenth surface S15 of the eighth lens 108 and 118 may be two times or more the average effective aperture AVR_CA_L2 of the second lens 102 and 112, for example, in the range of 2 to 4.5 times. In addition, the effective aperture CA_L8S1 of the fifteenth surface S15 of the eighth lens 108 and 118 may be two times or more the average effective aperture AVR_CA_L3 of the third lens 103 and 113, for example, in a range of 2 to 4.5 times. The effective aperture CA_L8S2 of the sixteenth surface S16 may be in a range of 2 times or more and less than 5 times the average effective aperture AVR_CA_L3 of the second lens 102.

$$1 < CA\_max/CA\_AVR < 3 \quad \text{[Equation 36]}$$

In Equation 36, CA_max means the largest effective aperture (mm) among the object-side surfaces and sensor-side surfaces of the plurality of lenses, and CA_AVR means the average effective aperture (mm) of the object-side surfaces and sensor-side surfaces of the plurality of lenses. When the optical system 1000 according to the embodiment satisfies Equation 36, a slim and compact optical system can be provided.

$$0.1 < CA\_min/CA\_AVR < 1 \quad \text{[Equation 37]}$$

In Equation 37, CA_min means the smallest effective aperture (mm) among the object-side surfaces and sensor-side surfaces of the plurality of lenses. When the optical system 1000 according to the embodiment satisfies Equation 37, a slim and compact optical system can be provided.

$$0.1 < CA\_max/(2*ImgH) < 1 \quad \text{[Equation 38]}$$

In Equation 38, CA_max means the largest effective aperture among the object-side surfaces and sensor-side surfaces of the plurality of lenses, and ImgH means the distance (mm) from the center (0.0F) to the diagonal end (1.0F) of the image sensor 300 that overlaps the optical axis OA. That is, the ImgH means ½ of the maximum diagonal length (mm) of the effective region of the image sensor 300. When the optical system 1000 according to the embodiment satisfies Equation 38, the optical system 1000 has good optical performance in the center and periphery portions of the FOV and can provide a slim and compact optical system.

$$0.5 < TD/CA\_max < 1.5 \quad \text{[Equation 39]}$$

In Equation 39, TD is the maximum optical axis distance (mm) from the object-side surface of the first lens group G1 to the sensor-side surface of the second lens group G2. For example, it is the distance from the first surface S1 of the first lens 101 to the sixteenth surface S16 of the eighth lens 108 and 118 in the optical axis OA. When the optical system 1000 according to the embodiment satisfies Equation 39, a slim and compact optical system can be provided.

$$0 < |F/L7R2| < 10 \quad \text{[Equation 40]}$$

In Equation 40, F means the total focal length (mm) of the optical system 1000, and L8R2 means the curvature radius (mm) of the fourteenth surface S14 of the seventh lens 107 and 117. When the optical system 1000 according to the embodiment satisfies Equation 40, the optical system 1000 can reduce the size of the optical system 1000, for example, reduce the TTL.

$$1 < F/L1R1 < 10 \quad \text{[Equation 41]}$$

In Equation 41, L1R1 means the curvature radius (mm) of the first surface S1 of the first lens 101 and 111. When the optical system 1000 according to the embodiment satisfies Equation 41, the optical system 1000 can reduce the size of the optical system 1000, for example, reduce the TTL.

$$0 < |EPD/L7R2| < 10 \quad \text{[Equation 42]}$$

In Equation 42, EPD means the size (mm) of the entrance pupil diameter of the optical system 1000, and L7R2 means the curvature radius (mm) of the fourteenth surface S14 of the seventh lens 107 and 117. When the optical system 1000 according to the embodiment satisfies Equation 42, the optical system 1000 can control the overall brightness and have good optical performance in the center and periphery portions of the FOV.

$$0.5 < EPD/L1R1 < 8 \quad \text{[Equation 43]}$$

Equation 42 represents the relationship between the size of the EPD of the optical system and the curvature radius of the first surface S1 of the first lenses 101 and 111, and can control incident light.

$$-3 < f1/f2 < 0 \quad \text{[Equation 44]}$$

In Equation 44, f1 means the focal length (mm) of the first lens 101 and 111, and f2 means the focal length (mm) of the second lens 102 and 112. When the optical system 1000 according to the embodiment satisfies Equation 44, the first lenses 101 and 111 and the second lenses 102 and 112 may have appropriate refractive power for controlling the incident light path and may improve resolution.

$$1 < f13/F < 5 \quad \text{[Equation 45]}$$

In Equation 45, f13 means a composite focal length (mm) of the first to third lenses, and F means the total focal length (mm) of the optical system 1000. Equation 45 establishes the relationship between the focal length of the first lens group G1 and the total focal length. When the optical system 1000 according to the embodiment satisfies Equation 45, the optical system 1000 can control the TTL of the optical system 1000.

$$1 < |f48/f13| < 15 \quad \text{[Equation 46]}$$

In Equation 46, f13 means the composite focal length (mm) of the first to third lenses, and f48 means a composite focal length (mm) of the fourth to eighth lenses. Equation 46 establishes the relationship between the focal length of the first lens group G1 and the focal length of the second lens group G2. In an embodiment, the composite focal length of the first to third lenses may have a positive (+) value, and the composite focal length of the fourth to eighth lenses may have a negative (−) value. When the optical system 1000 according to the embodiment satisfies Equation 46, the optical system 1000 can improve aberration characteristics such as chromatic aberration and distortion aberration.

$$2 < TTL < 20 \quad \text{[Equation 47]}$$

In Equation 47, TTL (Total track length) means a distance (mm) in the optical axis OA from the apex of the first surface S1 of the first lens 101 and 111 to the image surface of the image sensor 300. By setting the TTL to less than 20 in Equation 47, a slim and compact optical system can be provided.

$$2 < ImgH \quad \text{[Equation 48]}$$

Equation 48 allows the diagonal size of the image sensor 300 to exceed 4 mm, thereby providing an optical system with high resolution.

$$BFL < 2.5 \quad \text{[Equation 49]}$$

Equation 42 sets the BFL (Back focal length) to less than 2.5 mm, so that installation space for the filter 500 can be secured, and the assembly of components can be improved through the distance (mm) between the image sensor 300 and the last lens, and can improve coupling reliability. That is, if the sensor-side surface of the last lens does not have an inflection point, the BFL value can be set to less than 2.5 mm, that is, less than 2 mm.

$$2 < F < 20 \quad \text{[Equation 50]}$$

In Equation 50, the total focal length (F) can be set to suit the optical system.

$$FOV < 120 \quad \text{[Equation 51]}$$

In Equation 51, FOV (Field of view) refers to the angle of view (Degree) of the optical system 1000, and can provide an optical system of less than 120 degrees. The FOV may be 100 degrees or less.

$$0.5 < TTL/\text{CA\_max} < 2 \quad \text{[Equation 52]}$$

In Equation 52, CA_max means the largest effective aperture (mm) among the object-side surfaces and sensor-side surfaces of the plurality of lenses, and TTL (Total track length) means the distance (mm) from the apex of the first surface of the first lens 101 and 111 to the image surface of the image sensor 300 in the optical axis OA. Equation 52 sets the relationship between the total optical axis length of the optical system and the maximum effective diameter, thereby providing a slim and compact optical system.

$$0.5 < TTL/ImgH < 3 \quad \text{[Equation 53]}$$

Equation 53 can set the total optical axis length (TTL) of the optical system and the diagonal length (ImgH) from the optical axis of the image sensor 300. When the optical system 1000 according to the embodiment satisfies Equation 53, the optical system 1000 applies a relatively large image sensor 300, for example, a large image sensor 300 of about 1 inch or so, and may have a smaller TTL, thereby having a high-quality implementation and a slim structure.

$$0.01 < BFL/ImgH < 0.5 \quad \text{[Equation 54]}$$

Equation 54 can set the optical axis distance between the image sensor 300 and the last lens and the diagonal length from the optical axis of the image sensor 300. When the optical system 1000 according to the embodiment satisfies Equation 54, the optical system 1000 may secure a back focal length (BFL) for applying a relatively large image sensor 300, for example, a large image sensor 300 of about 1 inch, and may minimize the distance between the last lens and the image sensor 300, thereby having good optical properties at the center and periphery portions of the FOV.

$$4 < TTL/BFL < 10 \quad \text{[Equation 55]}$$

Equation 55 can set (unit, mm) the total optical axis length (TTL) of the optical system and the optical axis distance (BFL) between the image sensor 300 and the last lens. In the invention, since the sensor-side surface of the last lens has no inflection point, the value of Equation 55 may be 5 mm or more or 6 mm or more. When the optical system 1000 according to the embodiment satisfies Equation 55, the optical system 1000 secures BFL and can be provided in a slim and compact manner.

$$0.5 < F/TTL < 1.5 \quad \text{[Equation 56]}$$

Equation 56 can set the total focal length (F) and total optical axis length (TTL) of the optical system 1000. Accordingly, a slim and compact optical system can be provided.

$$3 < F/BFL < 10 \quad \text{[Equation 57]}$$

Equation 57 can set (unit, mm) the total focal length (F) of the optical system 1000 and the optical axis distance (BFL) between the image sensor 300 and the last lens. In the invention, since the sensor-side surface of the last lens has no inflection point, the BFL value is narrower, so the value of Equation 57 can be 5 mm or more. When the optical system 1000 according to the embodiment satisfies Equation 57, the optical system 1000 can have a set angle of view and an appropriate focal length, and a slim and compact optical system can be provided. Additionally, the optical system 1000 can minimize the distance between the last lens and the image sensor 300 and thus have good optical characteristics in the periphery portion of the FOV.

$$0.1 < F/ImgH < 3 \quad \text{[Equation 58]}$$

Equation 58 can set the total focal length (F, mm) of the optical system 1000 and the diagonal length (ImgH) at the optical axis of the image sensor 300. This optical system 1000 uses a relatively large image sensor 300, for example, around 1 inch, and may have improved aberration characteristics.

$$1 < F/EPD < 5 \quad \text{[Equation 59]}$$

Equation 59 can set the total focal length (F, mm) and entrance pupil diameter of the optical system 1000. Accordingly, the overall brightness of the optical system can be controlled.

[Equation 60]

$$Z = \frac{cr^2}{1 + \sqrt{1 - (1 + k)c^2 r^2}} + u^4 \sum_{m=0}^{13} a_m Q_m^{con}(u^2)$$

The meaning of each item in Equation 60 is as follows.

Z: The sag of the surface parallel to the Z-axis (in lens units)

c: The apex curvature (CUY)

k: The conic constant r: The radial distance $r_n$: The normalization radius (NRADIUS)

u: $r/r_n$ $a_m$: The $m^{th}Q^{con}$ coefficient, which correlates to surface sag departure $Q_m^{con}$: The $m^{th}Q^{con}$ polynomial The optical system 1000 according to the embodiment may satisfy at least one or two of Equations 1 to 59. In this case, the optical system 1000 may have improved optical characteristics. In detail, when the optical system 1000 satisfies at least one or two of Equations 1 to 59, the optical system 1000 has improved resolution and can improve aberration and distortion characteristics. In addition, the optical system 1000 may secure a back focal length (BFL) for applying the large-sized image sensor 300, and may minimize the distance between the last lens and the image sensor 300, thereby having good optical performance at the center and periphery portions of the FOV. In addition, when the optical system 1000 satisfies at least one of Equations 1 to 59, it may include the relatively large image sensor 300 and may have a relatively small TTL value, and may provide a slimmer compact optical system and a camera module having the same.

In the optical system 1000 according to an embodiment, the distances between the plurality of lenses 100 may have a value set according to the regions.

Table 3 shows the items of the above-described equations in the optical system 1000 according to the first and second embodiments, including the total track length (TTL), back focal length (BFL), and total focal length (F) of the optical system 1000, ImgH, focal length (f1, f2, f3, f4, f5, f6, f7, and f8) of each of the first to eighth lenses, composite focal length, edge thickness (ET), etc. Here, the edge thickness of the lens refers to the thickness in the optical axis direction Z at the end of the effective region of the lens, and the unit is mm.

TABLE 3

| Items | First embodiment | Second embodiment |
|---|---|---|
| F | 7.277 | 6.947 |
| f1 | 9.565 | 8.702 |
| f2 | −23.668 | −21.845 |
| f3 | 16.599 | 18.847 |
| f4 | −37.925 | 1297.850 |
| f5 | 21.016 | 22.169 |
| f6 | 19125.108 | −349.458 |
| f7 | 13.644 | 8.078 |
| f8 | −4.814 | −3.750 |
| f_G1 | 8.351 | 8.278 |
| f_G2 | −14.602 | −20.627 |
| L1_ET | 0.349 | 0.439 |
| L2_ET | 0.292 | 0.341 |
| L3_ET | 0.676 | 0.280 |
| L4_ET | 0.242 | 0.238 |
| L5_ET | 0.287 | 0.374 |
| L6_ET | 0.434 | 0.294 |
| L7_ET | 0.497 | 0.710 |
| L8_ET | 1.060 | 0.330 |
| D12_ET | 0.100 | 0.318 |
| D23_ET | 0.014 | 0.049 |
| D34_ET | 0.496 | 0.476 |
| D45_ET | 0.176 | 0.216 |
| D56_ET | 0.549 | 0.271 |
| D67_ET | 0.256 | 0.110 |
| D78_ET | 0.319 | 0.357 |
| EPD | 1.676 | 1.916 |
| BFL | 1.004 | 2.082 |
| TD | 7.791 | 7.017 |
| Imgh | 8.000 | 8.000 |
| TTL | 8.795 | 9.099 |
| F-number | 2.350 | 2.090 |
| FOV | 73.3 Degrees | 91.9 Degrees |

Table 4 shows the result values for Equations 1 to 59 described above in the optical system 1000 of FIG. 1. Referring to Table 5, it can be seen that the optical system 1000 satisfies at least one, two, or three of Equations 1 to 59. In detail, it can be seen that the optical system 1000 according to the embodiment satisfies all of Equations 1 to 59 above. Accordingly, the optical system 1000 can improve optical performance and optical characteristics in the center and periphery portions of the FOV.

TABLE 4

| | Equations | First embodiment | Second embodiment |
|---|---|---|---|
| 1 | 2 < L1_CT / L2_CT < 4 | 3.130 | 3.539 |
| 2 | 0.5 < L3_CT / L3_ET < 2 | 1.209 | 1.596 |
| 3 | 1 < L8_ET / L8_CT < 5 | 2.226 | 1.185 |
| 4 | 1.6 < n2 | 1.668 | 1.690 |
| 5 | 0.5 < L8S2_max_sag to Sensor < 2.5 | 0.923 | 2.017 |
| 6 | 0.5 < BFL / L8S2_max_sag to Sensor < 2 | 1.088 | 1.032 |
| 7 | 5 < \|L7S2_max slope\| < 65 | 59.243 | 52.123 |
| 8 | 0.2 < L8S2 Inflection Point < 0.6 | 0.463 | 0.340 |
| 9 | 1 < D78_CT / D78_min < 10 | 2.663 | 3.839 |
| 10 | 1 < D78_CT / D78_ET < 10 | 5.104 | 2.184 |
| 11 | 0.01 < D12_CT / D67_CT < 1 | 0.179 | 0.327 |

TABLE 4-continued

| | Equations | First embodiment | Second embodiment |
|---|---|---|---|
| 12 | 1 < L1_CT / L6_CT < 5 | 2.363 | 2.469 |
| 13 | 0 < L6_CT / L7_CT < 5 | 0.466 | 0.315 |
| 14 | 2 < \| L7R2 / L8R1 \| < 10 | 8.998 | 1.894 |
| 15 | 0 < (D67_CT − D67_ET) / (D67_CT) < 2 | 0.278 | 0.674 |
| 16 | 1 < CA_L1S1 / CA_L32S1 < 1.5 | 1.156 | 1.113 |
| 17 | 1 < CA_7S2 / CA_L4S2 < 5 | 2.075 | 2.288 |
| 18 | 0.5 < CA_L3S2 / CA_L4S1 < 1.5 | 0.923 | 0.915 |
| 19 | 0.1 < CA_L5S2 / CA_L7S2 < 1 | 0.553 | 0.551 |
| 20 | 0.8 < D34_CT / D34_ET < 5 | 1.470 | 0.971 |
| 21 | 3 < D67_CT / D67_ET < 10 | 3.537 | 9.547 |
| 22 | 0 < D78_max / D78_CT < 2 | 1.000 | 1.000 |
| 23 | 5 < L5_CT / D56_CT < 30 | 26.336 | 7.834 |
| 24 | 0.1 < L6_CT / D56_CT < 1 | 0.322 | 0.300 |
| 25 | 0.1 < L7_CT / D56_CT < 1 | 0.690 | 0.953 |
| 26 | 50 < \|L5R2 / L5_CT\| < 400 | 325.651 | 204.278 |
| 27 | 1 < \|L5R1 / L7R1\| < 20 | 4.589 | 1.494 |
| 28 | 0 < L_CT_Max / Air_Max < 2 | 0.501 | 0.953 |
| 29 | 0.5 < ΣL_CT / ΣAir_CT < 2 | 1.026 | 0.872 |
| 30 | 10 < ΣIndex < 30 | 12.676 | 12.561 |
| 31 | 10 < ΣAbb / ΣIndex < 50 | 25.358 | 26.214 |
| 32 | 0 < \|Max_distoriton\| < 5 | 2.999 | 2.368 |
| 33 | 0 < Air_Edge_Max / L_CT_Max < 2 | 0.673 | 0.475 |
| 34 | 0.5 < CA_L1S1 / CA_min < 2 | 1.156 | 1.127 |
| 35 | 1 < CA_max / CA_min < 5 | 3.908 | 3.304 |
| 36 | 1 < CA_max / CA_AVR < 3 | 2.297 | 2.009 |
| 37 | 0.1 < CA_min / CA_AVR < 1 | 0.588 | 0.608 |
| 38 | 0.1 < CA_max / (2*ImgH) < 1 | 0.697 | 0.623 |
| 39 | 0.5 < TD / CA_max < 1.5 | 0.698 | 0.704 |
| 40 | 0 < \|F / L7R2\| < 10 | 0.269 | 1.296 |
| 41 | 1 < F / L1R1 < 10 | 2.254 | 2.051 |
| 42 | 0 < \|EPD / L7R2\| < 10 | 0.062 | 0.357 |
| 43 | 0.5 < EPD / L1R1 < 8 | 0.519 | 0.566 |
| 44 | −3 < f1 / f2 < 0 | −0.404 | −0.398 |
| 45 | 1 < f13 / F < 5 | 1.148 | 1.192 |
| 46 | 1 < \|f48 / f13\| < 15 | 1.748 | 2.492 |
| 47 | 2 < TTL < 20 | 8.795 | 9.099 |
| 48 | 2 < ImgH | 8.000 | 8.000 |
| 49 | BFL < 2.5 | 1.004 | 2.082 |
| 50 | 2 < F < 20 | 7.277 | 6.947 |
| 51 | FOV < 120 | 93.336 | 92.000 |
| 52 | 0.5 < TTL / CA_max < 2 | 0.788 | 0.913 |
| 53 | 0.5 < TTL / ImgH < 3 | 1.099 | 1.137 |
| 54 | 0.01 < BFL / ImgH < 0.5 | 0.126 | 0.260 |
| 55 | 4 < TTL / BFL < 10 | 8.758 | 4.371 |
| 56 | 0.5 < F / TTL < 1.5 | 0.827 | 0.763 |
| 57 | 3 < F / BFL < 10 | 7.247 | 3.337 |
| 58 | 0 < F / ImgH < 3 | 0.910 | 0.868 |
| 59 | 1 < F / EPD < 5 | 4.343 | 3.626 |

FIG. 22 is a diagram illustrating a camera module according to an embodiment applied to a mobile terminal. Referring to FIG. 22, the mobile terminal 1 may include a camera module 10 provided at the rear. The camera module 10 may include an image capturing function. Additionally, the camera module 10 may include at least one of an auto focus, zoom function, and OIS function. The camera module 10 can process image frames of still images or videos obtained by the image sensor 300 in shooting mode or video call mode. The processed image frame may be displayed on a display unit (not shown) of the mobile terminal 1 and may be stored in a memory (not shown). In addition, although not shown in the drawing, the camera module may be further disposed on the front of the mobile terminal 1. For example, the camera module 10 may include a first camera module 10A and a second camera module 10B. At this time, at least one of the first camera module 10A and the second camera module 10B may include the optical system 1000 disclosed above. Accordingly, the camera module 10 can have a slim structure and have improved distortion and aberration characteristics. Additionally, the camera module 10 can have good optical performance even in the center and periphery portions of the FOV.

Additionally, the mobile terminal 1 may further include an autofocus device 31. The autofocus device 31 may include an autofocus function using a laser. The autofocus device 31 can be mainly used in conditions where the autofocus function using the image of the camera module 10 is deteriorated, for example, in close proximity of 10 m or less or in dark environments. The autofocus device 31 may include a light emitting unit including a vertical cavity surface emitting laser (VCSEL) semiconductor device, and a light receiving unit such as a photo diode that converts light energy into electrical energy. The mobile terminal 1 may further include a flash module 33. The flash module 33 may include a light emitting device inside that emits light. The flash module 33 can be operated by operating a camera of a mobile terminal or by user control.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And the differences related to these modifications and applications should be construed as being included in the scope of the invention defined in the appended claims.

The invention claimed is:

1. An optical system comprising:

first to eighth lenses disposed along an optical axis from an object side toward a sensor side, wherein the first lens has positive refractive power on the optical axis, wherein the eighth lens has negative refractive power on the optical axis, wherein an object-side surface of the first lens has a convex shape and a sensor-side surface has a concave shape on the optical axis, wherein an object-side surface of the fifth lens has a concave shape and a sensor-side surface has a convex shape on the optical axis, wherein an object-side surface of the third lens has a minimum effective aperture among the first to eighth lenses, wherein a sensor-side surface of the eighth lens has a maximum effective aperture among the first to eighth lenses, wherein an average value of effective apertures of an object-side surface and a sensor-side surface of the second lens is smaller than an average value of effective apertures of the object-side surface and a sensor-side surface of the third lens, wherein the sensor-side surface of the eighth lens is concave on the optical axis and has an inflection point, wherein an optical axis distance from an apex of the object-side surface of the first lens to an image surface of a sensor is TTL (Total Track Length), wherein ½ of a maximum diagonal length of the sensor is ImgH, and wherein the following Equation satisfies: $0.5<TTL/ImgH<3$.

2. The optical system of claim 1, wherein an object-side surface of the seventh lens among the first to eighth lenses has an inflection point, and the object-side surface of the eighth lens is provided without an inflection point from the optical axis to an end of an effective region.

3. The optical system of claim 1, wherein the effective aperture of the object-side surface of the third lens is CA_L3S1, the effective aperture of the sensor-side surface of the second lens is CA_L2S2, and the effective aperture of the sensor-side surface of the third lens is CA_L3S2, wherein the following Equation satisfies: $CA\_L3S1<CA\_L2S2$.

4. The optical system of claim 1, wherein a region where a distance from the sensor-side surface of the eight lens is less than 0.1 mm based on a straight line perpendicular to the optical axis passing through a center of the sensor-side surface of the eighth lens includes a range of 55% to 75% of an effective radius from the optical axis.

5. The optical system of claim 1, wherein the third lens satisfies the following equation:

$$0.5 < L3\_CT/L3\_ET < 2 \quad \text{Equation}$$

(L3_CT is a thickness of the third lens at the optical axis, and L3_ET is a thickness at an end of effective regions of the object-side surface and sensor-side surface of the third lens).

6. The optical system of claim 1, wherein the first, second, and eighth lenses satisfies the following equations:

Equations $$1.6 < n2$$

$$1.50 < n1 < 1.6$$

$$1.50 < n8 < 1.6$$

(n1 is a refractive index of the first lens, n2 is a refractive index of the second lens, and n8 is a refractive index of the eighth lens).

7. The optical system of claim 1, wherein the second lens and the eighth lens satisfy the following equation:

$$2 \leq AVR\_CA\_L8/AVR\_CA\_L2 \leq 4 \quad \text{Equation}$$

(AVR_CA_L8 is an average value of effective apertures (mm) of the object-side surface and a sensor-side surface of the eighth lens, and AVR_CA_L2 is the average value of the effective apertures (mm) of the object-side surface and the sensor-side surface of the second lens).

8. The optical system of claim 1, wherein the third lens and the eighth lens satisfy the following equation:

Equation $$1 < CA\_L8S2/CA\_L3S1 < 5$$

(CA_L8S2 is the effective aperture (mm) of the sensor-side surface of the eighth lens, and CA_L3S1 is the average effective aperture of the object-side surface of the third lens).

9. The optical system of claim 8, wherein CA_L8S2 is the maximum effective aperture among lens surfaces of the first to eighth lenses, wherein CA_L3S1 is the minimum effective aperture among lens surfaces of the first to eighth lenses.

10. The optical system of claim 1, wherein center thickness of the first and sixth lenses satisfies the following equation:

Equation $$1 < L1\_CT/L6\_CT < 5$$

(L1_CT is a thickness of the first lens at the optical axis, and L6_CT is a thickness of the sixth lens at the optical axis).

11. A camera module comprising:

an optical system;

an image sensor disposed on a sensor side of the optical system; and a filter disposed between the image sensor and a last lens of the optical system, wherein the optical system includes an optical system according to claim 1, wherein the following equation satisfies:

Equation $$1 < F/EPD < 5$$

(F is a total focal length of the optical system, and EPD is an entrance pupil diameter of the optical system).

12. An optical system comprising:

a first lens group having three or less lenses on an object side; and a second lens group having five or less lenses on a sensor side of the first lens group, wherein the first lens group has positive refractive power on an optical axis, wherein the second lens group has negative refractive power on the optical axis, wherein a number of lenses of the second lens group is less than twice a number of lenses of the first lens group, wherein an object surface of a lens closest to the second lens group among lens surfaces of the first and second lens groups has a minimum effective aperture, wherein a sensor-side surface closest to an image sensor among lens surfaces of the first and second lens groups has a maximum effective aperture, wherein the lens with the minimum average effective aperture within the first and second lens groups is disposed between an object-side lens and a sensor-side lens of the first lens group, and the lens with the maximum is a last lens of the second lens group, wherein an optical axis distance from an apex of an object-side surface of the first lens group to an image surface of the image sensor is TTL (Total track length), ½ of a maximum diagonal length of the image sensor is ImgH, a maximum optical axis distance (mm) from the object-side surface of the first lens group to the sensor-side surface of the second lens group is TD, and an largest effective aperture among effective apertures of object-side and sensor-side surfaces of the first and second lens groups is CA_Max, wherein the following Equations satisfy: $0.5 < TTL/ImgH < 3$ $0.5 < TD/CA\_max < 1.5$.

13. The optical system of claim 12, wherein an absolute value of a focal length of each of the first and second lens groups is greater than the focal length of the second lens group than the focal length of the first lens group.

14. The optical system of claim 13, wherein the minimum and maximum effective apertures of the lens surfaces of the first and second lens groups satisfy the following equation:

Equation $$1 < CA\_max/CA\_min < 5$$

(CA_Max is the maximum effective aperture among the object-side surfaces and the sensor-side surfaces of the first and second lens groups, and CA_Min is the minimum effective aperture among the object-side surfaces and the sensor-side surfaces of the first and second lens groups).

15. The optical system of claim 12, wherein the first lens group includes first to third lenses disposed along the optical axis from the object side toward the sensor side, wherein the second lens group includes fourth to eighth lenses disposed along the optical axis from the object side toward the sensor side, wherein an effective aperture of an object-side surface of the seventh lens having an inflection point satisfies the following equation:

Equation $$0.4 < Ca\_L_{inf}S1/WD\_Sensor < 0.9$$

($CA\_L_{inf}S1$ is the effective aperture of the object-side surface of the seventh lens with the inflection point, and WD_Sensor is the diagonal length of the image sensor).

16. The optical system of claim 15, wherein the first, second, sixth, and seventh lenses satisfy the following equations:

Equation $$2 < L1\_CT/L2\_CT < 4$$

$$0 < L6\_CT/L7\_CT < 5$$

($L1\_CT$ is a center thickness of the first lens, $L2\_CT$ is a center thickness of the second lens, $L6\_CT$ is a center thickness of the sixth lens, and $L7\_CT$ is a center thickness of the seventh lens).

17. The optical system of claim 15, wherein a region where a distance from a sensor-side surface is less than 0.1 mm based on a straight line perpendicular to the optical axis at a center of the sensor-side surface of the lens closest to the image sensor includes a range of 55% to 75% of an effective radius from the optical axis.

18. The optical system of claim 12, wherein the first lens group includes first to third lenses disposed along the optical axis from the object side toward the sensor side, wherein the second lens group includes fourth to eighth lenses disposed along the optical axis from the object side toward the sensor side, wherein an object-side surface of the seventh lens among the first to eighth lenses has an inflection point, and an object-side surface of the eighth lens is provided without an inflection point from the optical axis to an end of an effective region.

19. The optical system of claim 18, wherein an effective aperture of an object-side surface of the third lens is CA_L3S1, an effective aperture of a sensor-side surface of the second lens is CA_L2S2, and an effective aperture of a sensor-side surface of the third lens is CA_L3S2, wherein the following Equation satisfies: $CA\_L3S1 < CA\_L2S2$.

20. The optical system of claim 18, wherein the first, second, and eighth lenses satisfies the following equations:

Equations $$1.6 < n2$$

$$1.50 < n1 < 1.6$$

$$1.50 < n8 < 1.6$$

($n1$ is a refractive index of the first lens, $n2$ is a refractive index of the second lens, and $n8$ is a refractive index of the eighth lens).

* * * * *